(12) United States Patent
Vollbracht et al.

(10) Patent No.: US 12,000,953 B2
(45) Date of Patent: Jun. 4, 2024

(54) RADAR DEVICE

(71) Applicant: Aptiv Technologies AG, Schaffhausen (CH)

(72) Inventors: Dennis Vollbracht, Hilden (DE); Alexander Ioffe, Bonn (DE)

(73) Assignee: Aptiv Technologies AG, Schaffhausen (CH)

( * ) Notice: Subject to any disclaimer, the term of this patent is extended or adjusted under 35 U.S.C. 154(b) by 622 days.

(21) Appl. No.: 17/153,825

(22) Filed: Jan. 20, 2021

(65) Prior Publication Data
US 2021/0239791 A1 Aug. 5, 2021

(30) Foreign Application Priority Data

Feb. 4, 2020 (EP) .................................... 20155495

(51) Int. Cl.
*G01S 7/35* (2006.01)
*G01S 7/02* (2006.01)
(Continued)

(52) U.S. Cl.
CPC .............. *G01S 7/354* (2013.01); *G01S 7/025* (2013.01); *G01S 13/931* (2013.01); *G01S 7/02* (2013.01);
(Continued)

(58) Field of Classification Search
CPC ........ G01S 7/354; G01S 7/025; G01S 13/931; G01S 13/426; G01S 7/028; G01S 13/343;
(Continued)

(56) References Cited

U.S. PATENT DOCUMENTS 8,354,972 B2 * 1/2013 Borja ...................... H01Q 1/38
343/815
9,869,762 B1 * 1/2018 Alland .................. H01Q 21/08
(Continued)

FOREIGN PATENT DOCUMENTS

DE 102004046634 3/2006
DE 102006061312 A1 * 6/2008 ............. G07B 15/02
(Continued)

OTHER PUBLICATIONS

"Extended European Search Report", EP Application No. 20155503. 4, Jul. 24, 2020, 9 pages.
(Continued)

*Primary Examiner* — Timothy A Brainard
*Assistant Examiner* — Ismaaeel A. Siddiquee
(74) *Attorney, Agent, or Firm* — Harness, Dickey & Pierce, P.L.C.

(57) ABSTRACT

A radar device for automotive applications comprises a radar circuit configured to process a radar signal that has a first signal portion and a second signal portion, wherein the first signal portion occupies a first frequency band and the second signal portion occupies a second frequency band that is separate from the first frequency band. An antenna device of the radar device comprises a first and second antenna element that are both coupled to a common signal port of the radar circuit and the radar device is configured to route both the first signal portion and the second signal portion via the common signal port between the radar circuit and the antenna device. The antenna device is a frequency selective antenna device that transduces the first signal portion via the first antenna element and not via the second antenna element and that transduces the second signal portion at least via the second antenna element.

19 Claims, 29 Drawing Sheets

(51) Int. Cl.
*G01S 13/931* (2020.01)
*G01S 7/03* (2006.01)
*G01S 7/41* (2006.01)
*G01S 13/02* (2006.01)
*G01S 13/32* (2006.01)
*G01S 13/34* (2006.01)
*G01S 13/42* (2006.01)
*G01S 13/44* (2006.01)
*H01Q 1/32* (2006.01)
*H01Q 1/36* (2006.01)
*H01Q 21/00* (2006.01)
*H01Q 21/24* (2006.01)
*H01Q 21/28* (2006.01)
*H01Q 25/00* (2006.01)

(52) U.S. Cl.
CPC .............. *G01S 7/024* (2013.01); *G01S 7/028* (2021.05); *G01S 7/03* (2013.01); *G01S 7/35* (2013.01); *G01S 7/417* (2013.01); *G01S 2013/0254* (2013.01); *G01S 2013/0263* (2013.01); *G01S 13/325* (2013.01); *G01S 13/343* (2013.01); *G01S 13/426* (2013.01); *G01S 13/44* (2013.01); *G01S 2013/9327* (2020.01); *H01Q 1/3233* (2013.01); *H01Q 1/36* (2013.01); *H01Q 21/00* (2013.01); *H01Q 21/005* (2013.01); *H01Q 21/24* (2013.01); *H01Q 21/28* (2013.01); *H01Q 25/002* (2013.01)

(58) Field of Classification Search
CPC .................. G01S 13/325; G01S 13/44; G01S 2013/0254; G01S 2013/0263; G01S 2013/93271; G01S 7/02; G01S 7/03; G01S 7/35; G01S 7/417; G01S 7/024; H01Q 1/3233; H01Q 21/005; H01Q 21/24; H01Q 21/28; H01Q 25/002; H01Q 1/36; H01Q 21/00
See application file for complete search history.

(56) References Cited

U.S. PATENT DOCUMENTS

| | | | | |
|---|---|---|---|---|
| 10,401,491 | B2 * | 9/2019 | Lee | G01S 7/032 |
| 10,620,305 | B2 | 4/2020 | Thales | |
| 10,812,154 | B1 * | 10/2020 | Elad | G01S 13/42 |
| 2006/0049991 | A1 * | 3/2006 | Schantz | H01Q 13/085 |
| | | | | 343/700 MS |
| 2008/0278370 | A1 * | 11/2008 | Lachner | G01S 13/87 |
| | | | | 342/200 |
| 2011/0006963 | A1 * | 1/2011 | Tani | H01Q 9/0407 |
| | | | | 343/700 MS |
| 2011/0163909 | A1 | 7/2011 | Jeong | |
| 2011/0267217 | A1 | 11/2011 | Hildebrandt et al. | |
| 2014/0218259 | A1 | 8/2014 | Lee et al. | |
| 2015/0295311 | A1 * | 10/2015 | Bringuier | H01Q 1/521 |
| | | | | 343/729 |
| 2017/0363713 | A1 | 12/2017 | Kim | |
| 2018/0149735 | A1 * | 5/2018 | Lim | G01S 13/345 |
| 2018/0252807 | A1 * | 9/2018 | Fox | G01S 13/904 |
| 2019/0137616 | A1 * | 5/2019 | Kishigami | G01S 13/48 |
| 2019/0363455 | A1 * | 11/2019 | Yesil | H01Q 21/24 |
| 2021/0135373 | A1 * | 5/2021 | Spielmann | H01Q 13/10 |
| 2021/0239821 | A1 | 8/2021 | Vobracht et al. | |
| 2021/0239822 | A1 | 8/2021 | Volbracht et al. | |

FOREIGN PATENT DOCUMENTS

| | | |
|---|---|---|
| DE | 102017221049 | 5/2018 |
| DE | 102017223429 | 7/2018 |
| EP | 3605135 | 2/2020 |
| WO | 2020007573 | 1/2020 |

OTHER PUBLICATIONS

"Extended European Search Report", EP Application No. 20155495.3, Aug. 7, 2020, 11 pages.
"Extended European Search Report", EP Application No. 20155499.5, Aug. 7, 2020, 11 pages.
"FR5CPEC Radar sensor for vehicular use Teardown Internal Photos Robert Bosch GmbH", Retrieved at: https://fccid.io/NF3FR5CPEC/Internal-Photos/internal-Photos-4041421, Oct. 10, 2018, 6 pages.
Trummer, "A Polarimetric 76-79 GHz Radar-Frontend for Target Classification in Automotive Use", Oct. 2016, 4 pages.
"Extended European Search Report", EP Application No. 20213050.6, May 25, 2021, 11 pages.

* cited by examiner

RADAR DEVICE

CROSS-REFERENCE TO RELATED APPLICATION(S)

This application claims priority to European Patent Application Number 20155495.3, filed Feb. 4, 2020, the disclosure of which is hereby incorporated by reference in its entirety herein.

TECHNICAL FIELD

The present disclosure relates to a radar device for automotive applications and a method for operating a radar device.

BACKGROUND

Radar devices are used in automotive applications to detect and locate target objects such as other vehicles, obstacles or lane boundaries. They may be placed at the front, at the rear or at the sides of a vehicle. Such radar devices usually comprise a signal generator to generate a radar signal, an antenna device for illuminating the target objects with the radar signal and for capturing the radar signal reflected back from the target objects and a signal receiver to analyze the radar signal reflected back from the target objects. The information extracted from the reflected radar signal may then be used for advanced driver's assist system (ADAS) functions, such as emergency brake assist, adaptive cruise control, lane change assist or the like.

Antenna devices for automotive applications usually comprise several transmit antennas and several receive antennas. Usually, the radar circuit is able to vary the individual signal components of the radar signal that are fed to individual transmit antennas independently from each other, for example in frequency, amplitude or phase. Likewise, it is able to analyze the individual signal components captured by the individual receive antennas independently from each other. Typically, each pair of transmit antenna and receive antenna defines a propagation channel for the radar signal from the respective transmit antenna to the target object and back to the respective receive antenna. When feeding the individual transmit antennas with orthogonal signals that are separable at the receiver and ensuring that each antenna is able to receive all signals transmitted, the number of propagation channels that are accessible for signal evaluation amounts to the product of the number of transmit antennas and the number of receive antennas.

Typically, the number of individual channels available and the characteristics of the individual antennas, such as position, gain, or directivity define important radar parameters such as field of view, angular resolution, or detection range of the radar device. Therefore, it is necessary to adapt the number of propagation channels and the antenna characteristics to the position of the radar device on the vehicle and the targets to be detected. In these circumstances, it is usually the number of available propagation channels that ultimately limits the performance of the radar device.

Increasing the number of individual addressable antennas and therefore the number of available propagation channels usually leads to an increased constructive complexity of the radar device as it is necessary to provide separate and individually configurable radar signals for each individual antenna. To keep production costs low, typical radar devices for automotive applications only comprise a limited amount of individually addressable antennas, for example three transmit antennas and four receive antennas, resulting in a total of twelve available propagation channels.

Accordingly, there is a need to improve the performance of radar devices without unduly increasing their constructive complexity.

SUMMARY

The present disclosure provides a radar device for automotive applications and a method for operating a radar device according to the independent claims. Embodiments are given in the subclaims, the description and the drawings.

In one aspect, the present disclosure is directed at a radar device for automotive applications comprising a radar circuit for transceiving radar signals, a signal processing device for processing the radar signals, and an antenna device for transducing the radar signals. The radar circuit is configured to handle a radar signal that has a first signal portion and a second signal portion, wherein the first signal portion occupies a first frequency band and the second signal portion occupies a second frequency band that is separate from the first frequency band. The antenna device comprises a first antenna element that is part of a first antenna and a second antenna element that is part of a second antenna, wherein both the first and second antenna element are coupled to a common signal port of the radar circuit and the radar device is configured to route both the first signal portion and the second signal portion via the common signal port between the radar circuit and the antenna device. Furthermore, the antenna device is configured as a frequency selective antenna device that transduces the first signal portion via the first antenna element and not via the second antenna element and that transduces the second signal portion at least via the second antenna element. The signal processing device is configured to detect from the first signal portion target reflections via a first propagation channel and to detect from the second signal portion target reflections via a second propagation channel.

The present disclosure is based on the idea that the number of individually addressable antennas and thus the number of propagation channels available for signal processing may be increased by sharing a common signal port of the radar circuit among antenna elements of two or more individual antennas of the antenna device. Typical radar devices, which usually employ radar circuits that are configured as monolithic microwave integrated circuits (MMICs), only have a limited number of transmit and receive ports that are each connected to only a single individually addressable antenna. Increasing the number of individually addressable antennas has to date only been possible by providing additional signal ports, each of which is connected to a single additional antenna. Therefore, it has been necessary to either increase the number of ports of the radar circuit or to combine several radar circuits in a phase coherent manner. Both solutions increase the complexity of the hardware of the radar device and thus cause considerable additional costs.

With the radar device of the present disclosure, it is possible to increase the number of individually addressable antennas and, for example, the number of propagation channels that are individually addressable by the radar device with only minimum additional hardware and thus with only minimal additional costs. The additional channels may, for example, be used to increase the resolution, such as elevation resolution or azimuth resolution, of the radar device. Thus, the accuracy of determining an azimuth angle or an elevation angle of a detected object from the radar signal may be improved.

The radar circuit is configured to activate dedicated antenna elements, such as the first antenna element or the second antenna element, by varying or switching its operating frequency band. Therefore, the full bandwidth of the radar circuit that is routed via the common signal port may be shared among two or more antenna elements and their associated antennas. By suitably shaping and positioning the individual antenna elements, radar parameters of the radar device, like field of view, gain, signal-to-noise ratio, or angular resolution in azimuthal and/or elevation direction may be adapted over a wide range and may be tailored to specific automotive scenarios the radar device is used in.

Furthermore, the radar device of the present disclosure allows for activation of at least two different antenna configurations, one configuration comprising the first antenna with the first antenna element and operating in the first frequency band and the other configuration comprising the second antenna with the second antenna element and operating in the second frequency band. By changing the frequency band of the radar signal and emitting the first signal portion or the second signal portion, the radar device may adaptively switch between the first antenna configuration and the second antenna configuration. The antenna configurations may, for example, be adaptively activated depending on a traffic scenario detected via the radar device. One such traffic scenario may be, for example, normal driving along a street and another traffic scenario may be, for example, parking.

A first antenna configuration comprising the first antenna may provide a short-range radar for monitoring traffic within a first distance in front of the car, for example during parking, and a second antenna configuration comprising the second antenna may provide a long-range radar for monitoring traffic within a second distance, for example during normal driving. The second distance may be longer than the first distance, for example by a factor of 2, 5, 10, or 100.

The radar circuit of the radar device comprises all parts of the radar device that process the radar signal at the radar frequency used for illuminating the target objects and thus constitutes a radar front end of the radar device. The radar circuit may comprise a signal generator for generating the radar signal and a signal receiver for receiving and measuring the radar signal. The radar circuit may be configured as a transceiver comprising a transmitter, for example the signal generator, and the receiver.

The common signal port may be a transmit port of the radar device or it may be a receive port of the radar device. The radar circuit may handle the radar signal by generating it at the signal generator and/or it may handle the radar signal by evaluating or measuring it at the signal receiver. Likewise, the radar signal may be routed between the radar circuit and the antenna device by sending it from the radar circuit to the antenna device and/or by sending it from the antenna device to the radar circuit. The antenna device may transduce the radar signal by converting it into electromagnetic radiation that is emitted towards a target object irradiated by the radar device and/or it may transduce the radar signal by receiving electromagnetic radiation scattered back by the target object and by converting the received electromagnetic radiation into the radar signal.

The signal generator may be configured to generate the radar signal based on a control signal, for example based on a digital control signal, that the signal generator receives from a signal processing device of the radar device. For generating the radar signal from the control signal, the signal generator comprises a transmit chain with, for example, a digital to analog converter (DAC) that is controlled by the control signal and/or one or several signal control devices that are controlled by the control signal and may be configured as, for example, variable attenuators or amplifiers, variable phase shifters and/or the like.

The signal receiver may be configured to measure the received radar signal and to generate a data signal, for example a digital data signal, representing the received radar signal and to output the data signal to the signal processing device. For measuring the radar signal and for generating the data signal from the radar signal, the signal receiver comprises a receive chain having, for example, an analog to digital converter (ADC) that samples the radar signal and/or one or more signal conditioning devices such as low noise amplifiers, programmable filters, mixers, and/or the like that shape the radar signal prior to sampling.

The radar circuit may be configured to handle several independent radar signals, for example to generate several independent transmit radar signals from several independent control signals and/or to measure several independent receive radar signals to generate several independent data signals. The signal generator may then comprise several transmit chains, one transmit chain for each transmit radar signal and/or the signal receiver may then comprise several receive chains, one receive chain for each receive radar signal. For example, the radar circuit may comprise three transmit chains and four receive chains, each chain being connected to a separate signal port.

The individual transmit chains may be coupled to the antenna device via transmit ports of the radar circuit and the individual receive chains may be coupled to the antenna device via receive ports of the radar circuit. Each transmit port may be coupled to one of the transmit chains of the radar circuit and may be schematically located between the transmit chain and the antenna device and each receive port may be coupled to one of the receive chains of the radar circuit and may be schematically located between the receive chain and the antenna device. Each individual transmit port of the radar circuit may therefore be schematically located between the last signal control device of its associated transmit chain and the antenna device. Likewise, each receive port of the radar circuit may be schematically located between the antenna device and the first signal conditioning device of its associated receive chain.

According to the present disclosure, a radar signal is a signal that is processed by a single transmit chain or by a single receive chain of the radar circuit and that is routed via a single signal port of the radar circuit. One radar signal may comprise several signal portions, such as the first and second signal portion. Each signal portion may occupy a separate frequency band.

The radar circuit may be configured in an integrated circuit. The radar circuit may only be configured in this single integrated circuit or it may be configured in one or more additional integrated circuits. The integrated circuits may be phase coherently coupled to each other. The integrated circuits may be configured, for example, as MMICs. The individual ports of the radar circuit may be physical connection points of one or several integrated circuits of the radar circuit, for example of a MMIC comprising the radar circuit. They also may be logical or conceptual ports that are located at signal lines between the transmit chains and the antenna device and/or at signal lines between the receive chains and the antenna device, respectively, for example in radar devices, in which individual components of the radar circuit and the antenna device are integrated on a common carrier, like a common substrate. The individual ports then designate locations at which the individual signal lines route both the first signal portion and the second signal portion of the individual radar signals before transmitting the first signal portion via the first antenna elements only or after having received the first signal portion via the first antenna elements only.

If the radar circuit comprises more than one transmit chain, each transmit chain is configured to generate an individual transmit radar signal from an individual control signal, the individual control signals and transmit radar signals being mutually independent from each other. Likewise, if the radar circuit comprises more than one receive chain, each receive chain is configured to measure an individual radar signal received from the antenna device and to generate an individual data signal from the respective radar signal, the receive radar signals and data signals being mutually independent from each other.

The radar circuit may be configured to generate the individual signal portions of the radar signals with individual and mutually independent signal parameters, such as phases, amplitudes, chirps, phase shifts, code sequences, for example binary phase shift codes, and/or the like. The individual and mutually independent signal parameters may amount to orthogonality parameters that ensure separability among the individual radar signals after reception, for example in multiple input multiple output (MIMO) applications. The orthogonality parameters may, for example, employ phase shift keying, for example binary phase shift keying or binary phase modulation, or the like.

The first and second signal portion may be generated having a frequency gap in between them so that the output frequency of the radar signal is discontinuous when switching from the first frequency band of the first signal portion to the second frequency band of the second signal portion. The frequency gap may amount to at least a tenth, at least a fifth, at least a third or at least one half of the frequency span of the first and/or second frequency band. The frequency gap may amount to at most a tenth, at most a fifth, at most a third or at most one half of the frequency span of the first and/or second frequency band. Alternatively, the first and second signal portion may be generated without such a frequency gap so that the output frequency of the radar signal is continuous when switching from the first frequency band of the first signal portion to the second frequency band of the second signal portion.

According to the present disclosure, an antenna of the antenna device is formed by all antenna elements of the antenna device that collectively transduce between a radiation field of the antenna in the far-field region and its associated antenna signal handled by the radar circuit. Such an antenna may comprise a single antenna element or it may be configured as an array antenna that comprises a set of antenna elements that form individual radiating elements of the antenna and coherently transduce between the radiation field and the antenna signal. If the antenna is a receive antenna, the radiation field is an incoming radiation field that is captured by the antenna elements. If the antenna is a transmit antenna, the radiation field is an outgoing radiation field generated by the antenna elements.

The radiation field of an antenna has well-defined instantaneous field parameters in the far-field of the antenna like phase center, frequency, amplitude and the like. Likewise, each antenna has antenna parameters that define the characteristics of the antenna and its radiation field. These antenna parameters may be a radiation pattern, polarization, gain, directivity, location of phase center or antenna position, and the like.

An antenna signal associated with a radiation field of an antenna comprises all signal components that are routed between the radar circuit and the radar device that are transduced by the antenna and thereby represent the radiation field of the antenna. The signal processing device is configured to deduce from the antenna signal field parameters of the radiation field.

The individual antennas of the antenna device, for example the first antenna and/or the second antenna, may be configured as substrate integrated antennas such as microstrip patch antennas or slotted substrate integrated waveguide (SIW) antennas. They also may be configured as end-fire antennas, 3D antennas or metallized plastic antennas. The individual antennas may comprise several conductively or proximity coupled antenna elements, for example several individual slots and/or several individual patches. The individual antenna elements may be coupled in series and/or in parallel. For example, the individual antennas may be configured as series fed antenna arrays or as corporate fed antenna arrays.

The first antenna is built of a first set of antenna elements that comprises at least the first antenna element and the second antenna is built of a second set of antenna elements that comprises at least the second antenna element. The first and second set of antenna elements may be disjunct so that the first antenna and the second antenna do not comprise any common antenna elements and are spatially completely separate. The first and second sets of antenna elements may also contain one or more common antenna elements, for example, the second antenna may comprise all antenna elements of the first antenna. Finally, the first and second set may be equal so that the first and second antenna are entirely built from common antenna elements. When comprising common antenna elements, different antenna parameters of the first and second antenna, for example different polarizations of the radiation patterns transduced via the common antenna elements, may be realized by different feeding schemes of the common antenna elements.

To each port of the radar circuit, at least one individual antenna element of the antenna device is coupled. The individual antenna elements, for example the first antenna element and the second antenna element, may be conductively coupled to their respective common signal port. They also may be proximity coupled to their respective common signal port. Proximity coupling may, for example, be realized via conductive or inductive coupling. For example, both the first and second antenna element may be conductively or proximity coupled to the common signal port. In other embodiments, only the first or second antenna element may be conductively coupled to the common signal port and the other antenna element may be proximity coupled to the common signal port.

Frequency selectivity of the antenna device may, for example, be realized by employing a frequency selective first antenna element and a frequency selective second antenna element that are directly and simultaneously coupled to the common signal port. It may also be realized by coupling the first and second antenna element to the common signal port via a signal routing device such as a frequency selective multiplexer or a switching device that selectively couples the first antenna element or the second antenna element to the common signal port. Frequency selectivity may also be realized by coupling the first antenna element via a first filter and/or the second antenna element via a second filter to the common signal port, wherein the first filter passes the first frequency band and blocks the second frequency band and wherein the second filter passes at least the second frequency band.

The common signal port, to which the first antenna element and the second antenna element are coupled, may be one of the transmit ports and the first antenna and the second antenna may then be transmit antennas of the antenna device. Likewise, the common signal port may be one of the receive ports and the first antenna and the second antenna may then be receive antennas of the antenna device.

If the common signal port is configured as a transmit port, the radar signal is routed between the radar circuit and the first and second antenna element by sending it from the radar circuit to the first and second antenna element via the common signal port. The first and second antenna elements then transduce the signal portions of the radar signals by emitting electromagnetic radiation towards a target object irradiated by the radar device. If the common signal port is configured as a receive port, the radar signal is routed between the radar circuit and the first and second antenna element by sending it from the first and second antenna elements to the radar circuit via the common signal port. The first antenna element transduces the first signal portion of the radar signal by receiving electromagnetic radiation in the first frequency band and by sending a corresponding transmission line signal to the radar circuit and the second antenna element transduces the second signal portion of the radar signal by receiving electromagnetic radiation in the second frequency band and by sending a corresponding transmission line signal to the radar circuit.

In general, the antenna device may comprise a multitude of antenna elements that include the first and second antenna element and that are all coupled to the common signal port of the radar circuit. The radar signal generated by the radar circuit may then comprise a multitude of signal portions, for example one signal portion for every antenna element connected to the common signal port. In particular, more than two antenna elements may be coupled to the common signal port and the radar signal may comprise more than two signal portions. The individual signal portions may each occupy a separate frequency band. The antenna device may be configured to transduce each signal portion via a separate associated antenna element of the antenna device. Alternatively, the antenna device may be configured to transduce at least one signal portion via at least two antenna elements of the antenna device. For example, the antenna device may be configured to transduce a first signal portion via a first set of at least two antenna elements and to transduce the second signal portion via a second set of at least two antenna elements, wherein the first and second set of antenna elements differ from each other. The first set of antenna elements and/or the second set of antenna elements may each comprise, for example, two antenna elements.

In total, several or all ports of the radar circuit may be configured as common signal ports and may be simultaneously coupled to an associated first antenna element of a first antenna radiating at least in the first frequency band and to an associated second antenna element of a second antenna only radiating in the second frequency band and not in the first frequency band. Each individual radar signal that is generated by the radar circuit and that is fed to a common signal port shared by two or more antenna elements may have a first signal portion within the first frequency band and a second signal portion within the second frequency band, both signal portions being routed via the common signal port.

For example, all signal ports of the radar circuit may be configured as common signal ports and the radar circuit may generate all radar signals with a first signal portion occupying the first frequency band and a second signal portion occupying the second frequency band. Alternatively, at least one, but not all signal ports of the radar circuit may be configured as common signal ports and at least one radar signal may have both a first and a second signal portion, but at least one of the radar signals may have a first signal portion only and/or at least one of the radar signals may have a second signal portion only. The first and second signal portions of the radar signals share the bandwidth of their common signal port and transmit or receive chain of the radar circuit that is connected to their common signal port.

The individual first signal portions may be generated with individual signal parameters, for example individual separability parameters that distinguish them from each other, and the individual second signal portions may be generated with individual signal parameters, for example individual separability parameters that distinguish them from each other. As all first signal portions and all second signal portions are distinguishable by their frequency band, the same values of separability parameters may be used for one of the first signal portions and one of the second signal portions. The individual and mutually independent signal parameters may amount to different phases and/or amplitudes and/or chirps and/or phase shifts and/or code sequences, for example binary phase shift codes, and/or the like.

The individual pairs of first antennas of the radar device may each define individual first propagation channels and the individual pairs of second antennas of the radar device may each define individual second propagation channels. To this end, the signal processing device may be configured to separate the first signal portion and the second signal portion from each combined radar signal received via the individual common signal ports, for example by filtering out the first frequency band to obtain the first signal portion and by filtering out the second frequency band to obtain the second signal portion. Filtering may be performed by analog filtering prior to sampling and/or by digital filtering after sampling.

The first signal portion and the second signal portion that is received via a common receive signal port may be independently processed by the signal processing device. Using the separability parameters of the individual first signal portions, the propagation parameters of the individual first propagation channels may then be determined by comparing the transmitted first signal portion and the received first signal portion associated with the respective first propagation channel. Likewise, by using the separability parameters of the individual second signal portions, the propagation parameters of the individual second propagation channels may be determined by comparing the transmitted second signal portion and the received second signal portion associated with the respective second propagation channel.

In general, detecting target reflections via a specific propagation channel from a specific signal portion comprises using the respective signal portion as receive signal of the associated propagation channel or using the respective signal portion as transmit signal of the associated propagation channel.

Depending on the placement and radiation characteristics of the individual antennas, the propagation channels that are established over the common signal port by routing the first or second signal portion may have different propagation channel properties like polarization and/or antenna location, such as location of transmit antenna and/or location of receive antenna, and/or path length towards a target object and/or field of view, for example in the elevation direction and/or in the azimuthal direction, and/or radiation direction, and/or the like. The signal processing device may then process the data from the individual propagation channels to construct, for example, individual virtual antenna arrays, for example MIMO arrays. For example, all first signal portions transduced via the first antennas may be processed to form a first array and all second signal portions transduced via the second antennas may be processed to form an independent second array. Consequently, the performance of the radar device may be increased and it is, for example, possible to realize a radar device that has comparable angle resolution in both the azimuthal and the elevation direction with a single radar circuit.

The individual radar signals are oscillating electromagnetic signals, such as microwave signals. The radar frequencies of the radar signals may be at least 1 GHz, at least 30 GHz, at least 60 GHz or at least 70 GHz. They may be at most 200 GHz, at most 100 GHz, at most 85 GHZ, at most 60 GHz or at most 40 GHz. The radar frequencies of the radar signals may lie, for example between 31 GHz and 37 GHz or between 75 GHz and 85 GHz, or between 76 GHz and 81 GHz. The first frequency band may lie between 75 GHz and 78 GHz, for example between 75.5 GHz and 77.5 GHZ, and the second frequency band may lie between 79 GHz and 82 GHz, for example between 79.5 GHz and 81.5 GHz.

The radar device may be configured as a continuous wave (CW) radar device and the radar signals may exhibit a signal modulation that is used for determining the target distance. Such a signal modulation may be a frequency modulation, a phase modulation, or the like. The radar device may therefore be configured as a frequency modulated continuous wave (FMCW) or as a phase modulated continuous wave (PMCW) radar device.

With a FMCW radar device, the first signal portion may comprise a first frequency sweep, for example a linear frequency sweep, over the first frequency band and the second signal portion may comprise a second frequency sweep, for example a linear frequency sweep, over the second frequency band. The radar device may be configured as a distance sensing device, for example by employing FMCW radar signals, and/or as an angle resolving device, for example by arranging the individual antennas of the device as a MIMO array in azimuthal and/or elevation direction.

The first and/or second frequency sweep may have a single sweep direction, such as a rising direction and/or a falling direction. They also may have a changing sweep direction, like a triangular sweep direction. The first and second signal portions may comprise frequency sweeps having the same slopes or they may consist of linear frequency sweeps having the same slopes.

The FMCW radar device may employ simultaneous transmit and receive pulse Doppler (STAR PD) signals. With these STAR PD signals, the first and second signal portion may each comprise a multitude of pulsed frequency sweeps over the first and second frequency band, respectively. The individual frequency sweeps may each exhibit constant slope, for example constant falling linear slope. The signal processing device of the radar device may then be configured to transform each individual sweep into a set of range bins by performing a first Fourier transform, for example a fast Fourier transform, on the individual frequency sweeps. The signal processing device may further be configured to transform the individual range bins into Doppler bins via a second Fourier transform, for example a fast Fourier transform, whereby the second Fourier transform uses, for a given range bin, all signals for that specific range bin from all pulsed sweeps.

The signal processing device may comprise a ranging module that is configured to jointly process the first and second signal portion to determine a distance to a target object irradiated by the antenna device. This increases the range resolution of the radar device, as the range solution is typically inversely proportional to the bandwidth of the radar signal used for determining the target distance.

The first signal portion may exhibit a first signal modulation and the second signal portion may exhibit a second signal modulation. By jointly processing the first and second signal portion, the signal processing device may evaluate both the first and second signal modulation to determine the distance to the target object. In general, each set of antenna signals transceived by the radar circuit may exhibit an individual signal modulation. The signal processing device may be configured to jointly process a subset of the antenna signals or all antenna signals to determine the distance to the target object. Thereby, the signal processing device may evaluate a subset of the individual signal modulations or all individual signal modulations to determine the distance to the target object.

The propagation delay of the antenna signals or signal portions between the radar device and the target object may be determined from a modulation difference, such as a frequency or phase difference, between the antenna signals or signal portions reflected by the target object and a reference signal provided within the radar device. The reference signal may be, for example, the antenna signals or signal portions that are being transmitted during reception of the reflected antenna signals or signal portions. To obtain the modulation difference, the signal processing device may be configured to mix the reflected antenna signals or signal portions with the corresponding reference signals.

If the signal modulation constitutes a frequency modulation, the first signal portion may exhibit a first frequency modulation that spans the first frequency band and the second signal portion may exhibit a second frequency modulation that spans the second frequency band, so that the bandwidth of the first frequency modulation equals the first frequency band and the bandwidth of the second frequency modulation equals the second frequency band. The bandwidth of a combined antenna signal that is obtained by jointly processing the first and second signal portion with the ranging device then spans both the first frequency band and the second frequency band. The second frequency modulation of the second signal portion may be a frequency shifted version of the first frequency modulation of the first signal portion so that the instantaneous frequency of the second signal portion is given by adding the instantaneous frequency of the first signal portion and a constant frequency shift.

The individual frequency modulations may be cyclically repeated. The radar circuit may be configured to first generate the first signal portion and to then generate the second signal portion and the antenna device may be configured to first transduce the first signal portion and to then transduce the second signal portion. When cyclically repeating the first and second frequency modulation, the first signal portion and the second signal portion may be alternately generated by the radar circuit and subsequently transduced by the antenna device.

The signal processing device may be configured to jointly process the first signal portion and the second signal portion by generating a combined antenna signal that spans both the first and second frequency band and comprises the first and second signal portion. The combined antenna signal may be generated by concatenating the first and second signal portion. In general, the signal processing device may be configured to jointly process a multitude of antenna signals or signal portions, for example more than two antenna signals or signal portions, each antenna signal or signal portion spanning a different frequency band.

The radar circuit may be configured to transceive a third signal portion of the radar signal occupying a third frequency band that is different from the first frequency band and the second frequency band, and the ranging module of the radar device may be configured to jointly process the first, second and third signal portion to determine the distance to the target object irradiated by the first, second and third signal portion. The third signal portion may be transduced via at least one of the first and second antenna. It also may be transduced via both the first and second antenna.

The third frequency band may lie between the first and second frequency band. The third frequency band may, for example, cover the entire frequency range between the first and second frequency band. This maximizes the bandwidth of the combined antenna signal used to determine the distance to the target object and therefore the resolution with which the distance to the target object may be resolved. Alternatively, third frequency band may also be separated by a first frequency gap from the first frequency band and/or by a second frequency gap from the second frequency band.

The second antenna element may be configured to only transduce the second signal portion and not the first signal portion by suppressing transduction of the first signal portion compared to the second signal portion by at least 10 dB, at least 20 dB, at least 30 dB, at least 40 dB, or at least 50 dB.

The radar device may be mounted to a vehicle. The radar device may be configured as an interior radar device that captures target reflection from a passenger compartment of the vehicle or as an exterior radar device that captures target reflections from the outer environment of the vehicle, for example as a front radar or a side radar or a rear radar. The radar device may be part of a vehicle control system and may be connected to a control device of the vehicle control system. The control device may be configured to perform advanced driver's assist functions, such as adaptive cruise control, emergency brake assist, lane change assist or autonomous driving, based on the data signals received from the radar device. The control device and/or the signal processing device of the radar device may be configured as programmable logic devices, such as programmable logic controllers, FPGAs, ASICs or microprocessors.

According to an embodiment, the antenna device is configured to transduce the second signal portion via both the first antenna element and the second antenna element. Consequently, the second antenna comprises both the first antenna element and the second antenna element and the first antenna comprises the first antenna element but not the second antenna element. Transducing the second signal portion via an array antenna that comprises at least the first antenna element and the second antenna element allows to transduce the second signal portion within a different, for example narrower, solid angle than the first signal portion. Therefore, the field of view of the radar device may be different, for example narrower, in the second frequency band than in the first frequency band.

According to an embodiment, the antenna device is configured to block transduction of the second signal portion via the first antenna element. The first and second antenna elements thus form dedicated antenna elements only transducing the first and second signal portion, respectively.

The first and second signal portion may be radiated from or received at different and well defined physical locations on the antenna device, for example in angle resolving antenna arrays such as single input multiple output (SIMO) or MIMO configurations. If the radar device has several common signal ports, each of which is coupled to a first antenna element that is part of a first antenna and a second antenna element that is part of a second antenna, each first antenna element may be configured to only transduce the corresponding first signal portion and each second antenna element may be configured to only transduce the corresponding second signal portion.

The first antenna element may be configured to block transduction of the second signal portion by suppressing transduction of the second signal portion compared to the first signal portion by at least 10 dB, at least 20 dB, at least 30 dB, at least 40 dB, or at least 50 dB.

According to an embodiment, the antenna device is configured to transduce the first signal portion with a first polarization and to transduce the second signal portion with a second polarization, wherein the second polarization is different from, for example orthogonal to, the first polarization. For example, the first polarization and the second polarization may be linear polarizations, and one of the first and second antennas may transduce with horizontal linear polarization and the other one of the first and second antennas may transduce with vertical linear polarization. The first polarization and the second polarization may also be circular polarizations, and one of the first and second antennas may transduce with left-handed circular polarization and the other one of the first and second antennas may transduce with right-handed circular polarization.

Transducing the first signal portion and the second signal portion with different polarizations improves the isolation between first propagation channels comprising the first antenna and second propagation channels comprising the second antenna, for example in multiple output configurations. If the antenna device comprises a multitude of first antennas and a multitude of second antennas, all antenna elements of the first antennas may transduce with the first polarization and all antenna elements of the second antennas may transduce with the second polarization. Therefore, all first propagation channels comprising the first antennas may operate at the first polarization and all second propagation channels comprising the second antennas may operate at the second polarization.

When evaluating the data signals generated from the received radar signals in the signal processing device, the different polarizations of the first and second antennas may be used, for example, for classification of the detected target objects. In this way, polarimetric properties of the target objects may be detected and used during object classification by the signal processing device. This object classification may be performed, for example, by machine-learned algorithms that have been trained on data signals representing the polarimetric properties of different training target objects.

If the antenna device transduces the first signal portion with the first polarization and the second signal portion with the second polarization, the first propagation channel may be defined by radiation having the first polarization and the second propagation channel may be defined by radiation having the second polarization. Apart from the polarization of the transmitted radiation, the first propagation channel and the second propagation channel may comprise the same propagation path from the radar device to a target object and back to the radar device. The first propagation channel and the second propagation channel may also comprise different propagation paths between the radar device and the target object.

If the antenna device is configured to transduce the third antenna signal, it may be configured to transduce the third antenna signal with a third polarization that is different from the first and second polarization. The third polarization may be, for example, a linear superposition of the first and second polarization. For example, the first antenna may transduce with the first polarization while the second antenna transduces with the second polarization and the third antenna signal may be transduced via both the first and second antenna. This results in the third antenna signal having a polarization that amounts to a superposition of the first and second polarization. If the first and second polarizations are orthogonal linear polarizations, the third polarization may be linear polarization at an intermediate angle, for example +/−45°, or elliptical polarization.

According to an embodiment, the first antenna element and the second antenna element are serially coupled to the signal port of the radar circuit via a common signal line. The second antenna element is resonant in the second frequency band and not in the first frequency band and the first antenna element is resonant at least in the first frequency band. For example, the first antenna element may be resonant only in the first frequency band and not in the second frequency band or it may be resonant in both the first frequency band and the second frequency band.

The serially coupled first and second antenna elements then constitute a natural frequency selective power divider and the antenna device may have a compact and simple construction. One of the first and second antenna elements is coupled to the common signal line in between the other antenna element and the common signal port. This antenna element may be part of a leaky travelling waveguide antenna, for example of a leaky travelling waveguide array antenna, and the other antenna element may be part of a series fed antenna, for example as a series fed array antenna. Additionally or alternatively, a filter may be placed between the individual antenna elements, wherein the filter is configured to block the signal portion that is radiated via the antenna element that is coupled to the common signal line in between the common signal port and the other antenna element.

According to an embodiment, the first antenna element and the second antenna element are coupled to the signal port of the radar circuit in parallel via a signal routing device of the antenna device and the signal routing device is configured to split the radar signal into the first signal portion and the second signal portion and to selectively route the first signal portion only between the common signal port and the first antenna element and not between the common signal port and the second antenna element and to route the second signal portion at least between the common signal port and the second antenna element. For example, the signal routing device may be configured to route the second signal portion between the common signal port and both the first and second antenna element or between the common signal port and the second antenna element only and not between the common signal port and the first antenna element. Such a signal routing device allows selectively transducing the first signal portion only via the first antenna element irrespective of the bandwidth of the first or second antenna.

According to an embodiment, the signal routing device is configured as a switching device that is configured to alternately conductively couple a first port that is coupled, for example conductively or proximity coupled, to the first antenna element or a second port that is coupled, for example conductively or proximity coupled, to the second antenna element to the common signal port of the radar circuit. Such a switching device may have low attenuation of the routed signals.

The switching device may be configured as a microwave switch having active and/or passive components. It may be controlled via a control line carrying a switching signal that determines the switching state of the switching device. The switching device may be integrated in the radar circuit, for example in a MMIC of the radar circuit, or it may comprise discrete components placed between the radar circuit and the antenna device.

According to an embodiment, the signal routing device is configured as a frequency selective device, for example as a frequency selective multiplexer, having a first port that is coupled, for example conductively or proximity coupled, to the first antenna element, a second port that is coupled, for example conductively or proximity coupled, to the second antenna element and a frequency selective section that couples, for example conductively or proximity couples, the first and the second port to the common signal port of the radar circuit.

The frequency selective section may comprise a first filter coupling the common signal port with the first port of the signal routing device and a second filter coupling the common signal port with the second part of the signal routing device. The second filter may be configured to only pass the second signal and not the first signal and the first filter may be configured to pass at least the first signal. The first filter may be configured to pass both the first and second signal or it may be configured to pass only the first signal and not the second signal. The individual filters may be configured as LANGE filters and/or as KAMM filters. The filters may be, for example, implemented as substrate integrated waveguide filters.

According to an embodiment, the radar circuit comprises an integrated circuit and the common signal port is configured as an external connection point of the integrated circuit. Coupling the connection point to the first and second antenna element then effectively doubles the propagation channels that are addressable via the connection point forming the common signal port. The integrated circuit may be configured as a MMIC.

According to an embodiment, a phase center of the first antenna and a phase center of the second antenna are positioned at the same location on the antenna device. For example, the first antenna element and the second antenna element may be configured to transduce the first signal portion and the second signal portion with phase centers being located at the same physical location on the antenna device. To this end, the first antenna element and the second antenna element may be formed by a dual frequency antenna element that is a resonant both in the first frequency band and in the second frequency band. Such a dual frequency antenna element may be fed by a common signal line carrying both the first and second signal portion.

In general, the first antenna comprising the first antenna element and the second antenna comprising the second antenna element may be configured to transduce a first antenna signal containing the first signal portion and a second antenna signal containing the second signal portion from the same physical location on the antenna device. For example, the first antenna may be configured to transduce a first radiation field and the second antenna may be configured to transduce a second radiation field, wherein the first and second radiation field have the same phase center. For example, the first antenna and the second antenna may comprise the same set of dual frequency antenna elements, each dual frequency antenna element being fed with a component of the first antenna signal and a component of the of the second antenna signal. Alternatively, the first antenna and the second antenna may comprise different sets of antenna elements that are arranged to generate the coinciding phase centers.

According to an embodiment, a phase center of the first antenna and a phase center of the second antenna are positioned at different locations on the antenna device. To this end, the individual antenna elements of the first and second antenna may be configured as separate antenna elements that are located at different physical locations of the antenna device.

In general, the first antenna comprising the first antenna element and the second antenna comprising the second antenna element may be configured to transduce the first antenna signal containing the first signal portion and the second antenna signal containing the second signal portion via different physical locations on the antenna device.

In general, the individual antenna elements coupled to a common signal port of the radar circuit may also contain a set of antenna elements that are configured to radiate individual signal portions from the same physical location and another set of antenna elements that are configured to radiate individual signal portions from separate physical locations on the antenna device. For example, two antenna elements coupled to a common signal port may be configured to radiate their respective signal portions from the same physical location and two further antenna elements coupled to the same signal port may be configured to radiate the respective signal portions from separate physical locations.

According to an embodiment, the first antenna comprising the first antenna element is part of a first set of antennas that transduce in the first frequency band and are displaced with respect to each other along a first direction and the second antenna comprising the second antenna element is part of a second set of antennas that transduce in the second frequency band and are displaced with respect to each other along a second direction. The signal processing device is configured to process individual first radar signals transduced via the first set of antennas to form a first virtual array of antennas that resolves targets along the first direction and to process individual second radar signals transduced via the second set of antennas to form a second virtual array of antennas that resolves targets along the second direction.

The second direction may be different from, for example orthogonal to, the first direction. The first direction may be the azimuthal direction and the second direction may be the elevation direction. Alternatively, the second direction may equal the first direction. Both the first and second direction may then be the azimuthal or the elevation direction.

The individual antennas of the first set of antennas are displaced from each other along the first direction and the individual antennas of the second set of antennas are displaced from each other along the second direction. The first and second antennas being displaced with respect to each other may result from the phase centers of the respective antennas being displaced with respect to each other. Unless noted otherwise, a position of an antenna should be understood as being equal to its phase center.

The first virtual array of antennas is constructed from reflections of the first signal portions of the radar signals from an target object, wherein the first signal portions propagate along individual first propagation paths between the radar device and the target object, and the second virtual array of antennas is constructed from reflections of the second signal portions of the radar signals from the target object, wherein the second signal portions propagate along individual second propagation paths between the radar device and the target object. The first propagation channel that is used by the signal processing device for target detection then comprises electromagnetic radiation that travels along one of the first propagation paths and the second propagation channel comprises electric radiation that travels along one of the second propagation paths. Besides the different propagation paths, the first and second propagation channel may additionally differ by the polarization of the first and second radar signals.

The first set of antennas are be arranged to resolve individual targets irradiated by the radar device along the first direction and the second set of antennas are be arranged to resolve the individual targets along the second direction. Both the first and the second array may have high angle resolution. The first and the second array may have, for example, the same angle resolution. The first and the second array may also have mutually different angle resolutions. The first array may comprise a different number of antennas than the second array and/or the antennas of the first array may be arranged with different spacing than the antennas of the second array. For example, the first array may have a higher number of antennas than the second array and/or the antennas of the first array may be arranged with a smaller spacing than the antennas of the second array and the angle resolution along the first direction may be larger than the angle resolution along the second direction.

Additionally or alternatively, the first and second array may have mutually different range resolutions. To this end, the first frequency band may, for example, span a different bandwidth than the second frequency band. For example, the first frequency band may span a larger bandwidth than the second frequency band and the range resolution of the first array may be larger than the angle resolution of the second array.

The first set of antennas may comprise all first antennas transducing in the first frequency band and being coupled to individual common signal ports of the radar device and the second set of antennas may comprise all second antennas transducing in the second frequency band and being coupled to the individual common signal ports of the radar device. The signal processing device may, for example, be configured to generate a first virtual antenna array, such as a first MIMO array, from the propagation channels established by the first radar signals transduced by the first antennas and to generate a second virtual antenna array, such as a second MIMO array, from the propagation channels of the second radar signals transduced by the second antennas.

The virtual antennas of the first virtual antenna array may have even first distances in between them. For example, the first distances may amount to half the wavelength of a selected frequency within the first frequency band, for example to half the wavelength of the center frequency of the first frequency band. Analogously, the virtual antennas of the second virtual antenna array may have even second distances in between them. For example, the second distances may amount to half the wavelength of a selected frequency within the second frequency band, for example to half the wavelength of the center frequency of the second frequency band. Alternatively, the first distance may equal the second distance. For example, the first and second distance may amount to the wavelength at a selected frequency that is in between the first and second frequency band, for example, at the center between a minimum frequency of the first frequency band and a maximum frequency of the second frequency band or at the center between a maximum frequency of the first frequency band and a minimum frequency of the second frequency band.

According to an embodiment, the first antenna comprising the first antenna element has a first field of view, the first field of view having a first extent along a lateral direction and the second antenna comprising the second antenna element has a second field of view, the second field of view having a second extent along the lateral direction, wherein the first extent is larger than the second extent. The lateral direction may, for example, be the azimuthal direction or the elevation direction.

This allows the radar device to perform different radar functions that necessitate different fields of view. For example, antenna signals or data representing the antenna signals from the second antenna may be used by the signal processing device for long-range radar (LRR) functions and/or adaptive cruise control and/or emergency brake assist, and antenna signals or data representing the antenna signals from the first antenna may be used for mid-range radar (MRR) or short-range radar (SRR) functions and/or lane change assist, and/or cross traffic detection, and/or parking assist.

The first propagation channel used by the signal processing device for target detection then comprises first propagation paths that are located within the first field of view, for example within an area of the first field of view that is situated outside the second field of view, and the second propagation channel used for target detection comprises second propagation paths that are located within the second field of view, for example within an area of the second field of view that is situated outside the first field of view. Besides the different propagation paths, the first and second propagation channel may additionally differ by the polarization of the first radar signal and the second radar signal.

To realize a small field of view, the second antenna may comprise a multitude of second antenna elements that are placed next to each other along the lateral direction and form a phased array that narrows the beam solid angle of the second antenna in the lateral direction. The first antenna may comprise a multitude of first antenna elements that form a larger beam solid angle than the antenna elements of the second antenna, for example, due to the first antenna having a smaller number of antenna elements than the second antenna arrangement.

According to an embodiment, the first antenna does not comprise the second antenna element, and the second antenna comprises the second antenna element and the first antenna element. The second antenna may then comprise a multitude of antenna elements that includes both all first antenna elements of the first antenna and all second antenna elements of the second antenna. The second antenna elements may be positioned symmetrically on both sides of the first antenna elements. The antenna device may then be configured to transduce the first signal portion in the first frequency band only via the first antenna elements of the first antenna and to transduce the second signal portion in the second frequency band via both the first antenna elements of the first antenna and the second antenna elements of the second antenna.

In another aspect, the present disclosure is directed at a method for operating a radar device for automotive applications, the radar device comprising a radar circuit and an antenna device having a first antenna element that is part of a first antenna and a second antenna element that is part of a second antenna, the first and second antenna element being both coupled to a common signal port of the radar circuit. The method comprises: generating a radar signal having a first signal portion and a second signal portion, wherein the first signal portion occupies a first frequency band and the second signal portion occupies a second frequency band that is separate from the first frequency band; routing both the first signal portion and the second signal portion via the common signal port between the radar circuit and the antenna device; and transducing the first signal portion via the first antenna element and not via the second antenna element and transducing the second signal portion at least via the second antenna element. The method further comprises detecting from the first signal portion target reflections via a first propagation channel and detecting from the second signal portion target reflections via a second propagation channel.

The method may be performed, for example, by the radar device of the present disclosure. Insofar, all embodiments and effects that are disclosed in connection with the radar device also apply to the method of the present disclosure and vice versa.

The common signal port may be a transmit port or a receive port of the radar circuit. If the common signal port is a transmit port, the step of routing the first and second signal portion via the common signal port is performed prior to the step of transducing the first and second signal portion by sending an electromagnetic radiation via the antenna device. If the common signal port is a receive port, the step of routing the first and second signal portion via the common signal port is performed after the step of transducing the first and second signal portion by picking up electromagnetic radiation via the antenna device.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
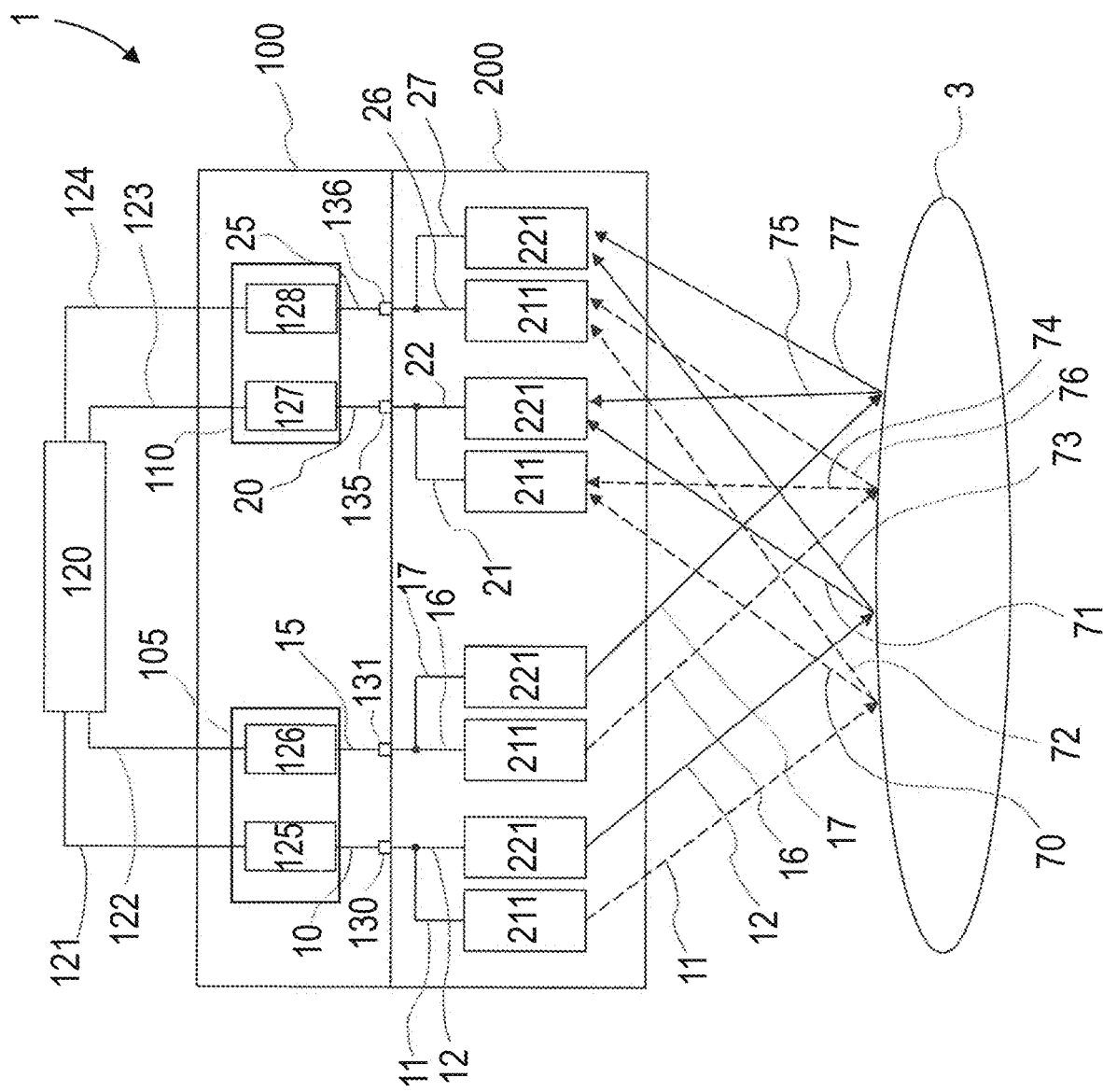
FIG. 1 a first embodiment of a radar device according to the present disclosure.

FIG. 1 depicts a radar device 1 having a radar circuit 100, an antenna device 200 and a signal processing device 120. The radar circuit 100 comprises a signal generator 105 having a first transmit chain 125 and a second transmit chain 126. The first transmit chain 125 is coupled to a first common transmit signal port 130 and the second transmit chain 126 is coupled to a second common transmit signal port 131.

Each common transmit signal port 130, 131 is coupled to a first antenna 211 and a second antenna 221 of the antenna device 200, the first antennas 211 and the second antennas 221 each being placed at different locations on the antenna device 200. The first transmit chain 125 is connected to the signal processing device 120 to receive a first control signal 121 and the second transmit chain 126 is connected to the signal processing device 120 to receive a second control signal 122.

Based on the first control signal 121, the first transmit chain 125 generates a first transmit radar signal 10 comprising a first signal portion 11 occupying a first frequency band and a second signal portion 12 occupying a second frequency band. The first transmit radar signal 10 is routed via the first common transmit signal port 130 to the antenna device 200 and the antenna device 200 is configured to selectively transduce the first signal portion 11 of the first transmit radar signal 10 via the first antenna 211 coupled to the first common transmit signal port 130 and to selectively transduce the second signal portion 12 of the first transmit radar signal 10 via the second antenna 221 coupled to the first common transmit signal port 130.

Based on the second control signal 122, the second transmit chain 126 generates a second transmit radar signal 15 comprising a first signal portion 16 occupying the first frequency band and a second signal portion 17 occupying the second frequency band. The second transmit radar signal 15 is routed via the second common transmit signal port 131 to the antenna device 200 and the antenna device 200 is configured to selectively transduce the first signal portion 16 of the second transmit radar signal 15 via the first antenna 211 coupled to the second common transmit signal port 131 and to selectively transduce the second signal portion 17 of the second transmit radar signal 15 via the second antenna 221 coupled to the second common transmit signal port 131.

The individual first signal portions 11, 16 of the first and second transmit radar signal 10, 15 are radiated by the individual first antennas 211 towards a target object 3 and the individual second signal portions 12, 17 of the first and second transmit radar signal 10, 15 are radiated by the individual second antennas 221 towards the target object 3. The target object 3 reflects the signal portions 11, 12, 16, 17 of the first and second transmit radar signal 10, 15 at least partly back to the antenna device 200.

At the antenna device 200, the first signal portions 11, 16, which occupy the first frequency band, are transduced by two separated first antennas 211 and the second signal portions 12, 17, which occupy the second frequency band, are transduced by two separated second antennas 221. The first antennas 211 are resonant in the first frequency band of the first signal portions 11, 16 and they are off-resonant in the second frequency band of the second signal portions 12, 17. Analogously, the second antennas 221 are resonant in the second frequency band of the second signal portions 12, 17 and they are off-resonant in the first frequency band of the first signal portions 11, 16.

One of the first antennas 211 and one of the second antennas 221 are coupled via a first common receive signal port 135 to a first receive chain 127 of a signal receiver 110 of the radar circuit 100. Likewise, the other one of the first antennas 211 and the other one of the second antennas 221 are coupled via a second common receive signal port 136 to a second receive chain 128 of the signal receiver 110.

The antenna device 200 routes a first signal portion 21 of a first receive radar signal 20 from the first antenna 211 that is coupled to the first common receive signal port 135 and a second signal portion 22 of the first receive radar signal 20 from the second antenna 221 that is coupled to the first common receive signal port 135 via the first common receive signal port 135 to the first receive chain 127. The antenna device 200 further routes a first signal portion 26 of a second receive radar signal 25 from the first antenna 211 that is coupled to the second common receive signal port 136 and a second signal portion 27 of the second receive radar signal 25 from the second antenna 221 that is coupled to the second receive signal port 136 via the second common receive signal port 136 to the second receive chain 128.

The first signal portion 21 of the first receive radar signal 20 comprises the fractions of the first signal portions 11, 16 of the first and second transmit radar signals 10, 15 that are received by the first antenna 211 coupled to the first common receive signal port 135. The second signal portion 22 of the first receive radar signal 20 comprises the fractions of the second signal portions 12, 17 of the first and second transmit radar signals 10, 15 that are received by the second antenna 221 coupled to the first common receive signal port 135.

Likewise, the first signal portion 26 of the second receive radar signal 25 comprises the fractions of the first signal portions 11, 16 of the first and second transmit radar signals 10, 15 that are received by the first antenna 211 coupled to the second common receive signal port 136. The second signal portion 27 of the second receive radar signal 25 comprises the fractions of the second signal portions 12, 17 of the first and second transmit radar signals 10, 15 that are received by the second antenna 221 coupled to the second common receive signal port 136.

The first receive chain 127 generates a first radar data signal 123 that represents the first radar signal 20 received from the first common receive signal port 135 and the second receive chain 128 generates a second radar data signal 124 that represents the second radar signal 25 received from the second common receive signal port 136. The signal receiver 110 is connected to the signal processing device 120 and the first and second radar data signal 123, 124 are transferred from the signal receiver 110 to the signal processing device 120.

The first transmit chain 125 and the second transmit chain 126 generate the respective first portions 11, 16 of the first transmit radar signal 10 and the second transmit radar signal 15 having different values of a first separability parameter and they generate the respective second portions 12, 17 of the first transmit radar signal 10 and the second transmit radar signal 15 having different values of a second separability parameter. Using the first separability parameter, the signal processing device 120 is able to separate the parts of the first signal portions 21, 26 of the first and second receive radar signal 20, 25 that originate from the first portion 11 of the first transmit radar signal 10 from the parts of the first signal portions 21, 26 of the first and second receive radar signal 20, 25 that originate from the first portion 16 of the second transmit radar signal 15. Likewise, the signal processing device 120 uses the second separability parameter to separate the parts of the second signal portions 22, 27 of the first and second receive radar signal 20, 25 that originate from the second portion 12 of the first transmit radar signal 10 from the parts of the second signal portions 22, 27 that originate from the second portion 17 of the second transmit radar signal 15.

Additionally, the signal processing device 120 separates the first signal portion 21 and the second signal portion 22 of the first receive radar signal 20 using the separate frequency bands of the first and second signal portions 21, 22 received via the first common receive signal port 135 and the signal processing device 120 separates the first signal portion 26 and the second signal portion 27 of the second receive radar signal 25 using the separate frequency bands of the first and second signal portions 25, 26 received via the second common receive signal port 136.

The first antennas 211 transduce electromagnetic radiation with a first polarization and the second antennas 221 transduce electromagnetic radiation with a second polarization that is orthogonal to the first polarization. For example, the first antennas 211 may transduce electromagnetic radiation with horizontal linear polarization and the second antennas 221 may transduce electromagnetic radiation with vertical linear polarization, or vice versa.

The radar device 1 establishes a total of eight different propagation channels from the antenna device 200 to the target object 3 and back to the antenna device 200 and the signal processing device 120 is configured to separately detect the target reflections propagating via the individual propagation channels, for example for establishing a virtual array in a MIMO configuration. Among the eight different propagation channels, a first set of four propagation channels is operating in the first frequency band and a second set of four propagation channels is operating in the second frequency band.

The radar device 1 establishes a first propagation channel 70 from the first antenna 211 coupled to the first common transmit signal port 130 to the first antenna 211 coupled to the first common receive signal port 135, a second propagation channel 71 from the second antenna 221 coupled to the first common transmit signal port 130 to the second antenna 221 coupled to the first common receive signal port 135, a third propagation channel 72 from the first antenna 211 coupled to the first common transmit signal port 130 to the first antenna 211 coupled to the second common receive signal port 136, and a fourth propagation 73 channel from the second antenna 221 coupled to the first common transmit signal port 130 to the second antenna 221 coupled to the second common receive signal port 136.

The radar device 1 further establishes a fifth propagation channel 74 from the first antenna 211 coupled to the second common transmit signal port 131 to the first antenna 211 coupled to the first common receive signal port 135, a sixth propagation channel 75 from the second antenna 221 coupled to the second common transmit signal port 131 to the second antenna 221 coupled to the first common receive signal port 135, a seventh propagation channel 76 from the first antenna 211 coupled to the second common transmit signal port 131 to the first antenna 211 coupled to the second common receive signal port 136, and an eight propagation channel 77 from the second antenna 221 coupled to the second common transmit signal port 131 to the second antenna 221 coupled to the second common receive signal port 136.

The first set of propagation channels is established by the first signal portions transduced via the first antennas 211. It comprises the first propagation channel 70, the third propagation channel 72, the fifth propagation channel 74 and the seventh propagation channel 76. The second set of propagation channels is established by the second signal portions transduced via the second antennas 221. It comprises the second propagation channel 71, the fourth propagation channel 73, the sixth propagation channel 75 and the eighth propagation channel 77.

With the radar device 1 shown in FIG. 1, the individual antennas 211, 221 may each comprise a single antenna element or several antenna elements. The antenna elements forming a single antenna 211, 221 are then all connected to a single common signal port 130, 131, 135, 136 of the radar circuit 100. Each common signal port 130, 131, 135, 136 is connected to at least a first antenna element that is part of one of the first antennas 211 and a second antenna element that is part of one of the second antennas 221.

Each antenna 211, 221 is connected via a single signal port 130, 131, 135, 136 to the radar circuit 100. The individual signal portions 11, 12, 16, 17, 21, 22, 26, 27 of the radar signals 10, 15, 20, 25 then constitute individual antenna signals, each antenna signal being transduced by a separate antenna 211, 221.

Alternative embodiments of the radar device 1 shown in FIG. 1 may comprise more than two transmit chains 125, 126 and common transmit signal ports 130, 131, for example three transmit chains and three associated transmit signal ports, as well as more than two receive chains 127, 128 and common receive signal ports 135, 136, for example four receive chains and four associated receive signal ports. To each signal port, a first antenna and a second antenna may be coupled and the individual radar signals routed via the individual signal ports may each comprise a first signal portion occupying the first frequency band and a second frequency portion occupying the second frequency band. The antenna device may then be configured to transduce the individual first signal portions as first antenna signals via the first antennas and the individual second signal portions as second antenna signals via the second antennas. The individual first signal portions may differ among each other at least in a first separability parameter and the individual second signal portions may differ among each other at least in the second separability parameter.

Figure 2:
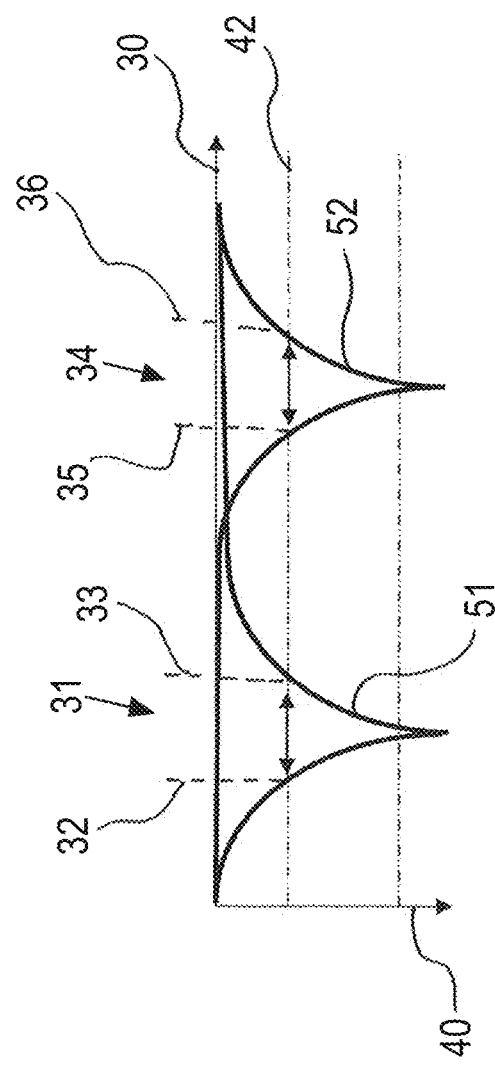
FIG. 2 a transmission of first and second antennas of radar devices according to the present disclosure.

FIG. 2 shows a first transmission 51 of the first antennas 211 versus frequency 30 and a second transmission 52 of the second antennas 221 versus frequency 30. The first transmission 51 exceeds a minimum transmission 42 in the first frequency band 31 between a first minimum frequency 32 and a first maximum frequency 33 and the second transmission 52 exceeds the minimum transmission 42 in the second frequency band 34 between a second minimum frequency 35 and a second maximum frequency 36.

The first minimum frequency 32 may amount to 75.5 GHz and the second maximum frequency 36 may amount to 81.5 GHz. The first maximum frequency 33 may amount to 77.5 GHZ and the second minimum frequency 35 may amount to 79.5 GHz.

As can be seen from FIG. 2, the first frequency band 31 and the second frequency band 34 are separated from each other and do not overlap. The first signal portions 11, 16, 21, 26 of the radar signals 10, 15, 20, 25 processed by the radar circuit 100 of the radar device 1 shown in FIG. 1 occupy the first frequency band 31 and the second signal portions 12, 17, 22, 27 of the radar signals 10, 15, 20, 25 occupy the second frequency band 34. In alternative embodiments of the radar device 1, the frequency bands 31, 34 may alternatively be defined by two separate minimum transmissions that differ from each other.

Figure 3:
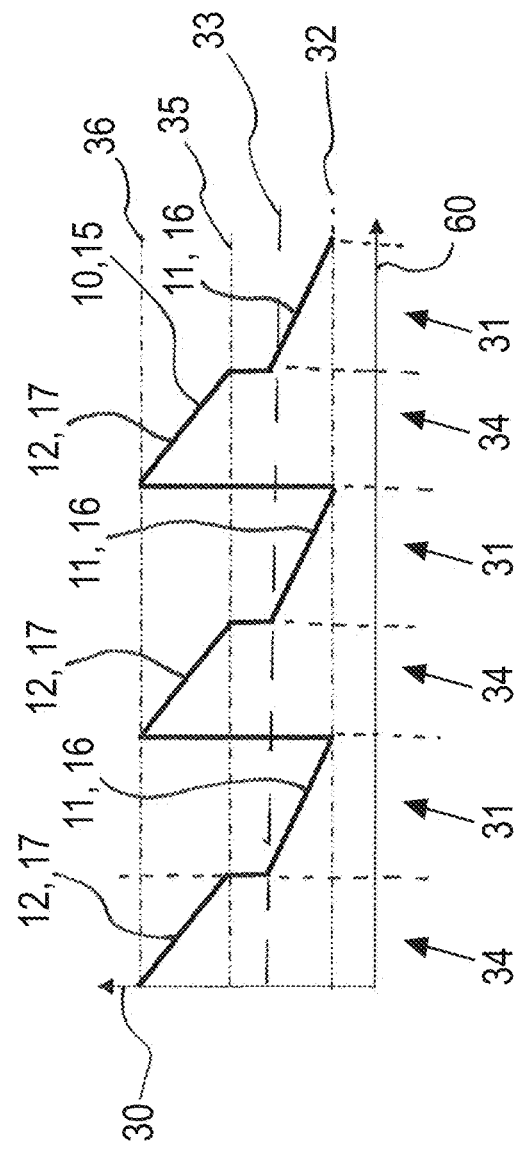
FIG. 3 a time dependence of frequencies of radar signals generated by the radar devices according to the present disclosure.

FIG. 3 shows the frequency 30 of the first radar signal 10 and the second radar signal 15 generated by the signal generator 105 of the radar device 1 shown in FIG. 1 over time 60. The frequency 30 of the radar signals 10, 15 is repeatedly cycled through the second frequency band 34 and the first frequency band 31. In the exemplary embodiment shown in FIG. 3, the frequency 30 of the radar signals 10, 15 is first linearly swept in the second frequency band 34 from the second maximum frequency 36 to the second minimum frequency 35 and is then linearly swept in the first frequency band 31 from the first maximum frequency 33 to the first minimum frequency 32. Subsequently, this cycle or burst is repeated. The frequency 30 of the first and second radar signals 20, 25 measured by the signal receiver 110 has the same time-dependence as the radar signals 10, 15 shown in FIG. 3. Between the second frequency band 34 of the first signal portions 11, 16, 21, 26 and the first frequency band 31 of the second signal portions 12, 17, 22, 27, a frequency gap is located that spans the frequencies between the second minimum frequency 35 and the first maximum frequency 33.

In alternative embodiments, a different frequency sweep may be employed within the first frequency band 31 and/or within the second frequency band 34. For example, the frequency 30 may be swept from lower frequencies to higher frequencies. The frequency sweep may also start with a sweep over the first frequency band 31 instead of starting with the sweep over the second frequency band 34.

Figure 4:
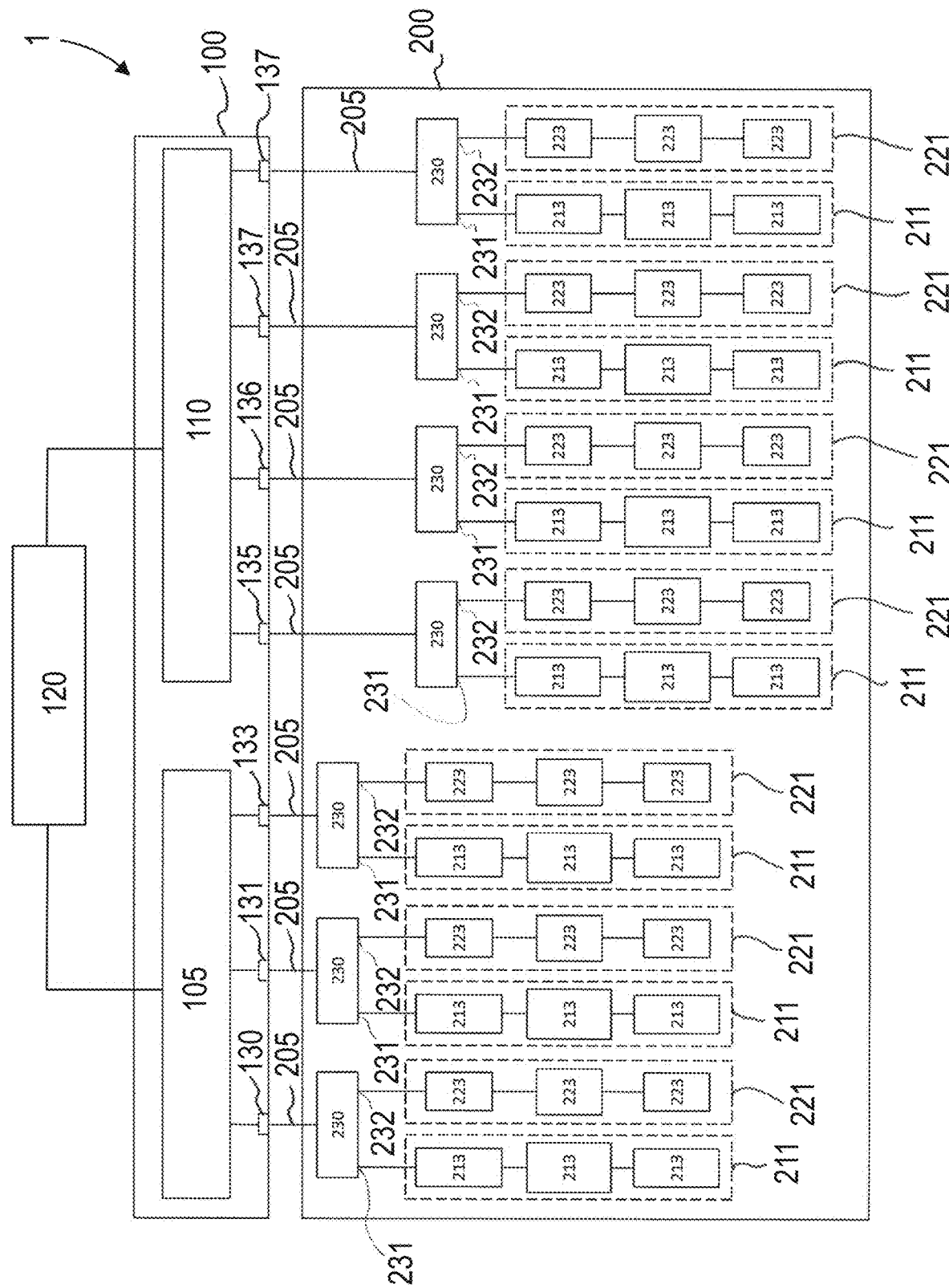
FIG. 4 a second embodiment of a radar device according to the present disclosure.

FIG. 4 shows a second embodiment of the radar device 1 according to the present disclosure. As far as no differences are apparent from the description and the drawings, the radar device 1 of the second embodiment is configured as it is described and shown in connection with the radar device 1 according to the first embodiment shown in FIG. 1 and vice versa.

Besides the first common transmit signal port 130 and the second common transmit signal port 131 shown in FIG. 1, the radar circuit 100 may comprise further common transmit signal ports, for example one further common transmit signal port 133, as shown in FIG. 4. Analogously, the radar circuit 100 may comprise further common receive signal ports, for example two further common receive signal ports 137, as shown in FIG. 4.

Each common signal port 130, 131, 133, 135, 136, 137 is coupled via a common signal line 205 to an individual signal routing device 230. Each signal routing device 230 has a first port 231 and a second port 232. Each first port 231 is coupled to an individual first antenna 211 transducing in the first frequency band 31 and each second port 232 is coupled to an individual second antenna 221 transducing in the second frequency band 34. The first antennas 211 each comprise a set of serially coupled first antenna elements 213 and the second antennas 221 each comprise a set of serially coupled second antenna elements 223.

The signal generator 105 is controlled to generate individual radar signals for every common transmit signal port 130, 131, 133, each radar signal having a first signal portion occupying the first frequency band 31 and a second signal portion occupying the second frequency band 34. The individual first signal portions all differ in a first separability parameter and the individual second signal portions all differ in a second separability parameter.

The signal processing device 120 of the radar device 1 shown in FIG. 4 is configured to evaluate a total of twenty-four propagation channels comprising a first set of twelve propagation channels operating in the first frequency band 31 and a second set of twelve propagation channels operating in the second frequency band 34. The propagation channels of the first set comprise all pairs of one of the first antennas 211 coupled to the common transmit signal ports 130, 131, 133 and one of the first antennas 211 coupled to the common receive signal ports 135, 136, 137. The propagation channels of the second set comprise all pairs of one of the second antennas 221 coupled to the common transmit signal ports 130, 131, 133 and one of the second antennas 221 coupled to the common receive signal ports 135, 136, 137.

Figure 5:
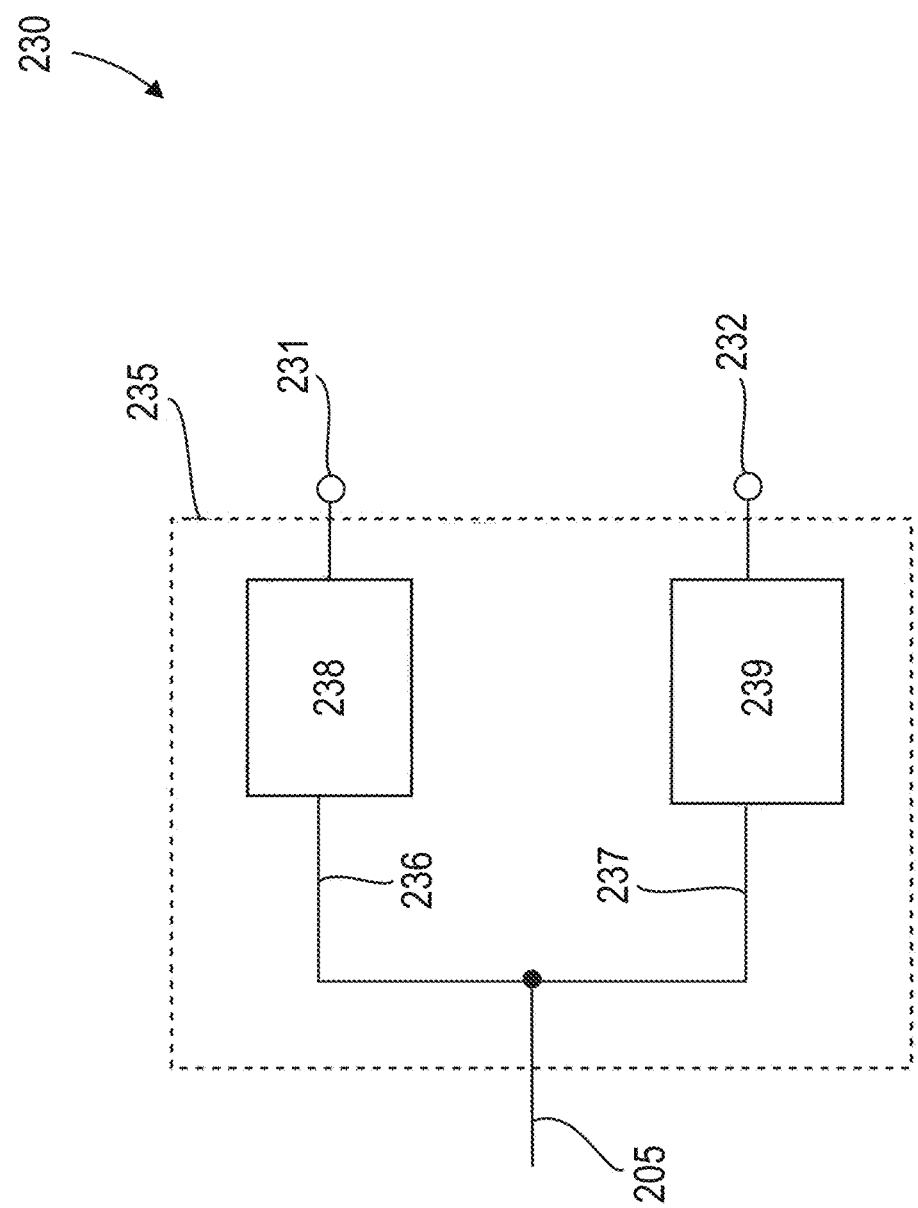
FIG. 5 a signal routing device of the radar device according to the second embodiment.

The signal routing device 230 may be configured as a frequency selective device. FIG. 5 shows an exemplary embodiment of such a frequency selective signal routing device 230. The common signal line 205 is directly and in parallel coupled to a first transmission line segment 236 and a second transmission line segment 237 of a frequency selective section 235 of the signal routing device 230. The first line segment 236 is coupled via a first filter 238 of the frequency selective section 235 to the first port 231 and the second line segment 237 is coupled via a second filter 239 of the frequency selective section 235 to the second port 232.

The first line segment 236 has an electric length of 0° and the second line segment 237 has an electric length of 170°, both at a center frequency that is located between the first minimum frequency 32 and the second maximum frequency 36. The first filter 238 and the second filter 239 are configured as bandpass filters, the first filter 238 having a center frequency that corresponds to the center frequency of the first frequency band 31 and the second filter 239 having a center frequency that corresponds to the center frequency of the second frequency band 34.

Figure 6:
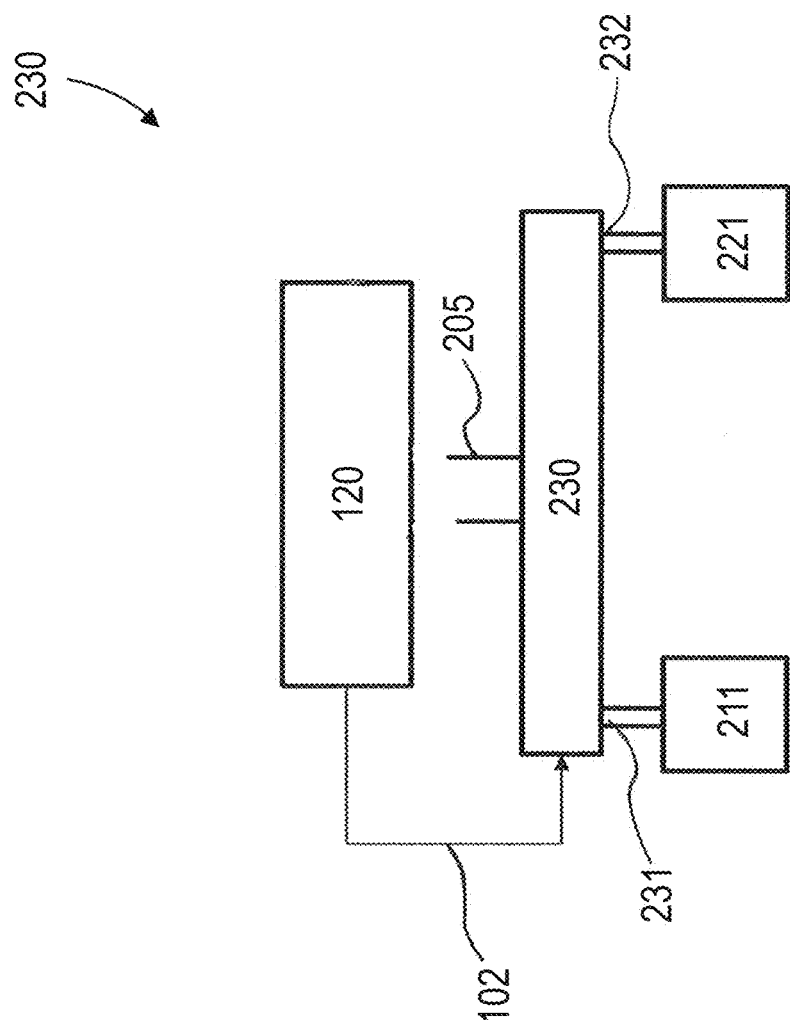
FIG. 6 an alternative embodiment of the signal routing device.

The signal routing device 230 may also be configured as a switching device like it is shown in an exemplary embodiment in FIG. 6. The switching device 23 is connected via a control line 102 to the signal processing device 120 and receives a switch control signal from the signal processing device 120 via the control line 102. Depending on the state of the switch control signal, the signal switching device 230 conductively couples the first signal port 231 or the second signal port 232 to the common signal line 205. The signal processing device 120 is configured to change the state of the switch control signal simultaneously with the control signals 121, 122 determining the frequency of the transmit radar signals 10, 15 generated by the signal generator 105 of the radar circuit 100 so that the first port 231 is conductively coupled to the common signal line 205 when the first portions 11, 16 of the transmit radar signals 10, 15 are routed between the antenna device 200 and the radar circuit 100 and that the second port 232 is conductively coupled to the common signal line 205 when the second portions 12, 17 of the transmit radar signals 10, 15 are routed between the antenna device 200 and the radar circuit 100.

In alternative embodiment, the switching device 23 may be configured to route signals from both the first and second frequency band 31, 34 via both first and second port 231, 232. In this case, the first and second signal portions 11, 12, 16, 17, 21, 22, 26, 27 of the radar signals 10, 15, 20, 25 may span both frequency bands 31, 34. The antenna device 200 may then alternately transduce either the first signal portions 11, 16, 21, 26 or the second signal portions 12, 17, 22, 27 in a time multiplexed manner.

Figure 7:
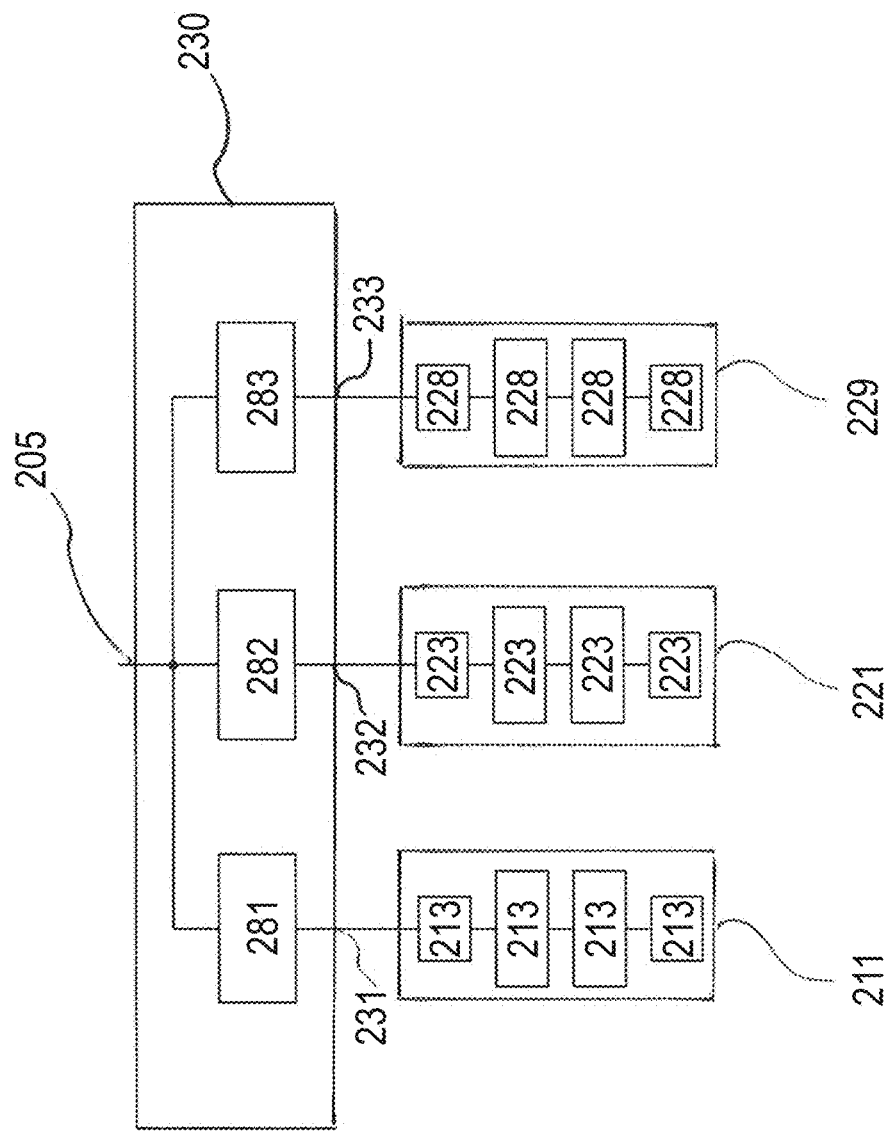
FIG. 7 another alternative embodiment of the signal routing device.

FIG. 7 shows another embodiment of the signal routing device 230. According to this embodiment, the signal routing device 230 comprises a plurality of filters that are directly coupled between the common signal line 205 and the individual antennas coupled to the common signal line 205. The plurality of filters comprises a first filter 281 and a second filter 282. The first filter 281 is coupled between the first signal port 231 leading to antenna elements 213 of the first antenna 211 and the common signal line 205 and the second filter is coupled between the second signal port 232 leading to antenna elements 223 of the second antenna 221 and the common signal line 205.

The first filter 281 configured to pass the first signal portion 11, 16, 21, 26 and to block the second signal portion 12, 17, 22, 27 of the radar signal 10, 15, 20, 25. The second filter 282 is configured to pass at least the second signal portion 12, 17, 22, 27. It may additionally be configured to block the first signal portion 11, 16, 21, 26.

As can be seen from FIG. 7, the signal routing device 230 according to the present disclosure may generally comprise additional signal ports that couple additional antennas or antenna elements of additional antennas to the common signal line and to the common signal port 130, 131, 135, 136 of the radar circuit 100. The signal routing device 213 may then comprise additional filters that only pass one of the additional signal portions of the radar signal and block all other signal portions of the radar signal. For example, the signal routing device 230 may comprise a third port 233 that is coupled to antenna elements 228 of a third antenna 229. The third port 233 is coupled via a third filter 283 to the common signal line 205. The third filter 283 is configured to pass a third signal portion of the radar signal 10, 15, 20, 25 that occupies a third frequency band and to block the first signal portion 11, 16, 21, 26 and/or the second signal portion 12, 17, 22, 27 of the radar signal. Likewise, the antenna elements of the third antenna 229 are configured to transduce the third signal portion.

Analogously to the signal routing device 230 shown in FIG. 7, also the signal routing devices 230 shown in FIGS. 5 and 6 may be coupled between more than two antennas or antenna elements of more than two antennas and the common signal line 205. These signal routing devices 230 may route individual signal portions occupying separate frequency bands to the individual antennas coupled to their signal ports. In general, signal routing devices 230 having separate filters coupled between individual antennas or antenna elements of individual antennas and the common signal line 205 may be used instead of the multiplexers or diplexers described in the present disclosure.

Figure 8:
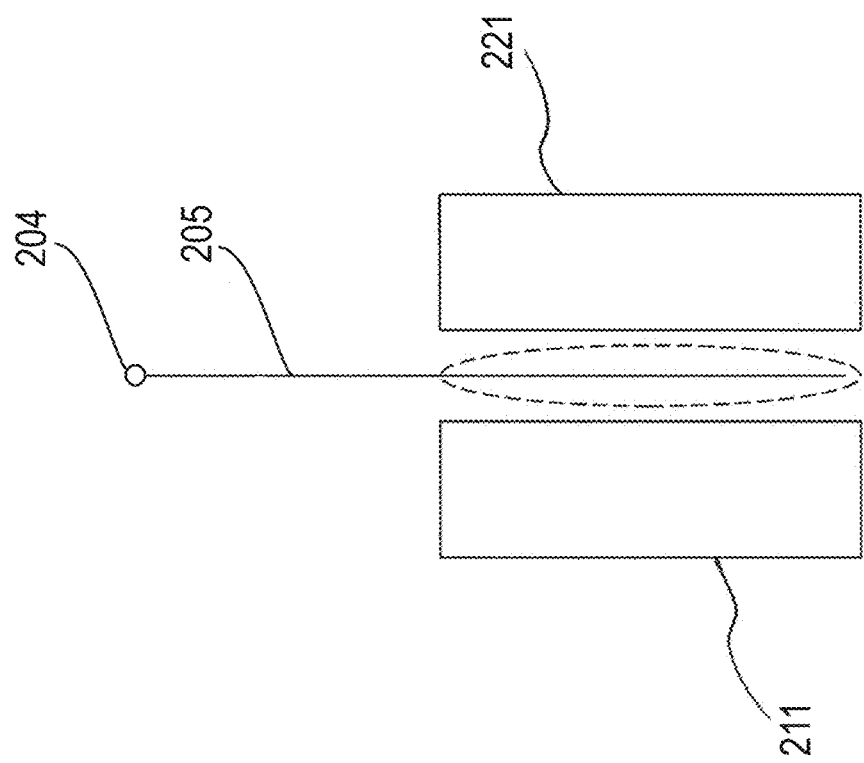
FIG. 8 a first antenna and a second antenna inductively coupled to a common signal port.

FIG. 8 shows a first antenna 211 and a second antenna 221 that are both inductively coupled to a common signal line 205 and a common signal port 204 and that may be used with the antenna devices 200 according to the present disclosure. Inductive coupling between the antennas 211, 221 and the common signal line 205 is achieved by placing the antennas 211, 221 or individual antenna elements of the antennas 211, 221 in the proximity of the common signal line 205 so that the electromagnetic field generated by the signal line 205 couples to the antennas 211, 221. In alternative embodiments, one of the first and second antennas 211, 221 may be conductively coupled to the common signal line 205 and the other one of the antennas 211, 221 may be inductively coupled to the signal line 205 or to the antenna 211, 221 that is conductively coupled to the signal line 205.

Figure 9:
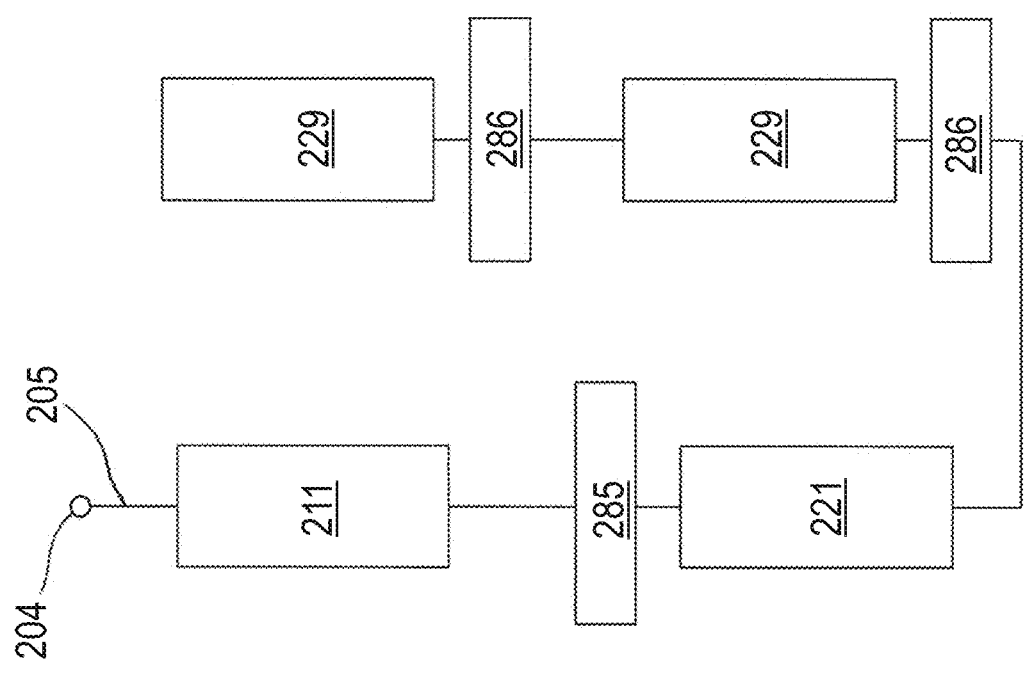
FIG. 9 a first antenna, a second antenna and a further antenna serially coupled via filter elements.

FIG. 9 shows an alternative embodiment of a first antenna 211 and a second antenna 221 that are coupled via a common signal line 205 to a common signal port 204 and that may be used with the antenna devices 200 according to the present disclosure. In this embodiment, the first antenna 211 and the second antenna 221 are serially coupled to the common signal line 205 and a filter element 285 is placed between the first antenna 211 and the second antenna 221. The filter element 285 is configured to block the first signal portion of the radar signal transduced via the common signal port 204 and to pass the second signal portion of the radar signal to the second antenna 221.

As it is shown in FIG. 9, further antennas 229 may be coupled to the common signal line 205 behind the second antenna 221. The individual further antennas 229 may each transduce a separate signal portion of the radar signal. In this case, the filter element 285 passes all signal portions but the first signal portion radiated by the first antenna 211. Additionally, each further antenna 229 is coupled via a further filter element 286 to the preceding antennas 211, 221, 229. The individual further filter elements 286 each pass all signal portions radiated by the further antennas 229 that are coupled to the common signal line 205 behind the respective further filter element 286 and block all signal portions of the radar signal that are radiated by the antennas 211, 221, 229 coupled to the common signal line 205 in front of the respective further filter element 286. Each antenna shown in FIG. 9 may comprise several antenna elements coupled to each other.

Figure 10:
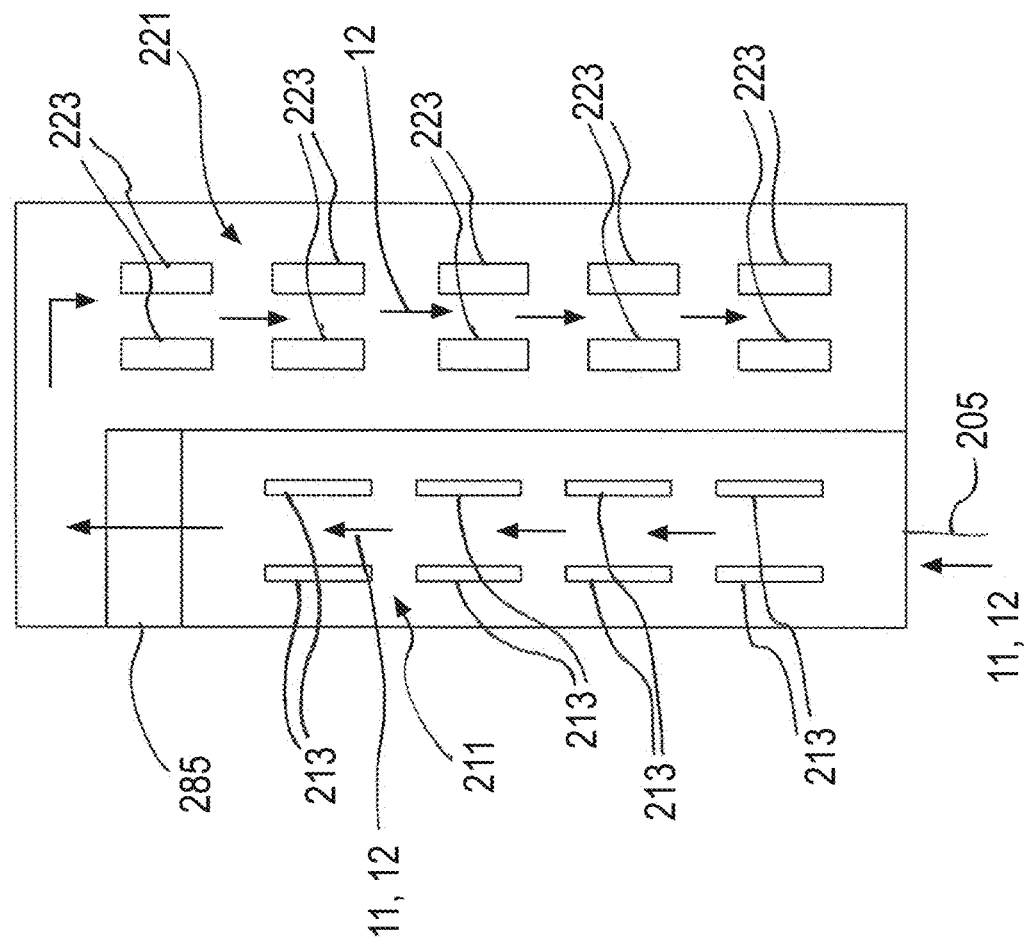
FIG. 10 a first antenna and a second antenna configured as waveguide antennas and serially coupled via a filter element.

FIG. 10 shows an implementation of the serial coupling of the first antenna 211 and the second antenna 221 shown in FIG. 9 using array antennas that are configured as slotted waveguide antennas. The radar signal 10 propagates from the common signal line 205 via the waveguide of the first antenna 211 to the filter element 285, where the first signal portion 11 of the radar signal 10 is blocked and the second signal portion 12 is passed into the waveguide of the second antenna 221. With the antenna device shown in FIG. 10, the first antenna 211 may be configured to only transduce the first signal portion 11 and the second antenna 221 may be configured to only transduce the second signal portion 12.

Figure 11:
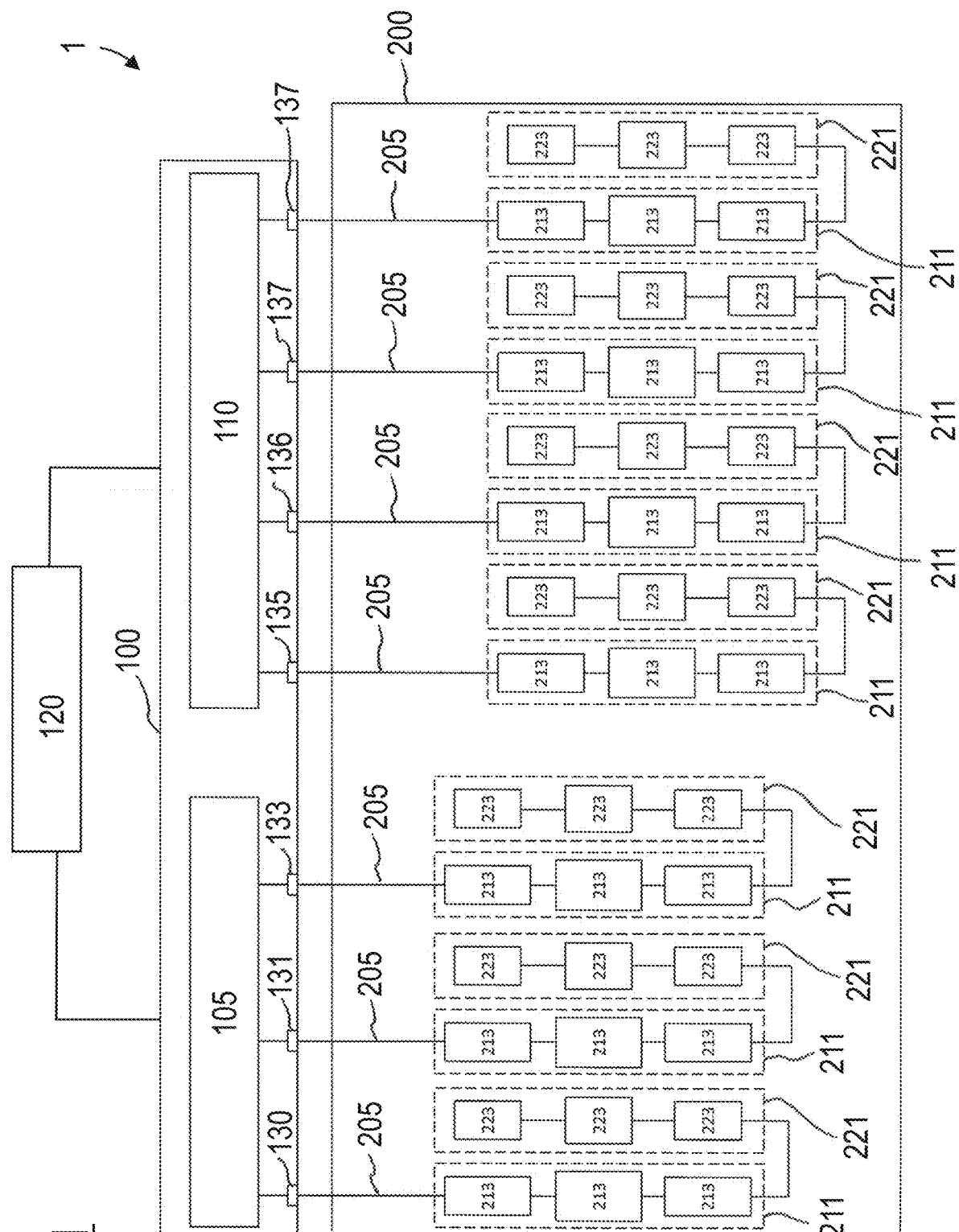
FIG. 11 a third embodiment of the radar device of the present disclosure.

FIG. 11 shows a third embodiment of the radar device 1. As long as no differences are apparent from the description or the figures, the third embodiment of the radar device 1 is configured as it is described for the second embodiment and vice versa.

The third embodiment of the radar device 1 does not comprise the signal routing devices 230 of the second embodiment. Instead, the first antennas 211 and the second antennas 221 are serially coupled to the common signal lines 205. The first antennas 211 are only resonant within the first frequency band 31 and therefore only transduce the first signal portions of the radar signals and the second antennas 221 are only resonant within the second frequency band 34 and therefore only transduce the second signal portions of the radar signals. The first antennas 211 are configured as array antennas that comprise leaky traveling waveguide antenna elements and the second antennas 221 are configured as array antennas that comprise series-fed antenna elements.

Figure 12:
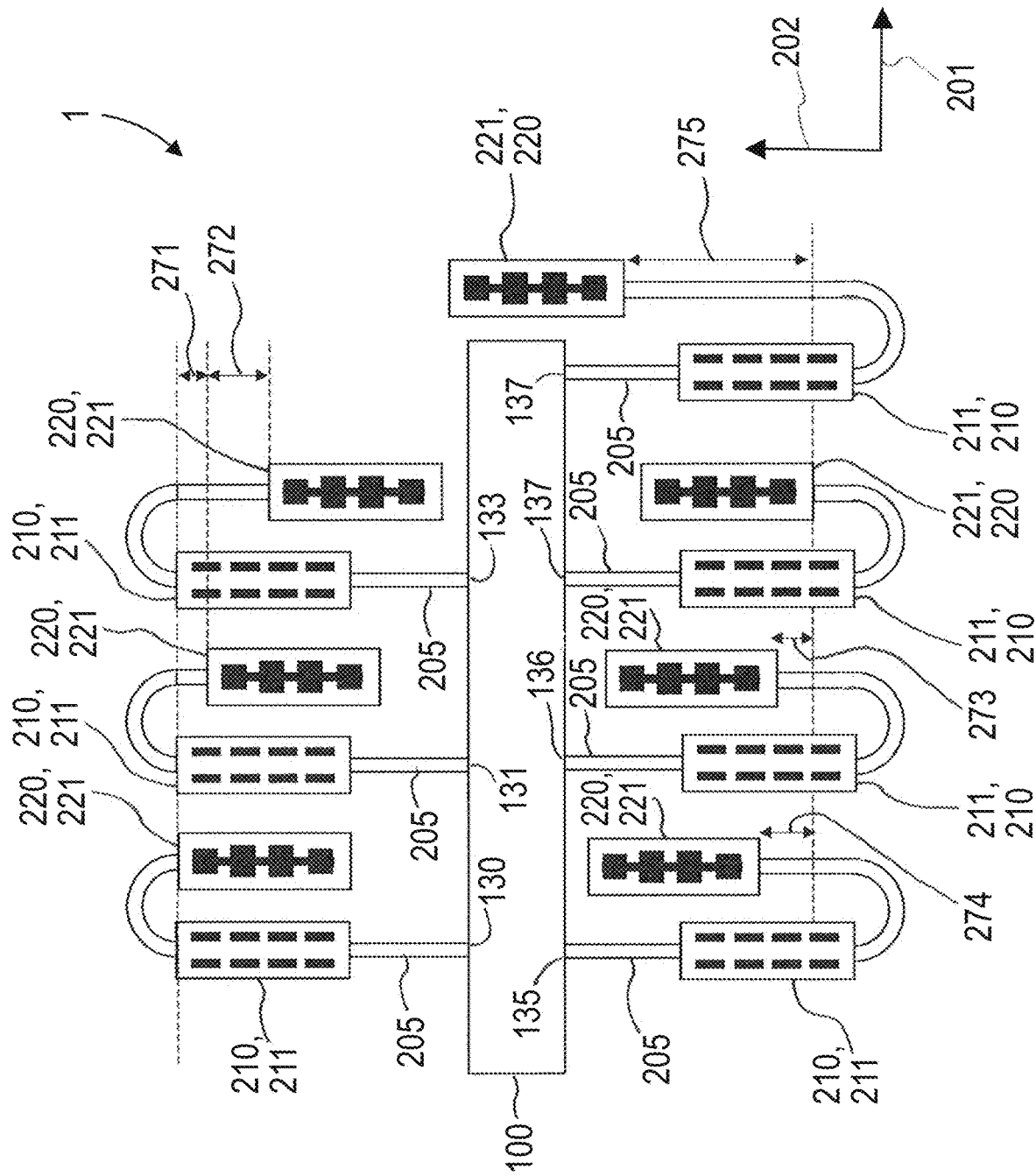
FIG. 12 a placement of antennas of the third embodiment of the radar device.
Figure 13:
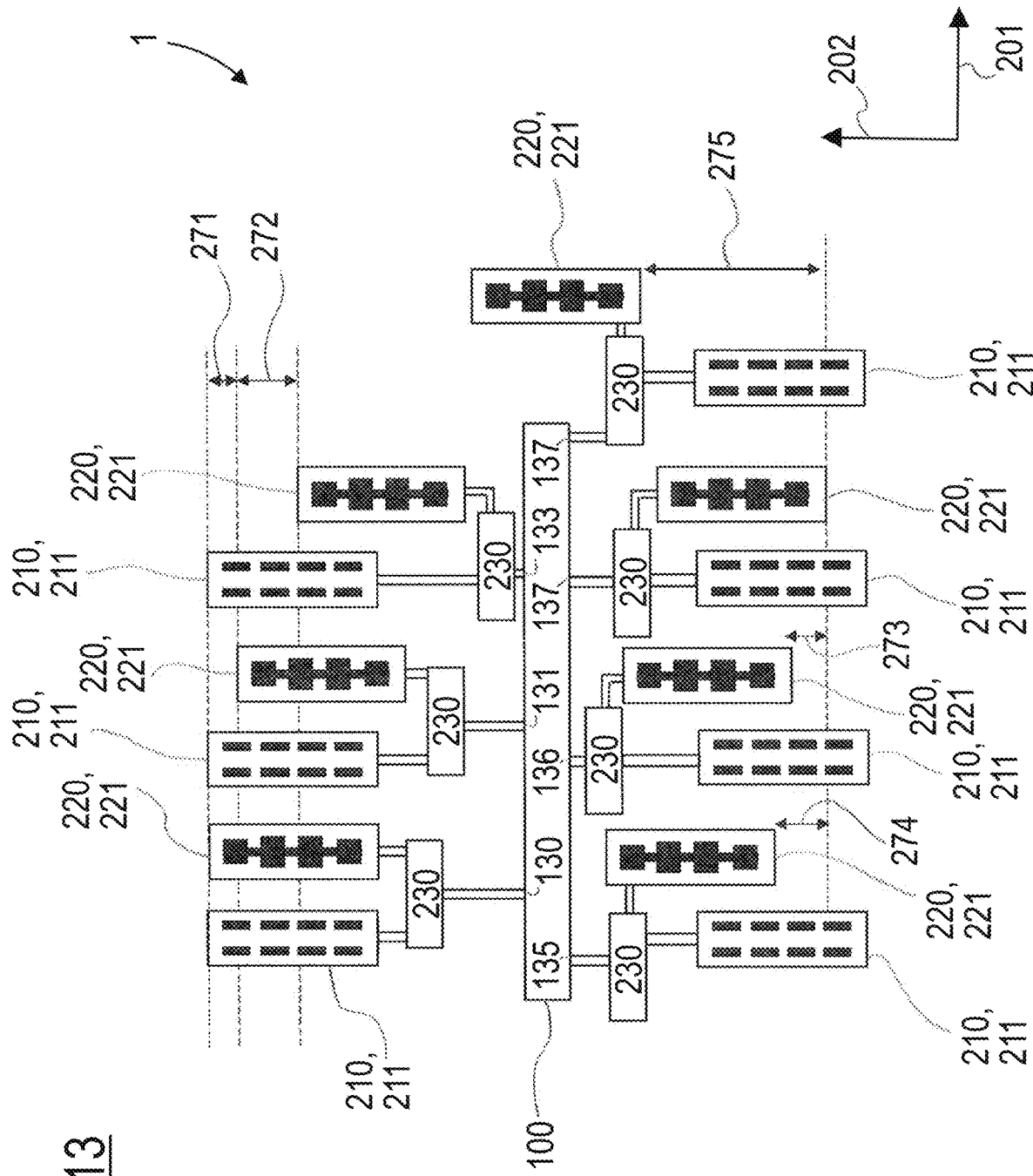
FIG. 13 a placement of antennas of the second embodiment of the radar device.

FIG. 12 shows an exemplary placement of the antennas 211, 221 of the third embodiment of the radar device 1 on a front surface of the antenna device 200. The antennas 211, 221 of the second embodiment of the radar device 1 may be placed in an analogous way, as it is shown in FIG. 13.

The first antennas 211 form a first set 210 of antennas that are arranged in a first MIMO array along a first direction 201 and the second antennas 221 form a second set 220 of antennas that are arranged in a second MIMO array along a second direction 202 that is perpendicular to the first direction 201. The second antennas 221 are displaced with respect to each other along the second direction 202. Although not shown in FIGS. 12 and 13, the first antennas 211 are displaced with respect to each other along the first direction 201 analogously to the displacement of the second antennas 221 along the second direction 202.

The second transmit antennas 221 that are coupled to the common transmit ports 130, 131, 133 have a first transmit distance 271 between a first one and a second one of the second receive antennas 221 and a second transmit distance 272 between the second one and a third one of the second transmit antennas 221. The first transmit distance 271 may, for example, amount to half a wavelength at a selected frequency and the second transmit distance 272 may amount to the wavelength at the selected frequency. The selected frequency may lie within the second frequency band 34 and may amount to the center frequency of the second frequency band 34, for example.

The second receive antennas 221 that are coupled to the common receive ports 135, 136, 137 have a first receive distance 273 between a first one and a second one of the second receive antennas 221, a second receive distance 274 between the second one and a third one of the second receive antennas 221, and a third receive distance 275 between the third one and a fourth one of the second receive antennas 221. The first receive distance 273 may amount to 0.7-times the wavelength at the selected frequency, the second receive distance 274 to 1.5-times times the wavelength at the selected frequency and the third receive distance 275 to 3.5-times the wavelength at the selected frequency.

The signal processing device 120 of the radar device 1 is configured to construct from the first signal portions transduced via the first antennas 211 a first virtual antenna array that extends along the first direction 201 and that resolves targets along the first direction 201 and to construct from the second signal portions transduced via the second antennas 221 a second virtual antenna array that extends along the second direction 202 and resolves targets along the second direction 202. The first and second antenna array each are configured as MIMO arrays.

Although shown in connection with the third embodiment of the radar device 1, the antenna arrangement of FIG. 12 that forms a first virtual array along the first direction 201 and a second virtual array along the second direction 202 may also be realized with the second embodiment of the radar device 1 that employs the signal routing devices 230 and is shown schematically in FIG. 4. The corresponding arrangement of the antennas 211, 221 of the second embodiment of the radar device 1 is shown in FIG. 13. As far as no differences are apparent from the description and the drawings, the antenna placement shown in FIG. 13 is configured as it is described and shown in connection with the antenna placement shown in FIG. 12 and vice versa.

With the antenna devices 200 of the preceding Figures, the first antennas 211 and the second antennas 221 that are coupled to a common signal port 130, 131, 133, 135, 136, 137 of the radar circuit 100 are configured as separate antennas that are positioned at different locations of the antenna device 200 and consequently transduce radiation fields that have phase centers that are shifted with respect to each other. In alternative embodiments, first antennas 211 and second antennas 221 that are coupled to a common signal port 130, 131, 133, 135, 136, 137 may also coincide and be located at the same position on the antenna device 200, as it is exemplarily shown in FIG. 14 in connection with a fourth embodiment of the radar device 1 according to the present disclosure.

As far as no differences are apparent from the description and the drawings, the radar device 1 of the fourth embodiment is configured as it is described and shown in connection with the radar device 1 according to the third embodiment shown in FIG. 11 and vice versa.

In the fourth embodiment of the radar device, 1, the individual first and second antennas 211, 221 that are together coupled to a common signal port 130, 131, 133, 135, 136, 137, 137 are colocated and the corresponding first and second antenna elements 213, 223 coincide. The resulting common antennas 218 are configured as dual-polarized antennas that transduce radiation in the first frequency band 31 with a first polarization and that transduce radiation in the second frequency band 34 with a second polarization. The second polarization may be orthogonal to the first polarization. The first polarization may be linear polarization along a first polarization direction 206 and the second polarization may be linear polarization along a second polarization direction 207 that is perpendicular to the first polarization direction 206.

Figure 14:
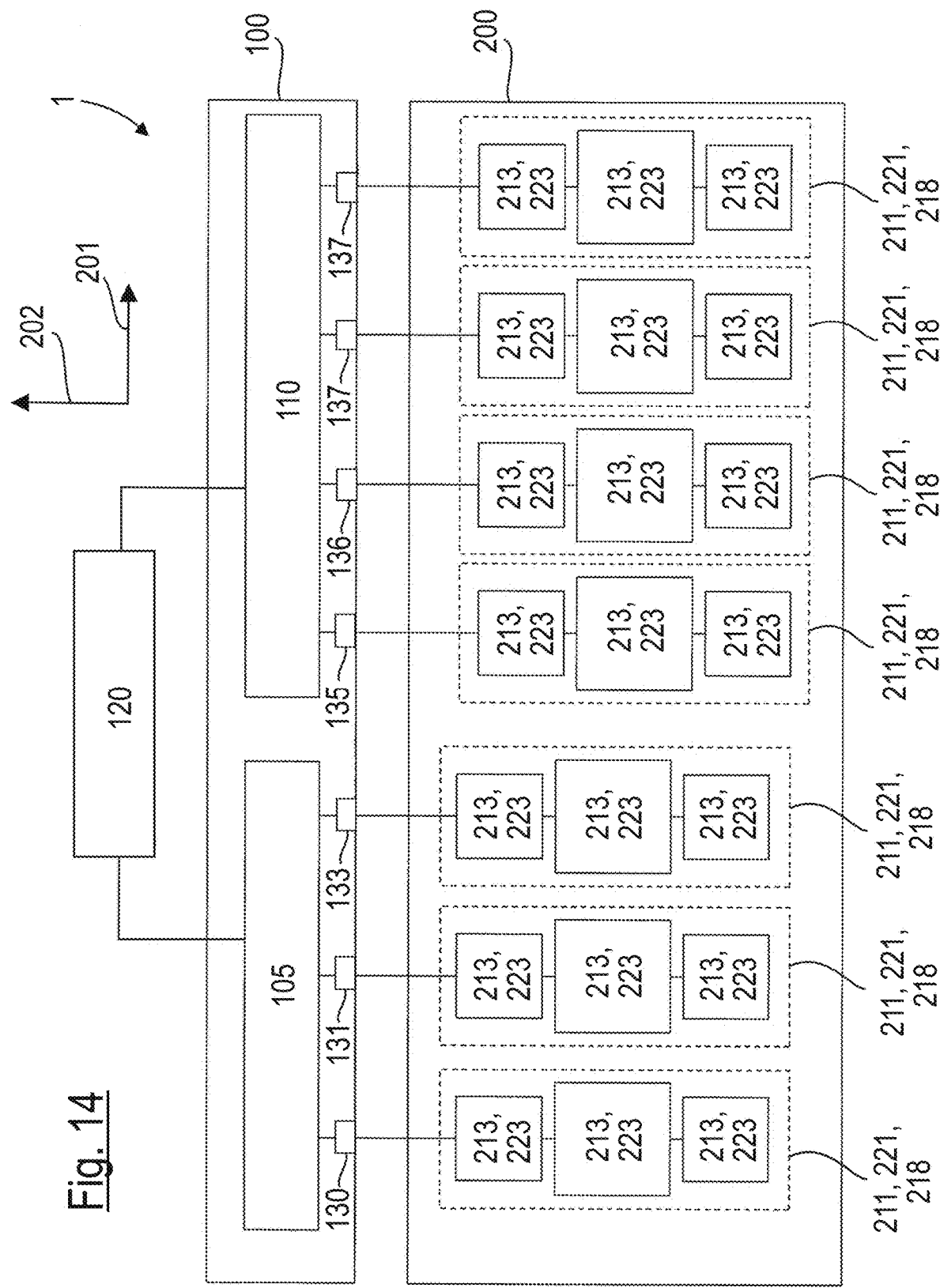
FIG. 14 a fourth embodiment of the radar device of the present disclosure.

With the common antennas 218 shown in FIG. 14, separate phase centers of the first and second antennas 211, 221 coupled to a common signal port 130, 131, 133, 135, 136, 137 are realized by generating the corresponding first and second antenna signals having different frequencies and by configuring the common antennas 218 as series fed array antennas. The different frequencies of the first and second antenna signals then result in the individual antenna elements 213, 223 of the series fed array antennas 218 transducing first and second antenna signal with different amplitudes and phases. This, in turn also results in the first and second antennas 211, 221 of the common antennas 218 having shifted phase centers with respect to each other.

Figure 15:
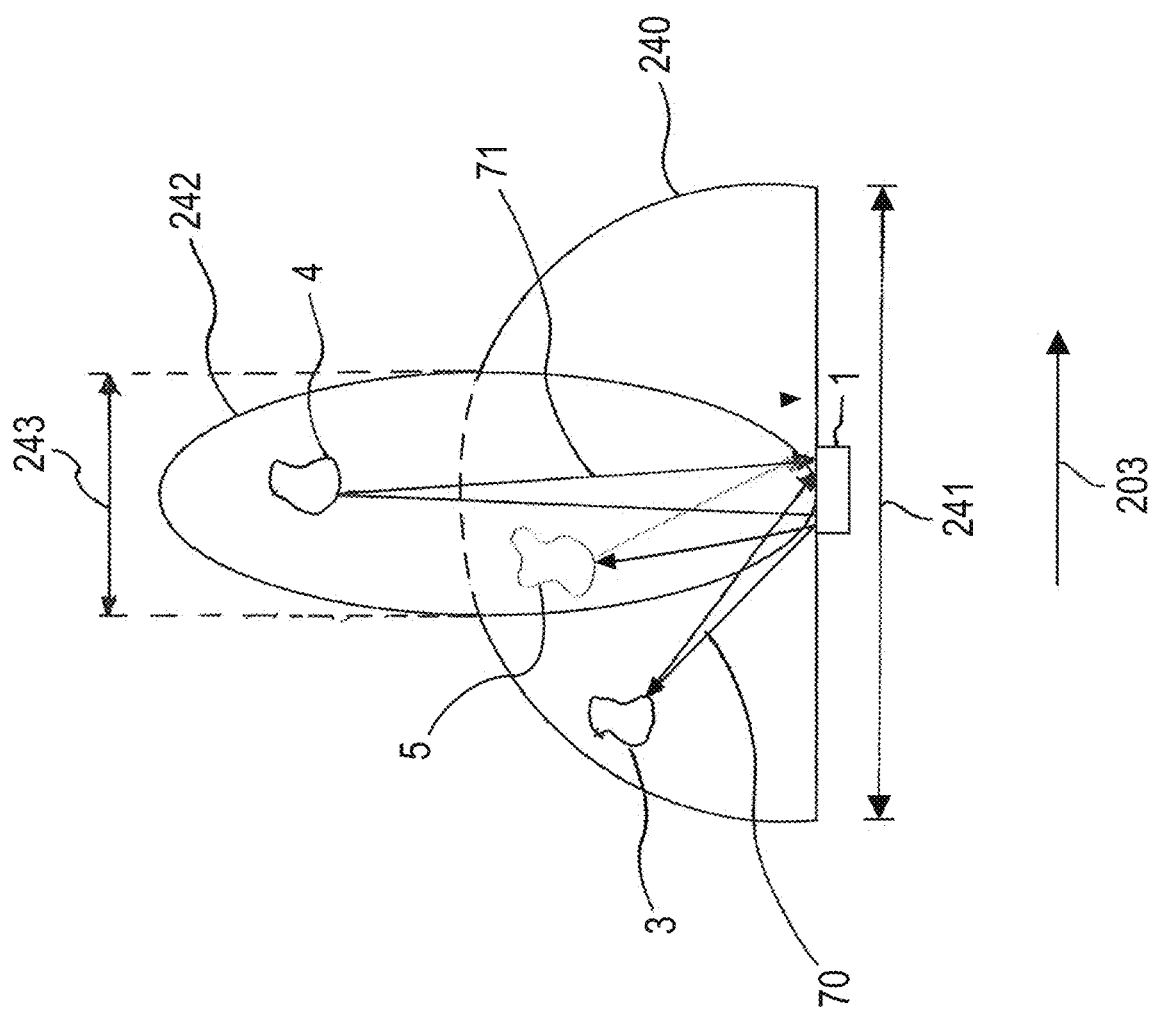
FIG. 15 differing fields of view of first and second antennas of an antenna device according to the present disclosure.

In other alternative embodiments of the radar devices 1 of the present disclosure, the first antennas 211 and the second antennas 221 may be shaped and/or positioned to have fields of view with different extends along a lateral direction. As it is shown in FIG. 15, the first antennas 211 may be positioned to have a first field of view 240 and the second antennas 221 may be positioned to have a second field of view 242. The first field of view 240 has a first extent 241 along the lateral direction 203, which is larger than a second extent 243 of the second field of view 242 along the lateral direction 203. The lateral direction 203 may be, for example, the first direction 201 or the second direction 202 shown in FIGS. 12 to 14.

A first propagation channel 70 between the radar device 1 and a target object 3 that is located inside the first field of view 240 and outside the second field of view 242 comprises a signal path that is established by the first antennas 211 of the radar device 1. Likewise, a second propagation channel 71 between the radar device 1 and a further target object 4 that is located inside the second field of view 242 and outside the first field of view 240 comprises a signal path that is established by the second antennas 221 of the radar device 1. The signal processing device 120 is configured to detect reflections from the target object 3 that are received via the first propagation channel 70 using and analyzing the first signal portions 11, 16, 21, 26 and to detect reflections from the further target object 4 that are received via the second propagation channel 71 by using and analyzing the second signal portions 12, 17, 22, 27. An additional target object 5 that is located inside the first and second field of view 240, 242 is irradiated by both the first antennas 211 and the second antennas 221.

Figure 16:
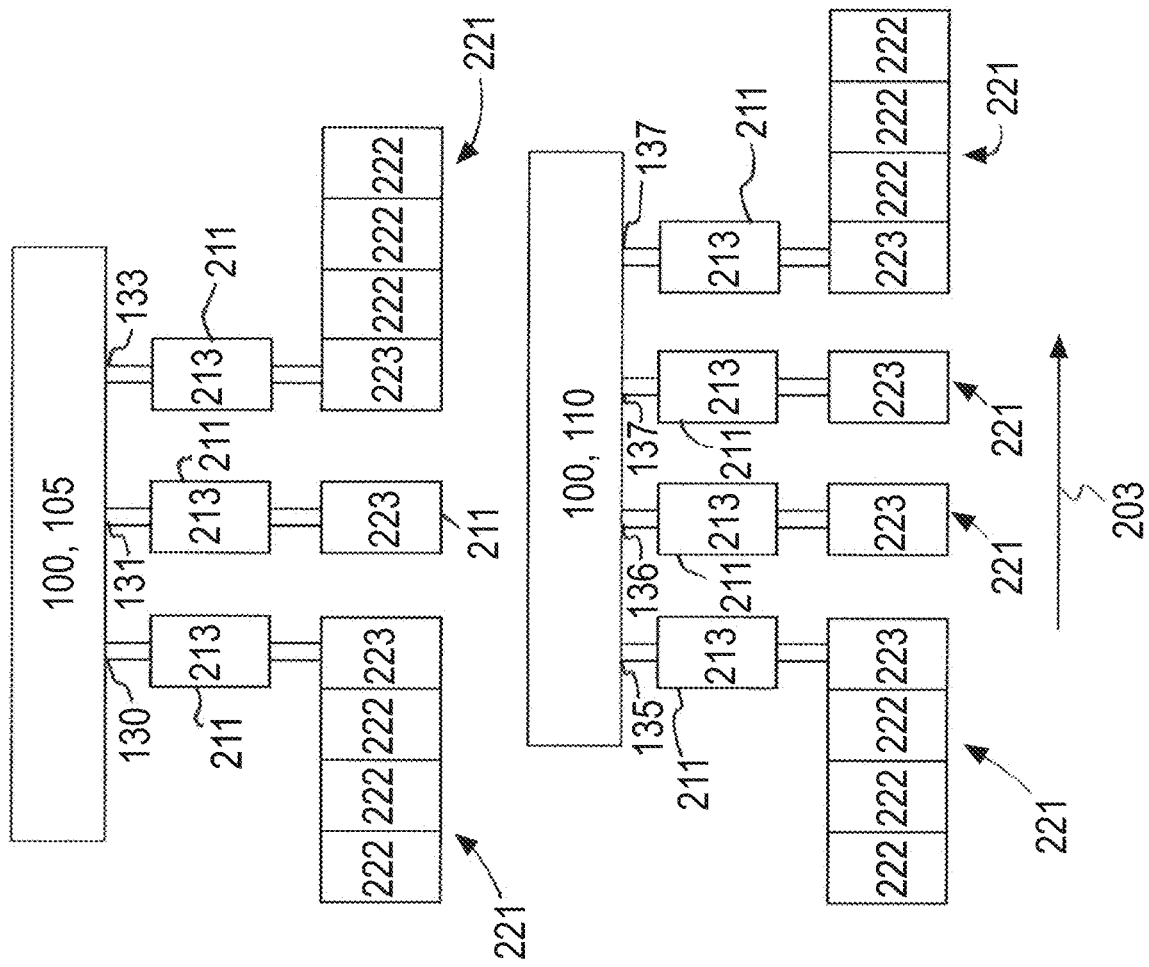
FIG. 16 a placement of the first and second antennas generating differing fields of view.

FIG. 16 shows an exemplary placement of antenna elements 213, 222, 223 of the first and second antennas 211, 221 that realizes the fields of view 240, 242 shown in FIG. 15. The first transmit antennas 211 coupled to the common transmit signal ports 130, 131,133 and the first receive antennas 211 coupled to the common receive signal ports 135, 136, 137 each comprise first antenna elements 213 only. At least some of the second transmit antennas 221 coupled to the common transmit signal ports 130, 131,133 and at least some of the second receive antennas 221 coupled to the common receive signal ports 135, 136, 137, namely the second transmit antennas 211 and second receive antennas 221 positioned at the outer sides of the arrangements of second antenna elements 223 in the lateral direction 203, comprise second antenna elements 223 as well as additional antenna elements 222. The additional antenna elements 222 are placed at the outer sides of the second antenna elements 223 in the lateral direction 203.

The additional antenna elements 222 may be passive elements that have no conductive coupling to the common signal ports 130, 131, 133, 135, 136, 137 of the radar circuit 100. Alternatively, they may be active elements that actively transduce radar signals that are routed via the common signal ports 130, 131, 133, 135, 136, 137. For example, the additional antenna elements 222 may be serially coupled to the second antennas 221 located at the outer positions of the second antennas 221 and may transduce in the second frequency band 34 only. Alternative embodiments of the first and second antennas 211, 221 shown in FIG. 16 may feature additional antenna elements 222 positioned at the sides of all second antennas 223.

Figure 17:
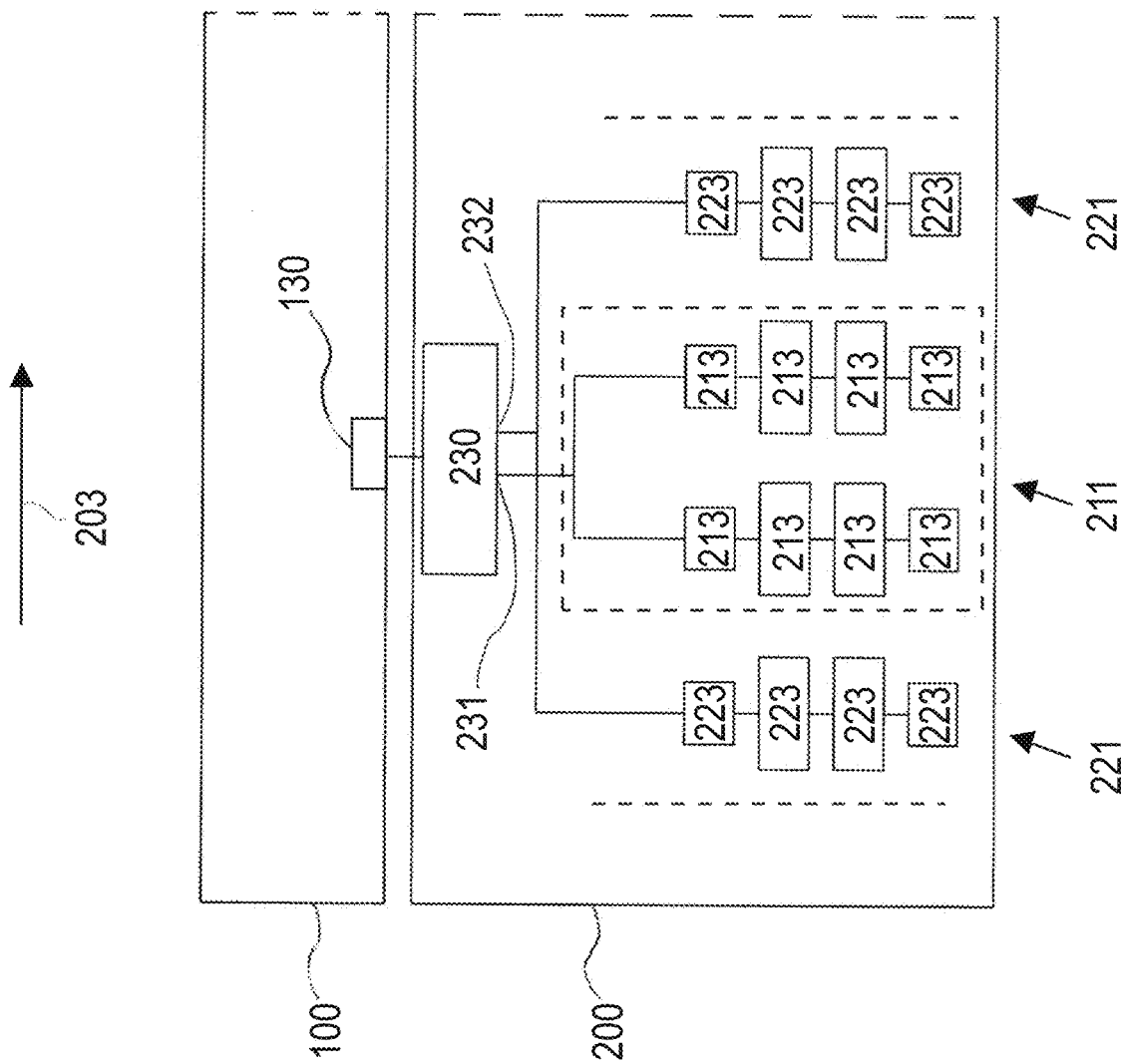
FIG. 17 an alternative placement of the first and second antennas generating differing fields of view.

FIG. 17 shows another exemplary placement of the antenna elements 213, 223 of first and second antennas 211, 221 that realizes the fields of view shown in FIG. 15. The first antenna 211 has two sets of serially coupled first radiating elements 213 that are coupled in parallel to the first signal port 131 of the signal routing device 230. Likewise, the second antenna 221 has two sets of serially coupled second radiating elements 223 that are coupled in parallel to the second signal port 132 of the signal routing device 230. The sets of serially coupled first radiating elements 213 are placed next to each other in the lateral direction 203 and the two sets of serially coupled second radiating elements 223 are placed on both sides of the sets of first radiating elements 213 in the lateral direction 203.

In addition to the second antenna elements 223, the second antenna 221 also comprises the first antenna elements 213 and the first antenna elements 213 are configured to transduce both in the first frequency band 31 and in the second frequency band 34. The signal routing device 230 is configured to route the first signal portion 11 of the radar signal 10 only between the first antenna elements 213 and the common signal port 130 and to route the second signal portion 221 of the radar signal 10 between the common signal port 130 and both the second antenna elements 223 and the first antenna elements 213. Consequently, the antenna device 200 transduces radar signals in the first frequency band 31 only via the first radiating elements 213 and it transduces radar signals in the second frequency band 34 via both the first radiating elements 213 and the second radiating elements 223.

The first radiating elements 213 and the second radiating elements 223 are arranged in a way that the first radiating elements 213 form a first antenna array and that the second radiating elements 223 together with the first radiating elements 213 form a second antenna array with a narrower beam solid angle than the first antenna array. The first antenna array and/or the second antenna array may be configured as phased arrays.

In all embodiments of the radar device 1 according to the present disclosure, further antennas may be coupled to the individual common signal ports 130, 131, 133, 135, 135, 136, 137 besides the first antennas 211 and the second antennas 221. The antenna device 200 may then transduce electromagnetic radiation via the individual antennas in mutually separate frequency bands so that mutually separate signal portions of the radar signals routed via the common signal ports 130, 131, 133, 135, 135, 136, 137 may each be transduced via a specific individual antenna coupled to the respective signal port 130, 131, 133, 135, 135, 136, 137. For example, the signal routing devices 230 shown in FIGS. 4, 5, 6, 7 and 13 and 17 all may have an additional port for each further antenna coupled to the respective common signal port 130, 131, 133, 135, 135, 136, 137. Also, more than two antennas 211, 221 may be proximity coupled to the common signal line 205 shown in FIG. 8 and more than two antennas 211, 221 may be serially coupled to the common signal lines 205 shown in FIGS. 10, 11, 12 and 16.

The radar devices 1 described in connection with the previous Figures are configured as distance sensing radar devices that employ frequency modulated continuous wave radar signals, for example the frequency modulated radar signals 10, 15 shown in FIGS. 2 and 3. The signal processing devices 120 of the radar devices 1 are configured to jointly process the first and second radar signals 10, 15, 20, 25 and to use both the first and second frequency band 31, 34 to determine the distance to target objects that are located within a common field of view 240, 242 of both the first and second antennas 211, 221, such as the additional target object 5 shown in FIG. 15.

Figure 18:
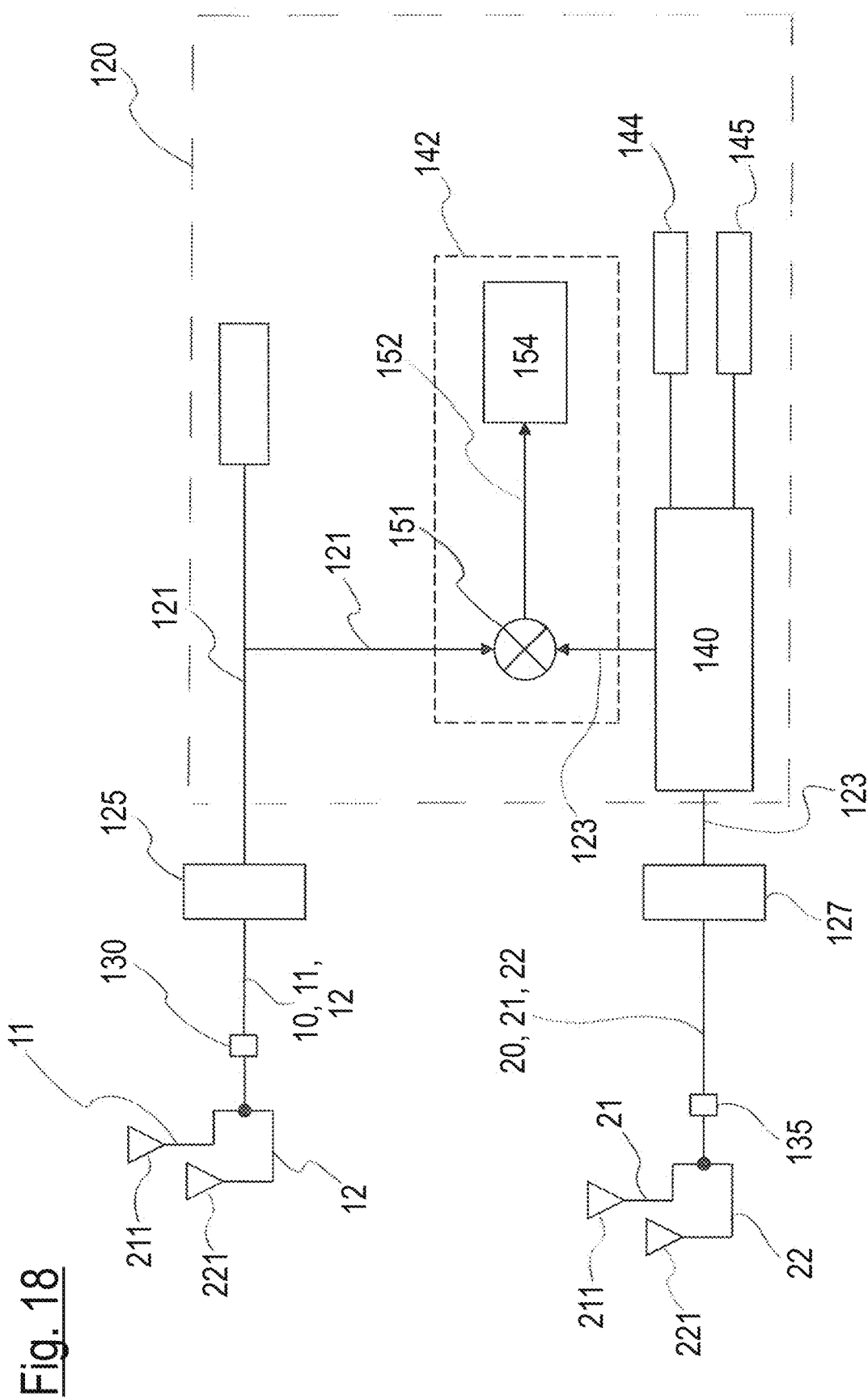
FIG. 18 a signal processing device for the radar devices according to the present disclosure.

FIG. 18 schematically shows a signal processing device 120 that may be used with the radar devices 1 of the present disclosure and the radar signals 10, 20 shown in FIG. 3. The signal processing device 120 is configured to jointly process the signal portions 11, 12 of the first transmit radar signal 10 that are transduced via transmit antennas 211, 221 coupled to a first common transmit signal port 130 together with the signal portions 21, 22 of the first receive radar signal 20 that are transduced via receive antennas 211, 221 coupled to a first common receive signal port 135. After receiving the first receive radar signal 20 containing the first signal portion 21 and the second signal portion 22 via the first common receive signal port 135, a first receive chain 127 generates a first radar data signal 123 representing the first and second signal portion 21, 22.

The first radar data signal 123 is received by a splitting module 140 that is configured to separate the portion of the first radar data signal 123 that represents the first signal portion 21 from the portion that represents the second signal portion 22. The data representing the first signal portion 21 is evaluated by a first evaluation module 144 to evaluate reflection via a first propagation channel 70 shown in FIG. 1 and the data representing the second signal portion 22 is evaluated by a second evaluation module 145 that evaluates reflection via the third propagation channel 72 shown in FIG. 1. Additionally, the splitting model 140 routes all data corresponding to the first and second signal portions 21, 22 received from the receive chain 127 to a ranging module 142. The ranging module 142 is configured to jointly process the data from the first and second signal portions 21, 22 to determine the distance to the target object 5 irradiated by the antenna device 200.

For determining the distance to the target object 5 from the signal portions 21, 22 of the receive radar signal 20, the ranging module 142 is configured to determine a phase shift of the receive radar signal 20 that is transduced via the receive antennas 211, 221 with respect to the transmit radar signal 10 that is transduced via the transmit antennas 211, 221. To this end, the ranging module 142 comprises a mixing module 151 that mixes the transmit radar signal 10 containing the first and second signal portion 11, 12 with the receive radar signal 20 containing the first and second signal portions 21, 22 to generate an intermediate signal 152 at an intermediate frequency that equals the instantaneous frequency difference between the first receive radar signal 20 and the first transmit radar signal 10. The radar circuit may employ the linear frequency sweeps shown in FIG. 3, in which case the intermediate frequency is constant over time.

The frequency of the intermediate signal 152 is a measure for the phase shift that the first radar signal acquires upon reflection at the target object. To determine the distance of the target object, the ranging module 142 comprises a measurement module 154 that measures the intermediate frequency and determines the target distance from the measured intermediate frequency. For measuring the target distance, the measurement module 154 may perform a Fourier transform, for example a fast Fourier transform (FFT), on the intermediate signal 152. Since the minimum resolvable frequency difference is given by the bandwidth of the intermediate signal 152 and thus the bandwidth of the signals used to generate the intermediate signal 152, jointly processing the first and second signal portions 21, 22 increases the resolution of the ranging module 142 compared to a single evaluation of only the first or second signal portion 21, 22.

With the signal processing device 120 shown in FIG. 18, the splitting module 140, the evaluation modules 144, 145, the ranging module 142, the mixing module 151 and/or the measurement module 154 may be realized by software modules or software functions implemented on one or several logic units of the signal processing device 120. The individual modules then process the data signals 121, 123 representing the radar signals 10, 20. Alternatively, the splitting module 140, the mixing module 151, the evaluation modules 144, 145, the ranging module 142 and/or the measurement module 154 may be integrated in the receive chain 127. These modules may then be configured to directly process all signal portions 21, 22 of the radar signal 20 at the radar frequencies.

With all radar devices 1 of the present disclosure, the first antennas 211 may have the first transmission 51 and the second antennas 221 have the second transmission 52 shown in FIG. 2. The radar signals routed via the common signal ports 130, 131, 133, 135, 136, 37 may then vary in frequency 30 over time 60 as shown in FIG. 3. However, since the frequency sweep within the first and second frequency bands 31, 34 does not cover the entire bandwidth between the first minimum frequency 32 and the second maximum frequency 36, the radar devices 1 cannot use the entire bandwidth between the first minimum frequency 32 and the second maximum frequency 36 for distance sensing applications.

Figure 19:
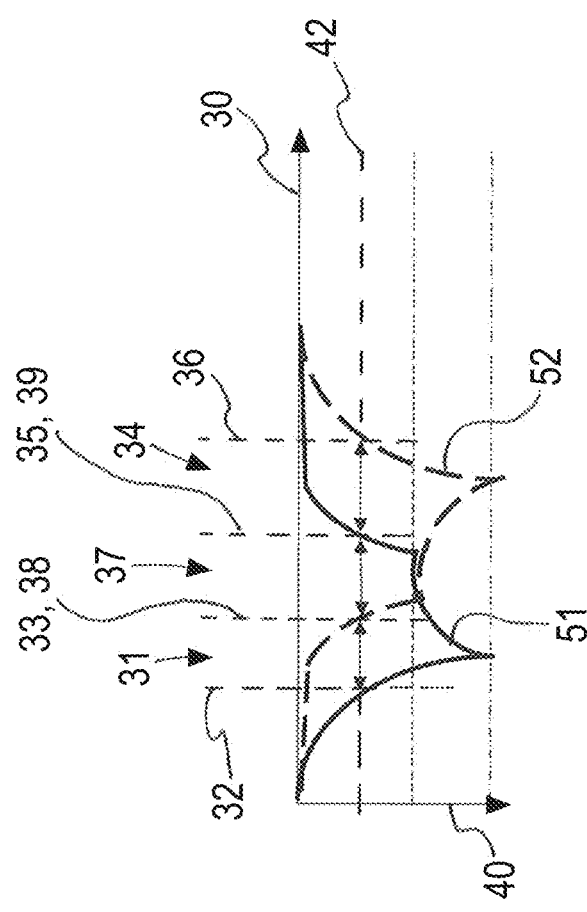
FIG. 19 an alternative transmission of first and second antennas for radar devices according to the present disclosure.

In alternative embodiments of the radar devices 1 according to the present disclosure, the first transmission 51 of the first antennas 211 and the second transmission 52 of the second antennas 221 are configured as shown in FIG. 19. In the first frequency band 31, only the first transmission 51 is larger than the minimum transmission 42, while in the second frequency band 34, only the second transmission 52 is larger than the minimum transmission 42. In a third frequency band 37, which is located in between the first frequency band 31 and the second frequency band 34, both the first transmission 51 and the second transmission 52 are larger than the minimum transmission 42.

Therefore, only the first antennas 211 and not the second antennas 221 transduce in the first frequency band 31, while in the second frequency band 34 only the second antennas 221 and not the first antennas 211 transduce. In the third frequency band 37, the first transmissions 51 of the first antennas 211 and the second transmissions 52 of the second antennas 221 overlap and both the first antennas 211 and the second antennas 221 transduce in the third frequency band 37.

The first, second and third frequency bands 31, 34, 37 directly join with each other so that the first maximum frequency 33 equals a third minimum frequency 38 of the third frequency band 37 and the second minimum frequency 35 equals a third maximum frequency 39 of the third frequency band 37. With the transmissions 51, 52 shown in FIG. 19, the antenna device 1 continuously transduces over the combined frequency band between the first minimum frequency 32 of the first frequency band 31 and the second maximum frequency 34 of the second frequency band 34.

Figure 20:
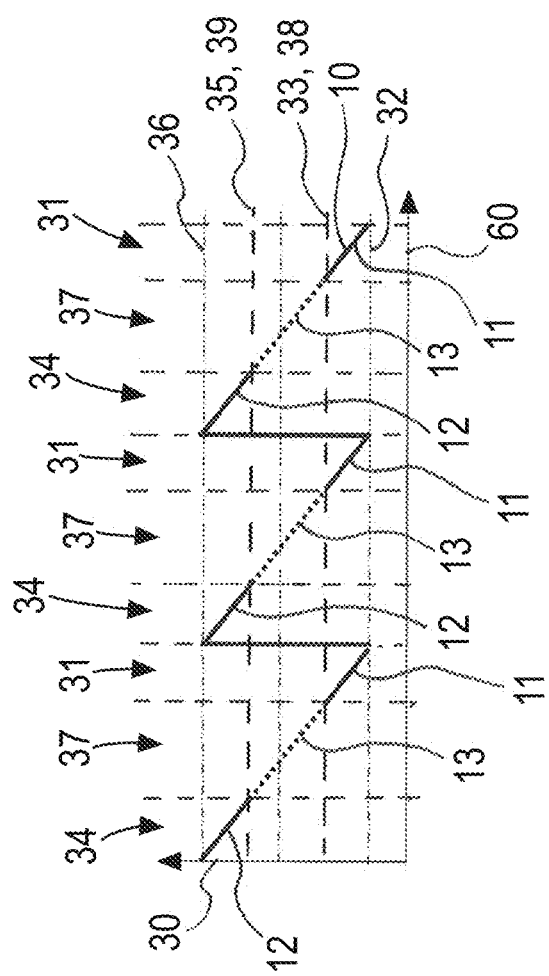
FIG. 20 bursts of a radar signal that may be used with antennas having the transmissions shown in FIG. 19.

FIG. 20 shows individual bursts of a radar signal 10 routed via the common signal port to or from the first and second antennas 211, 221 having the transmissions 51, 52 shown in FIG. 19. The radar signal 10 comprises continuous linear frequency sweeps from the second maximum frequency 34 down to the first minimum frequency 32. These frequency sweeps span the first signal portion 11 occupying the first frequency band 31, a third signal portion 13 occupying the third frequency band 37 and the second signal portion 12 occupying the second frequency band 34. The frequency sweeps all have the same slope within the individual frequency bands 31, 34, 37. Target objects that are located in the common field of view 240, 242 of the first antennas 211 and the second antennas 221 are irradiated with electromagnetic radiation spanning the complete frequency band between the first minimum frequency 32 and the second maximum frequency 34.

With the bursts shown in FIG. 20, the signal processing device 120 may use the first, second and third frequency bands 31, 34, 37 for determining the distance to the target object. Additionally, it may only use the first signal portions 11, 16, 21, 26 of the radar signals 10, 15, 20, 25 that occupy the first frequency band 31 to detect reflections via the first propagation channels and it may only use the second signal portions 12, 17, 22, 27 of the radar signal 10, 15, 20, 25 that occupy the second frequency band 34 to detect reflections via the second propagation channels.

With the radar devices 1 of the previous Figures, the individual antennas 211, 221 are each coupled to a single signal port 130, 131, 133, 135, 136, 137. The first and second signal portions 11, 12, 16, 17, 21, 22, 26, 27 of the individual radar signals 10, 15, 20, 25 then constitute separate antenna signals representing the radiation fields of the individual antennas 211, 221. The antenna signals are entirely routed as the separate signal portions 11, 12, 16, 17, 21, 22, 26, 27 over a single port 130, 131, 133, 135, 136, 137 of the radar circuit 100.

The first and second antennas 211, 221 shown in FIGS. 1, 4, 7 to 13 and 16 are each placed at separate locations on the antenna device 200 and therefore have phase centers located at different positions. Consequently, these antennas 211, 221 radiate the first signal portion 11, 16, 21, 26 and the second signal portion 12, 17, 22, 27 from different physical locations on the antenna device 200.

The first and second antennas 211, 221 shown in FIGS. 14 and 17 have co-located phase centers that are positioned at the same location on the antenna device 200 and radiate the first signal portion 11, 16, 21, 26 and the second signal portion 12, 17, 22, 27 from the same physical location. While the first and second antennas 211, 221 of the radar device 1 shown in FIG. 14 that are coupled to the same common signal port 130, 131, 133, 135, 136, 137 comprise the same set of dual-frequency antenna elements 213, 223, the individual first and second antennas 211, 221 of the radar device shown in FIG. 17 that are coupled to the common signal port 130 have different sets of antenna elements 213, 223. The antenna elements 213, 223 are arranged to generate co-located phase centers of the first and second antenna 211, 221, whereby these phase centers are positioned at the center between the two sets of serially coupled antenna elements 213 of the first antenna 211.

The radar devices 1 where first and second antennas 211, 221 coupled to a common signal port 130, 131, 133, 135, 136, 127 have separate phase centers may use the separate phase centers to establish different propagation channels and to form a virtual antenna array, such as a MIMO array, from the individual propagation channels. For example, the processing unit of these radar devices 1 may use the location of first phase centers of the first antennas 211 as first antenna positions and the location of second phase centers of the second antennas 221 as second antenna positions. The locations of the corresponding phase centers thereby correspond to the phase centers of the radiation patterns associated with the antennas 211, 221. The angular position of a target object may then be determined by evaluating the phase shifts that the individual radar signals acquire when propagating via the different propagation channels established by the spatially separated antennas.

Figure 21:
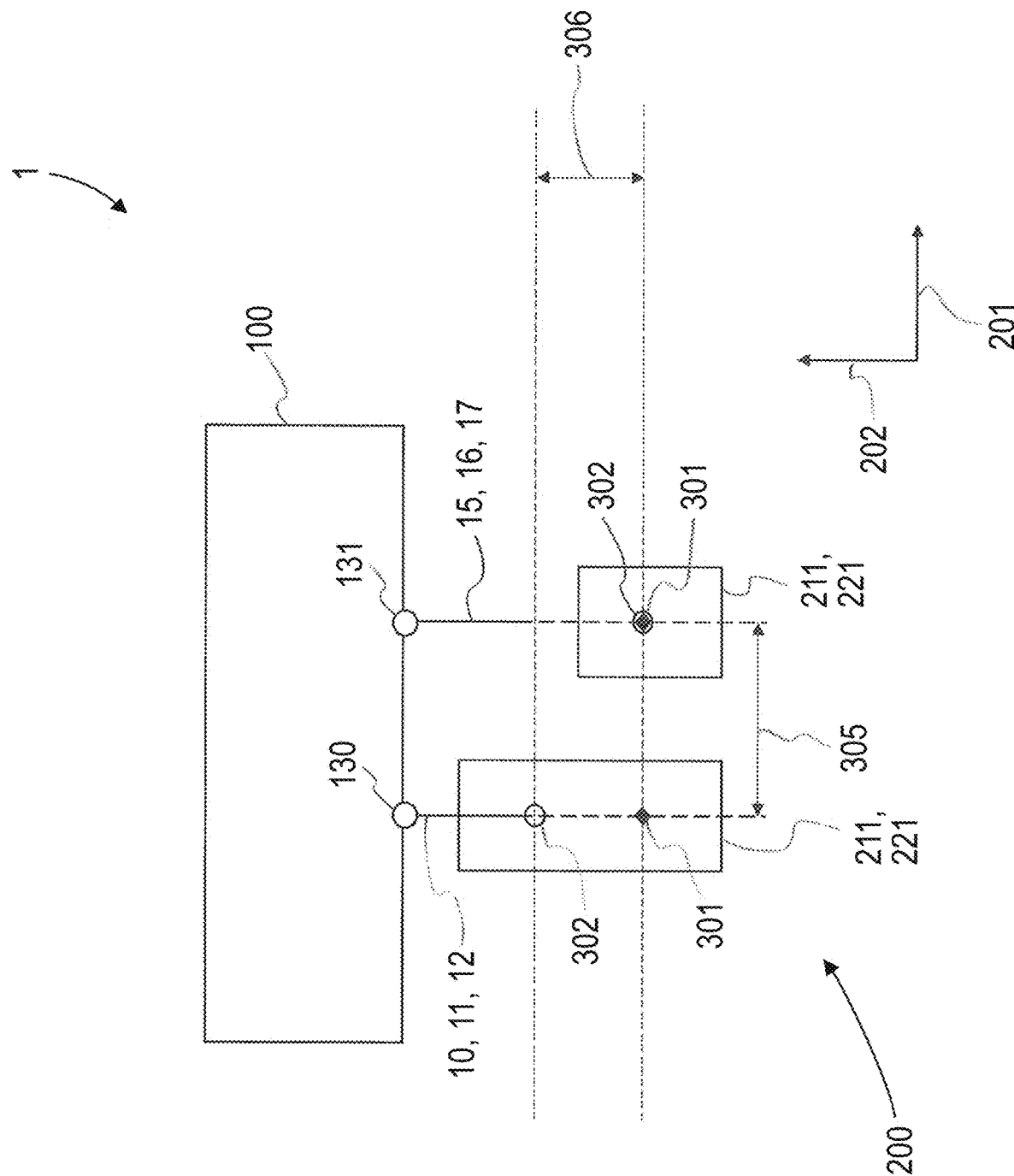
FIG. 21 a further embodiment of a radar device according to the present disclosure.

FIG. 21 illustrates a further embodiment of a radar device 1 according to the present disclosure that routes two antenna signals via a common signal port and transduces the antenna signals routed via the common signal port with separate phase centers. As far as no differences are described or apparent from the Figures, the radar device 1 is configured as it is disclosed in connection with the radar devices 1 shown in FIGS. 1, 4, 7 to 13 and 16.

A radar circuit 100 of the radar device 1 has a first signal port 130 and a second signal port 131. The first and second signal port 130, 131 are each configured as common signal ports to each of which a first antenna 211 transducing electromagnetic radiation with a first phase center 301 and a second antenna 221 transducing electromagnetic radiation with a second phase center 302 are connected. The first antennas 211 each transduce a first antenna signal occupying a first frequency band and the second antennas 221 each transduce a second antenna signal occupying a second frequency band.

The first phase centers 301 of the first antennas 211 connected to the first and second common signal port 130, 131 are shifted with respect to each other by a first distance 305 along a first direction 201 and are positioned at the same location in a second direction 202 that is perpendicular to the first direction 201. Consequently, from the first antenna signals transduced via the first antennas 211, a virtual antenna array may be constructed that resolves the angular position of a target object along the first direction 201. The second phase centers 302 of the second antennas 221 connected to the first and second common signal port 130, 131 are shifted with respect to each other by a second distance 306 along the second direction 202 and are positioned at the same location in the first direction 201. From the second antenna signals transduced via the second antennas 221, a virtual antenna array may be constructed that resolves the angular position of the target object along the second direction 202.

As can also be seen from FIG. 21, the phase centers 301, 302 of the first and second antenna 211, 221 connected to the first common signal port 130 are located at the same position in the first direction 201 and are shifted with respect to each other by the second distance 306 along the second direction 202. Furthermore, the phase centers 301, 302 of the first and second antenna 211, 221 connected to the second common signal port 131 coincide both in the first and in the second direction 201, 202.

The first antennas 211 frequency selectively transduce in a first frequency band and the second antennas 221 frequency selectively transduce in a second frequency band that is separate from the first frequency band. The first common signal port 130 routes a first radar signal 10 that comprises the first antenna signal as a first signal portion 11 and the second antenna signal as a second signal portion 12. Likewise, the second common signal port 131 routes a second radar signal 15 that comprises the first antenna signal as a first signal portion and the second antenna signal as a second signal portion 17. The first signal portions 11, 16 and first antenna signals each occupy the first frequency band and the second signal portions 12, 17 and second antenna signals each occupy the second frequency band.

Figure 22:
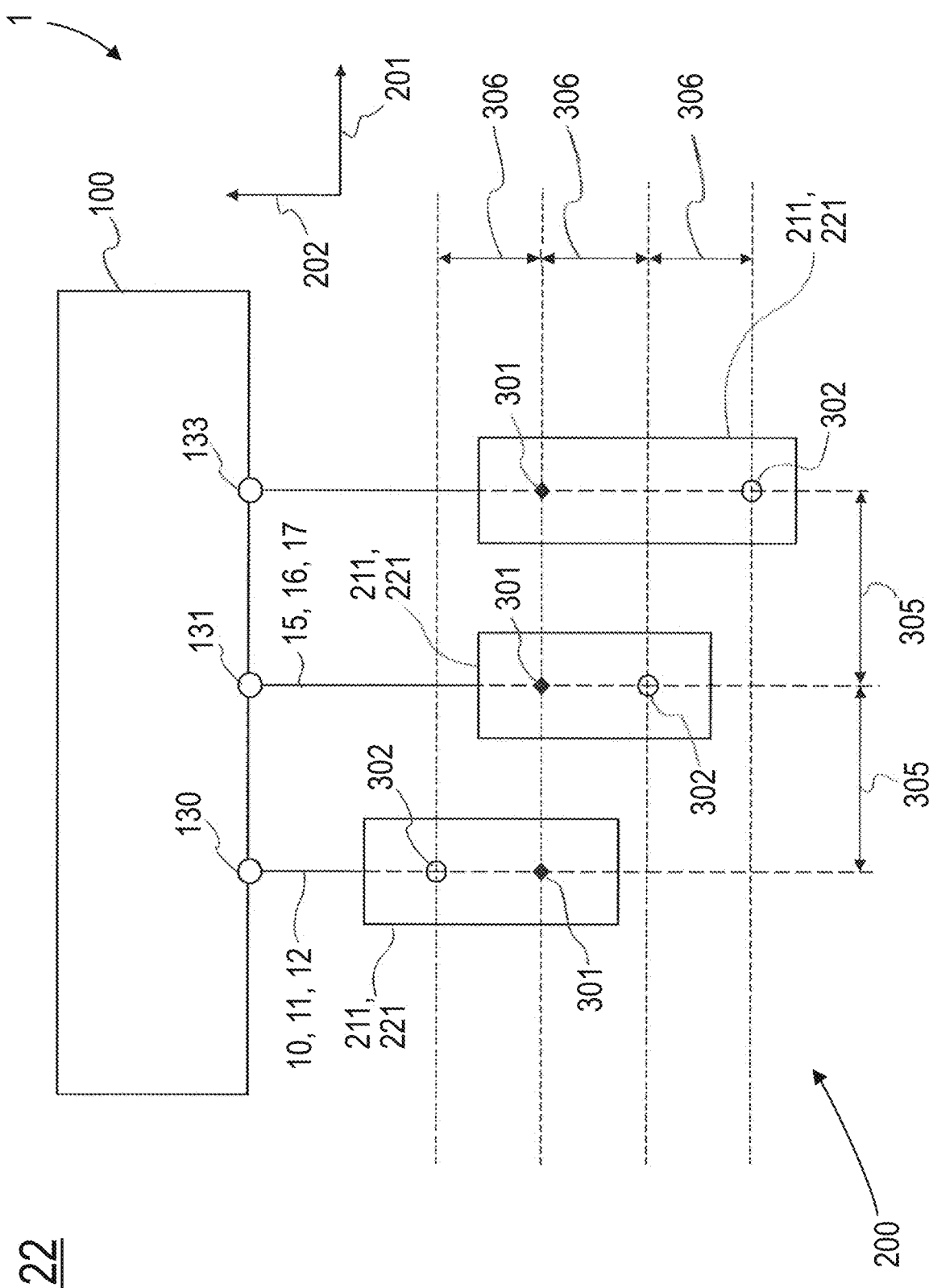
FIG. 22 a further embodiment of a radar device according to the present disclosure.

FIG. 22 shows a further embodiment of a radar device 1. As far as no differences are described or apparent from the Figures, the radar device 1 shown in FIG. 22 is configured as it is disclosed in connection with the radar device 1 of FIG. 21. The radar circuit 100 of the radar device shown in FIG. 22 comprises a further common signal port 133 to which the additional first and second antennas 211, 221 are connected. The first antenna 211 connected to the further common signal port 133 has a first phase center 301 and the second antenna 221 connected to the further common signal port 133 has a second phase center 302. Both the first and second antenna signal are routed as individual signal portions of a radar signal via the further common signal port 133.

Like the first and second antennas 211, 221 connected to the first and second common signal 130, 131, the first antenna 211 connected to the further common signal port 133 frequency selectively transduces a first antenna signal occupying the first frequency band and the second antenna 221 connected to the further common signal port 133 frequency selectively transduces a second antenna signal occupying the second frequency band.

With the radar device of FIG. 22, the first and second phase center 301, 302 of the antennas 211, 221 connected to the second common signal port 131 are separated from each other by the second distance 306 along the second direction 202 and the first and second phase centers 301, 302 of the antennas 211, 221 connected to the further common signal port 133 are aligned with each other in the first direction 201 and separated from each other along the second direction 202 by twice the second distance 306.

The individual first phase centers 301 of the first antennas 211 connected to the individual common signal ports 130, 131, 133 are aligned with each other in the second direction 202 and separated from each other in the first direction 201 by the first distance 305. The second phase centers 302 of the second antennas 221 connected to the first and second common signal port 130, 131 are separated from each other along the second direction 202 by twice the second distance 306 and the phase center 302 of the second antenna 221 connected to the further common signal port 133 is separated from the second phase center 302 of the second antenna 221 connected to the second common signal port 131 by the second distance 306.

Figure 23:
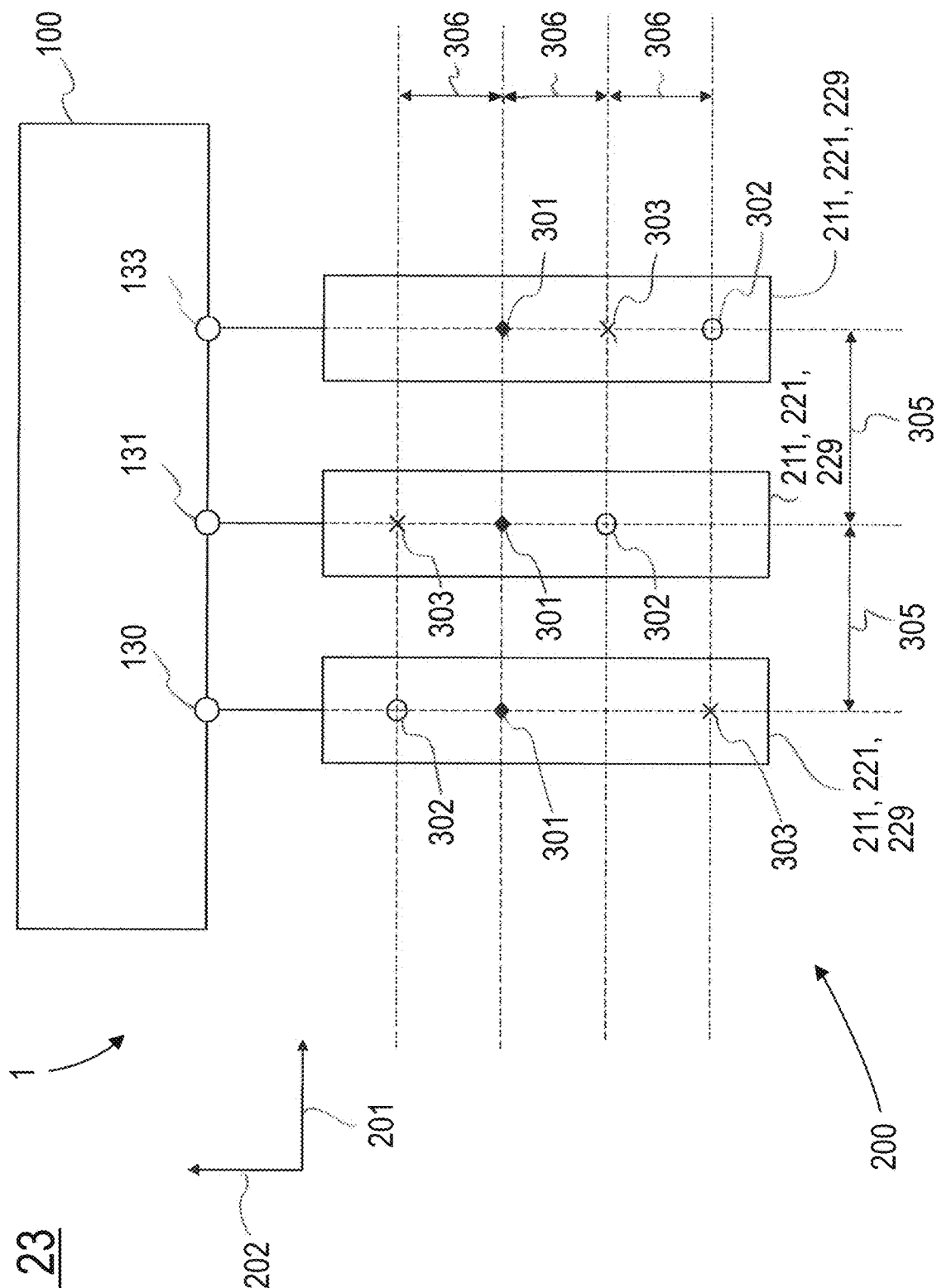
FIG. 23 an alternative embodiment of the radar device of FIG. 22.

FIG. 23 shows an alternative embodiment of the radar device 1 of FIG. 22. To each of the common signal ports 130, 131, 133 three individual antennas 211, 221, 229 are connected, whereby each individual antenna 211, 221, 229 transduces via a separate phase center. Therefore, each common signal port 130, 131, 133 routes a first antenna signal that is transduced via a first phase center 301 of the first antenna 211, a second antenna signal that is transduced with a second phase center 302 of the second antenna 221 and a third antenna signal that is transduced with a third phase center 303 of the third antenna 229. The individual antenna signals each occupy different frequency bands.

The individual third phase centers 303 are aligned with the first and second phase centers 301, 302 of the antennas 211, 221, 229 connected to the same signal port 130, 131, 133 in the first direction 201. In the second direction 202, the third phase center 303 of the antenna 229 connected to the first common signal port 130 is positioned at the same location as the second phase center 302 of the antenna 223 connected to the third common signal port 133, the third phase center 303 of the antenna 229 connected to the second common signal port 131 is positioned at the same location as the second phase center 302 of the antenna 223 connected to the first common signal port 131 and the third phase center 303 of the antenna 229 connected to the third common signal port 133 is positioned at the same location as the second phase center 302 of the antenna 223 connected to the second common signal port 132.

The antennas 229 having the third phase centers 303 realize an additional antenna array for resolving the angular position of the target object in the second direction 202. The antennas 223 having the second phase center 302 may differ from the antennas 229 having the third phase center 303 in at least one antenna parameter like gain, field of view, polarization or the like.

Transducing antenna signals occupying separate frequency bands with separate phase centers is, for example, accomplished by the antenna devices 200 shown in FIGS. 1, 4, 7 to 13 and 16. All these antenna devices 200 feature individual antennas 211, 221, 229 that consist of separate sets of radiating elements 213, 223, 228. Alternatively, frequency selective transducement of antenna signals with separate phase centers may also be realized with antennas that share common sets of radiating elements, such as the antennas shown in the following FIGS. 24 to 28.

Figure 24:
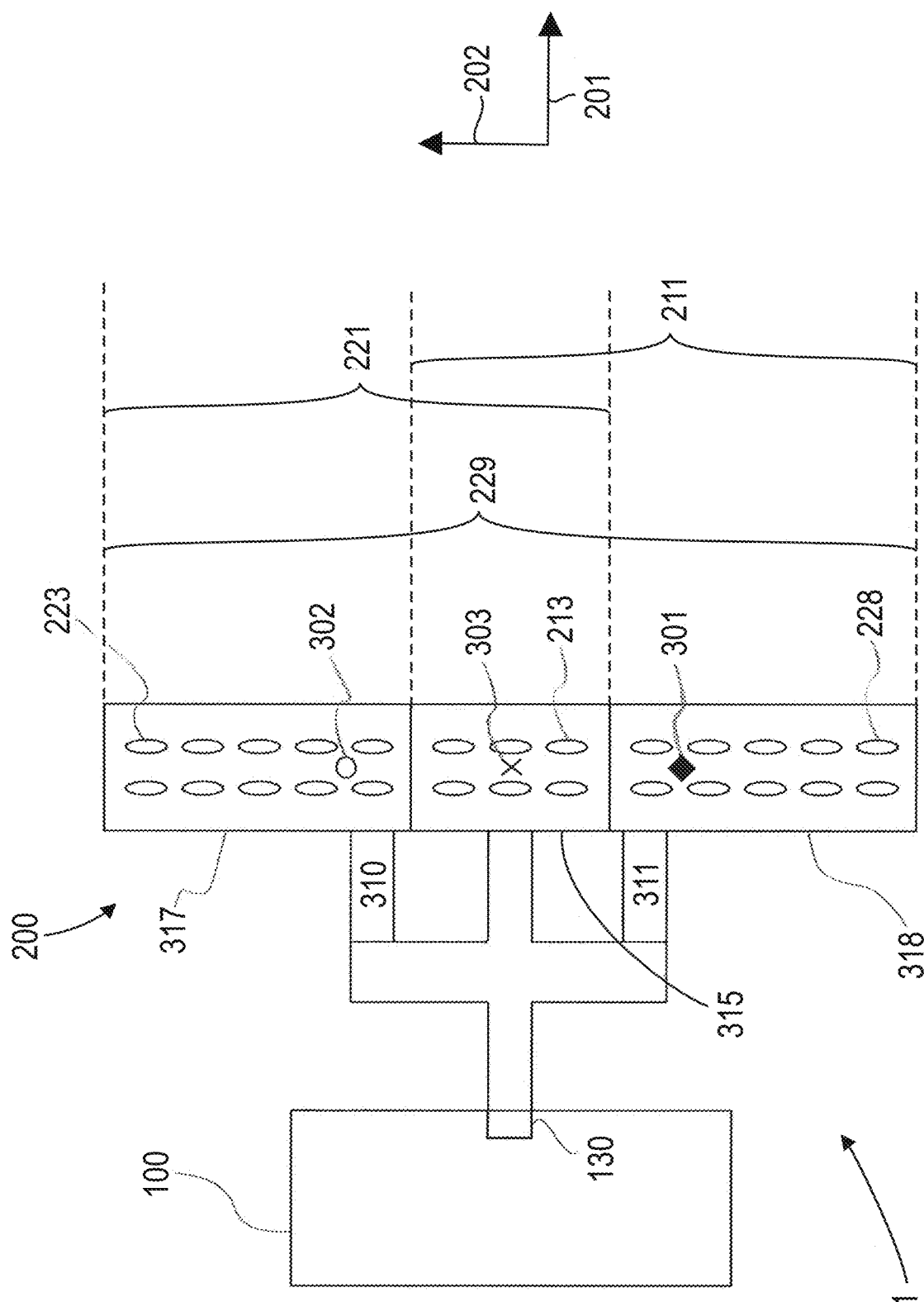
FIG. 24 an antenna device for the radar devices of the present disclosure.

FIG. 24 shows an antenna device 200 that may be used with the radar devices 1 according to the present disclosure. It has a first antenna 211, a second antenna 221 and a third antenna 229 coupled to a common signal port 130 of a radar circuit 100. The first antenna 211 transduces in a first frequency band, the second antenna 221 transduces in a second frequency band and the third antenna 229 transduces in a third frequency band. The first, second and third frequency band are separated from each other and the second frequency band is located at higher frequencies than the first frequency band and the third frequency band is located in between the first and second frequency band. For example, the first frequency band may lie between 76 GHz and 77 GHZ, the second frequency band may lie between 78 GHz and 79 GHz and the third frequency band may lie between 80 GHz and 81 GHz.

The antenna device 200 comprises a first set 315 of first antenna elements 213, a second set 317 of second antenna elements 223 and a third set 318 of third antenna elements 228. In the second direction 202, the second and third sets 317, 318 of antenna elements 223, 228 are arranged on opposite sides of the first antenna elements 213 of the first set 315. The antenna elements 213, 223, 228 are configured as individual radiating slots provided in a waveguide, for example a surface integrated waveguide. The first antenna 211 consists of the first antenna elements 213 and the third antenna elements 228, the second antenna 221 consists of the first antenna elements 213 and the second antenna elements 223 and the third antenna consists of the first, second and third antenna elements 221, 223, 229.

The first antenna elements 213 of the first set 315 are directly coupled to the common signal port 130 and transduce in the first, second and third frequency band. The second antenna elements 223 of the second set 317 transduce in the second and third frequency band and the third antenna elements 228 of the third set 318 transduce in the first and third frequency band. To this end, the second antenna elements 223 of the second set 317 are coupled to the common signal port 130 by a first filter 310 that is configured as a high path filter that blocks the first frequency band and passes the second and third frequency band, whereas the third antenna elements 228 of the third set 318 are coupled to the common signal port 130 by a second filter 311 that is configured as a low pass filter that blocks the second frequency band and passes the first and third frequency band. The filters 310, 311 and the common signal line connecting the antennas 211, 221, 229 to the common signal port 130 may be configured as surface integrated waveguide devices.

The first antenna 211 has a first phase center 301, the second antenna 221 has a second phase center 302 and the third antenna 229 has a third phase center 303. The phase centers 301, 302, 303 are positioned at the same location in the first direction 201 and are separated from each other along the second direction 202. Thereby, the third phase center 303 is located in between the first phase center 301 and the second phase center 302. The antenna elements 213, 223, 228 are distributed above each other in two rows along the second direction 202 to form array antennas 211, 221, 229 that have a small field of view along the second direction 202, which may be the elevation direction with respect to a ground surface on which a vehicle comprising the radar device 1 travels.

With the radar device shown in FIG. 24, the first filter 310 is located directly between the second antenna elements 223 of the second set 317 and the common signal port 130 and the second filter 311 is located directly between the third antenna elements 228 of the third set 318 and the common signal port 130.

Figure 25:
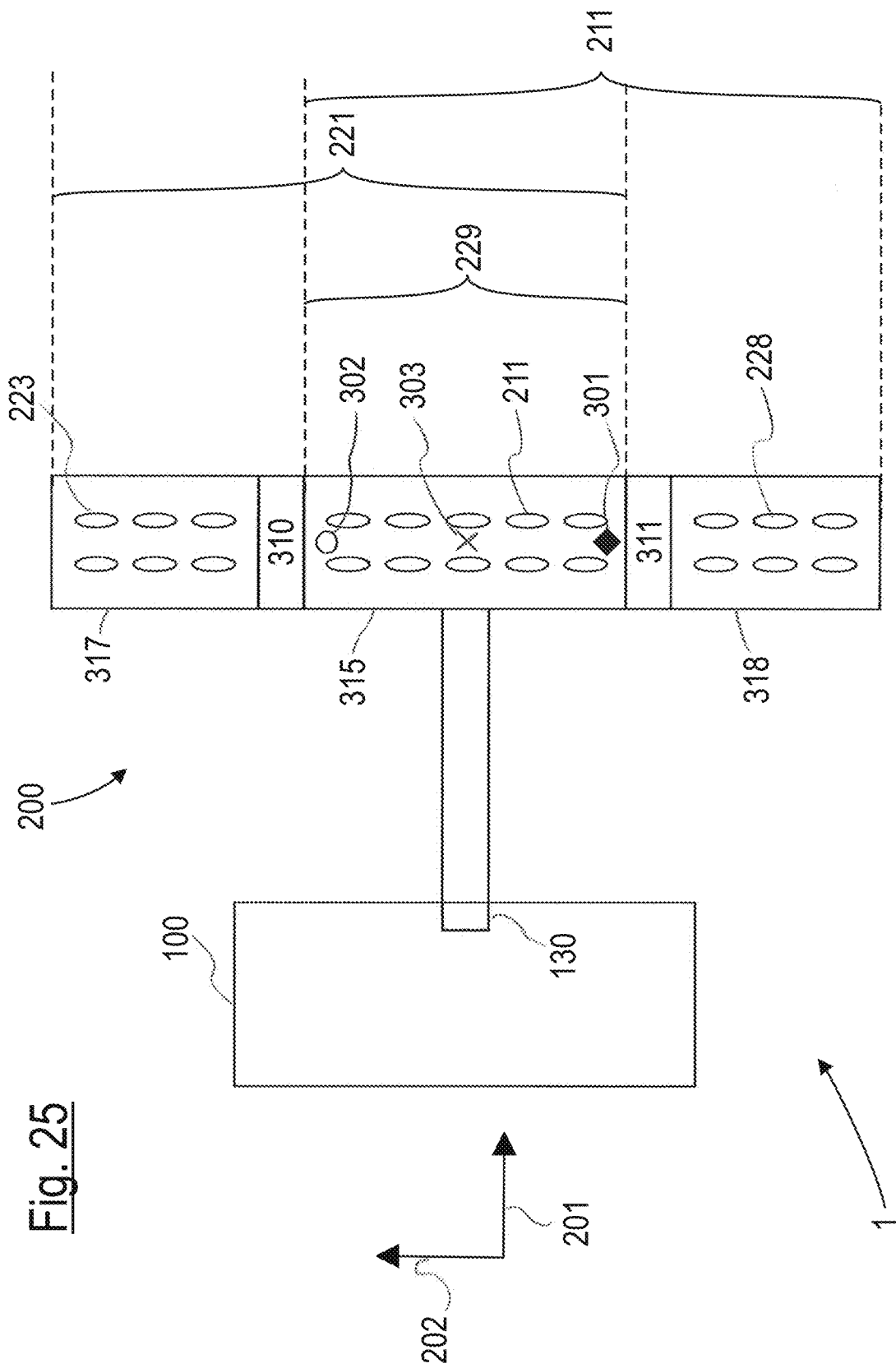
FIG. 25 an alternative embodiment of the antenna device of FIG. 24.

FIG. 25 depicts an alternative embodiment of the antenna device 200 shown in FIG. 24. With this embodiment, the first filter 310 is located in between the first antenna elements 213 of the first set 315 and the second antenna elements 223 of the second set 317, so that the second antenna elements 223 are connected to the common signal port 130 via the first filter 310 and the first set 315 of first antenna elements 213. Likewise, the second filter 311 is located in between the first antenna elements 213 of the first set 315 and the third antenna elements 228 of the third set 318, so that the third antenna elements 228 are connected to the common signal port 130 via the second filter 311 and the first set 315 of first antenna elements 213.

The first filter 310 is configured as a high pass filter that only transduces the second frequency band and the second filter 311 is configured as a low pass filter that only transduces the first frequency band. Consequently, the first antenna 211 transducing in the first frequency band comprises the first set 315 of first antenna elements 213 and the third set 318 of third antenna elements 228, while the second antenna 221 transducing in the second frequency band comprises the first set 315 and the second set 317 of antenna elements 213, 223 and the third antenna 229 transducing in the third frequency band only comprises the first set 315 of antenna elements 213. In alternative embodiments, the first filter 310 may be configured as a high pass filter that blocks the first frequency band and passes the second and third frequency band and the second filter 311 may be configured as a low pass filter that blocks the second frequency band and passes the first and third frequency band. With these embodiments, the third antenna comprises all sets 315, 317, 318 of antenna elements 213, 223, 228.

Figure 26:
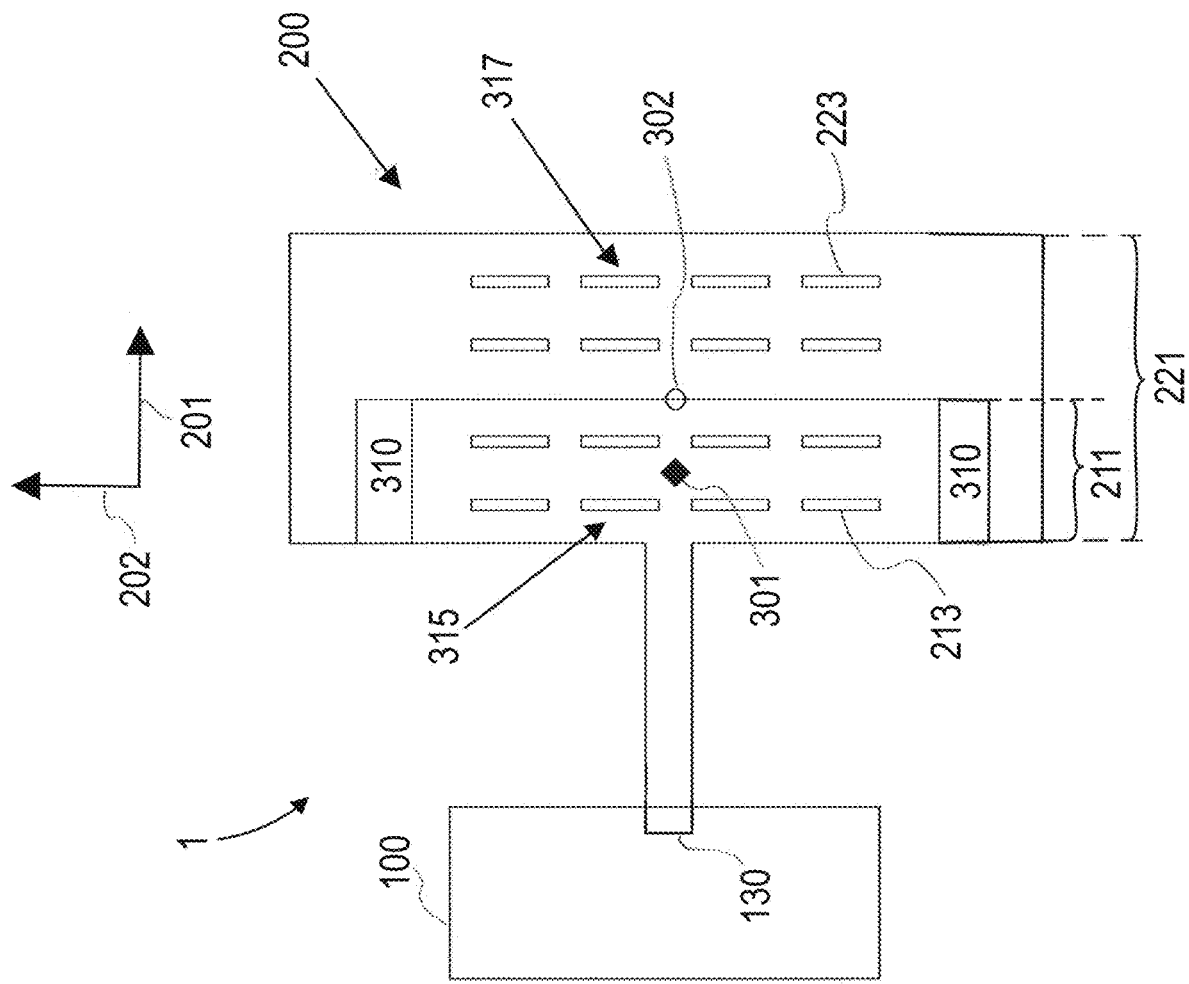
FIG. 26 an alternative embodiment of an antenna device for the radar devices of the present disclosure.

FIG. 26 shows another embodiment of an antenna device 200 for the radar devices 1 according to the present disclosure. The antenna device 200 has two antennas 211, 221 that are coupled to a common signal port 130 of a radar circuit 130 and transduce via separate phase centers 301, 302. As far as no differences are described or apparent from the figures, the antenna device 200 shown in FIG. 26 is configured as disclosed in connection with the antenna device 200 shown in FIG. 24 and vice versa.

With the antenna device 200 of FIG. 26, the first set 315 of first antenna elements 213 and the second set 317 of second antenna elements 223 are positioned next to each other along the first direction 201, which is the azimuth direction. The first antenna elements 213 and the second antennas 223 are each distributed along two rows extending in the second direction 202, which is the elevation direction. The antenna elements 213, 223 are configured as individual radiating slots provided in a waveguide, for example a surface integrated waveguide, whereby the waveguide serially connects the second antenna elements 223 via the first antenna elements 213 to the common signal common signal port 130 of the radar circuit 100.

In between the section of the waveguide containing the first set 315 of antenna elements 213 and the section of the waveguide containing the second set 317 of antenna elements 223, the waveguide has two filters 310 that are configured as low pass filters that block the first frequency band. Consequently, the first antenna 211 transducing in the first frequency band comprises the first antenna elements 213 only and the second antenna 221 transducing in the second frequency band comprises both the first and second antenna elements 213, 223. The filters 310 are located in the second direction 202 at both ends of the waveguide section that comprises the first antenna elements 213.

The first antenna 211 then has a first phase center 301 that is located in the middle of the first set 315 of first antenna elements 213 and the second antenna 221 has a phase center that is located in between the first and second set 315, 317 of antenna elements 213, 223, in the center of the antenna structure combining the first and second antennas 211, 221. The second phase center 302 is shifted with respect to the first phase center 301 along the first direction 201.

Figure 27:
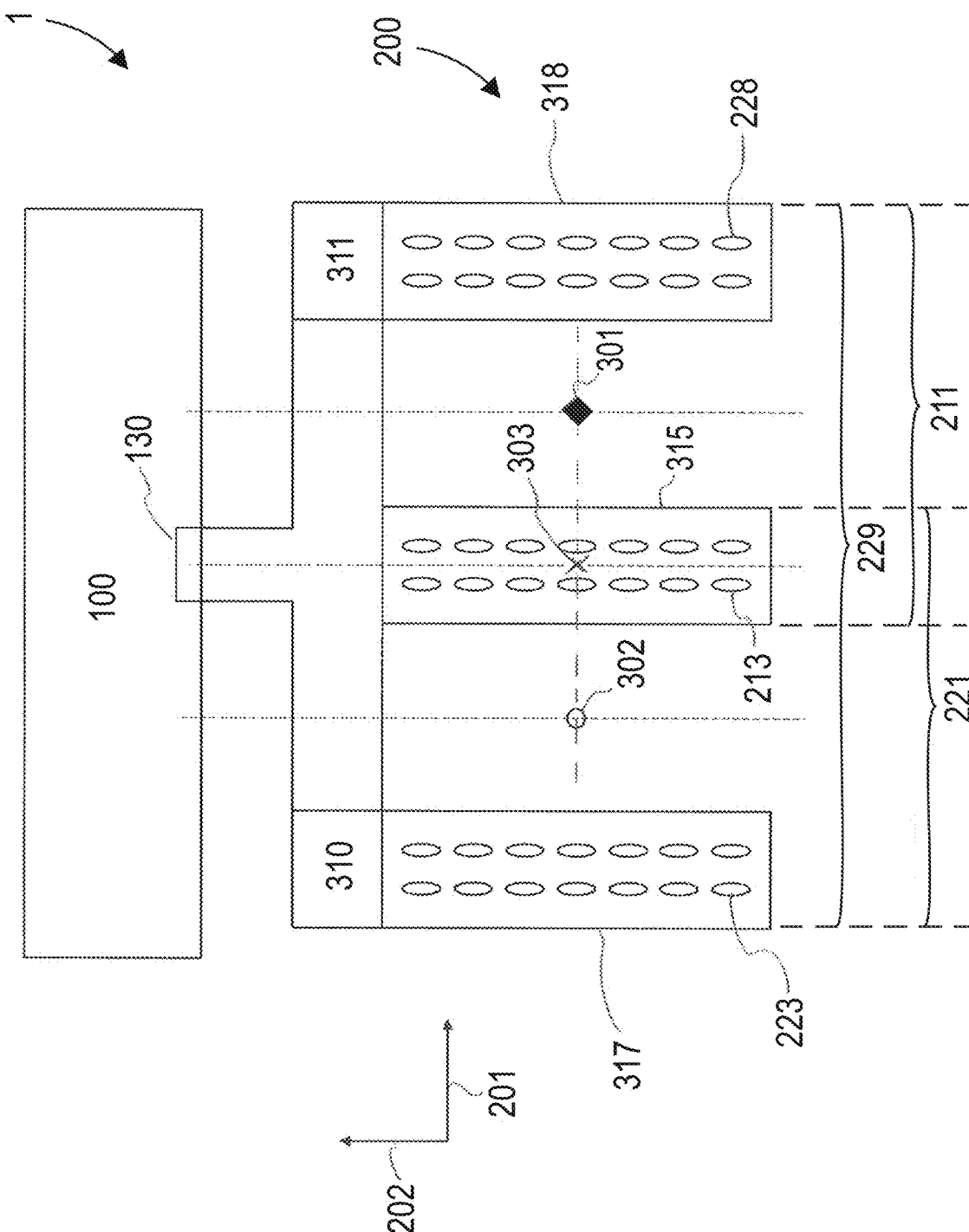
FIG. 27 an alternative embodiment of an antenna device for the radar devices of the present disclosure.

FIG. 27 shows another alternative embodiment of an antenna device 200 for the radar devices 1 according to the present disclosure, which has a first, second and third antenna 211, 221, 229 coupled to a common signal port 130. As far as no differences are described or apparent from the Figures, the embodiment shown in FIG. 27 is configured as it is disclosed for the embodiment shown in FIG. 24.

With the embodiment shown in FIG. 27, the first set 315 of first antenna elements 213, the second set 317 of second antenna elements 223 and the third set 318 of third antenna elements 228 are spaced apart from each other along the first direction 201. Thereby, the first set 315 is located in between the second set 317 and the third set 318. The antenna elements 213, 223, 228 of the individual sets 315, 317, 318 are each aligned in two rows along the second direction 202 so that the individual sets 315, 317, 318 of antenna elements 213, 223, 228 form arrays with a narrow field of view along the second direction 202, which is the elevation direction.

The first phase center 301 of the first antenna 211 comprising the first and third set 315, 318 of antenna elements 213, 228 is located along the first direction 201 in between the first and third set 315, 318 of antenna elements 213, 228 and the second phase center 302 of the second antenna 221 comprising the first and second set 315, 317 of antenna elements 213, 228 is located along the first direction 201 in between the first and second set 315, 317 of antenna elements 213, 223.

Figure 28:
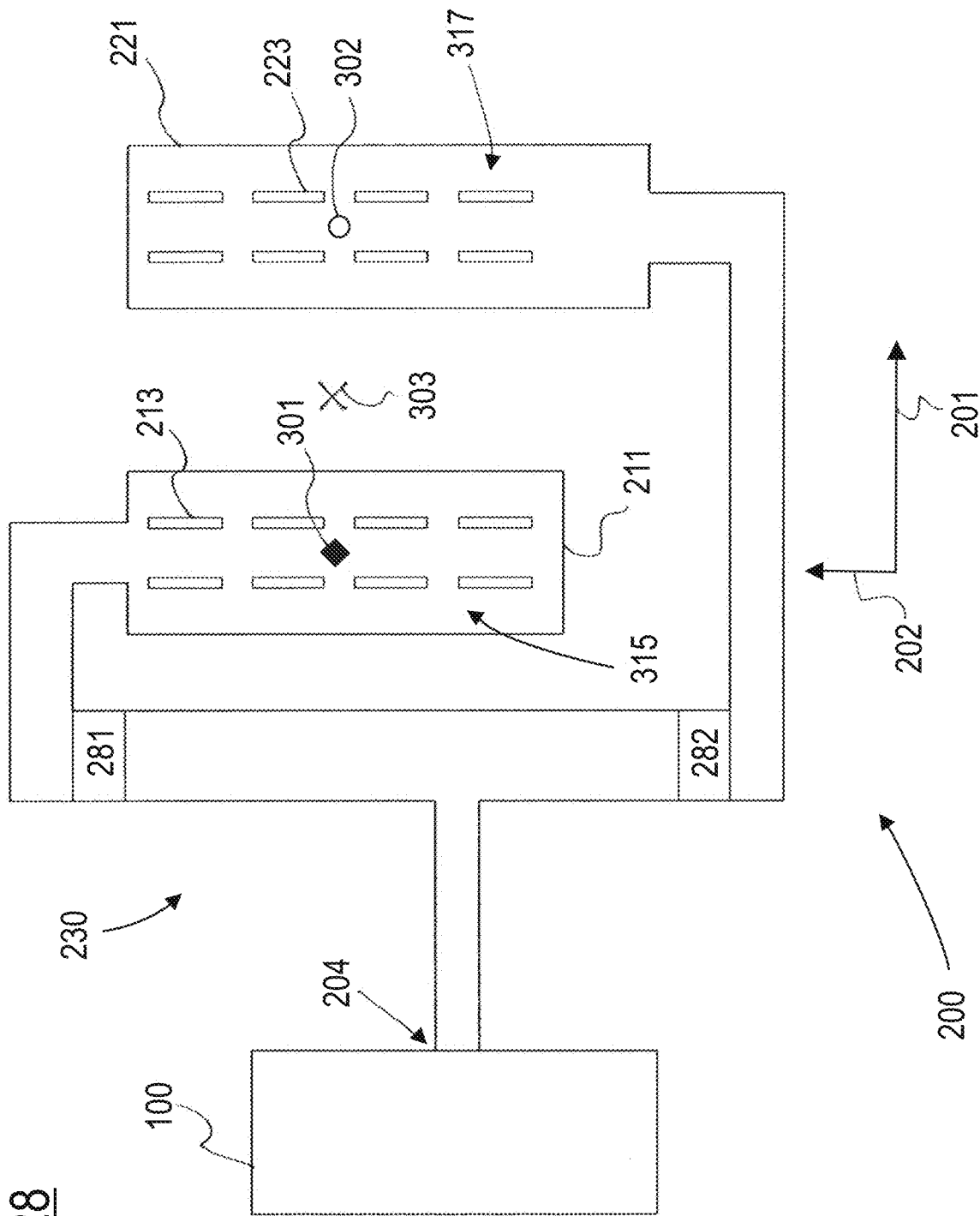
FIG. 28 an embodiment of a first and second antenna coupled to a common signal port for an antenna device of the present disclosure.

FIG. 28 shows an alternative embodiment of a first and second antenna 211, 221 of an antenna device 200 according to the present disclosure. As far as no differences are described or apparent from the Figures, the embodiment shown in FIG. 28 is configured as it is disclosed in connection with the embodiment shown in FIG. 7 and vice versa.

The first antenna 211 and the second antenna 221 are both coupled via a signal routing device 230 to a common signal port 204 of a radar circuit 100. The radar circuit 100 is configured to route the radar signal shown in FIG. 20 over the common signal port 204, which radar signal has the first signal portion 11 occupying the first frequency band 31, the second signal portion 12 occupying the second frequency band 34 and the third signal portion 13 occupying the third frequency band 37.

The first antenna 211 is configured to transduce the first and third signal portions 11, 13, but not the second signal portion 12 and the second antenna 221 is configured to transduce the second and third signal portion 12, 13, but not the first signal portion 11. To this end, the first antenna 211 is coupled via a first filter 281 of the signal routing device 230 to the common signal port 204 and the second antenna 221 is coupled via a second filter 282 of the signal routing device 230 to the common signal port 204. The first filter 281 is configured to pass the first and third signal portion 11, 13 and to block the second signal portion 12, while the second filter 282 is configured to pass the second and third signal portion 12, 13 and to block the first signal portion 11.

The first antenna 211 comprises a first set 315 of first antenna elements 213 and the second antenna 221 comprises a second set 317 of second antenna elements 223. The first set 315 and the second set 317 are spaced apart from each other along a first direction 201. This results in a first phase center 301 of the first antenna 211 being centered at the first set 315 of first antenna elements 213 and a second phase center 302 of the second antenna 221 being centered at the second set 317 of second antenna elements 223. The first and second phase center 301, 302 are therefore spaced apart from each other along the first direction 201.

Since the third signal component 13 is transduced via both the first set 315 of first antenna elements 213 and the second set 317 of second antenna elements 223, the third signal component 13 is transduced via a third phase center 303 that is located in between the first and second phase center 301, 302 along the first direction 201.

Additionally, the first antenna 211 is configured to transduce the first and third signal portions 11, 13 having a first linear polarization, which is parallel to the first direction 201, and the second antenna 221 is configured to transduce the second and third signal portions 12, 13 having a second linear polarization, which is parallel to a second direction 202 that is perpendicular to the first direction 201. This results in the third signal portion 13 being transduced with a third polarization that is a linear superposition of the first and second polarization. The third polarization may be a linear polarization at an intermediate direction between the first direction 201 and the second direction 202, for example at a direction that has an angle of +/−45° with the first and second direction 201, 202. Alternatively, the third polarization may be an elliptical polarization.

Figure 29:
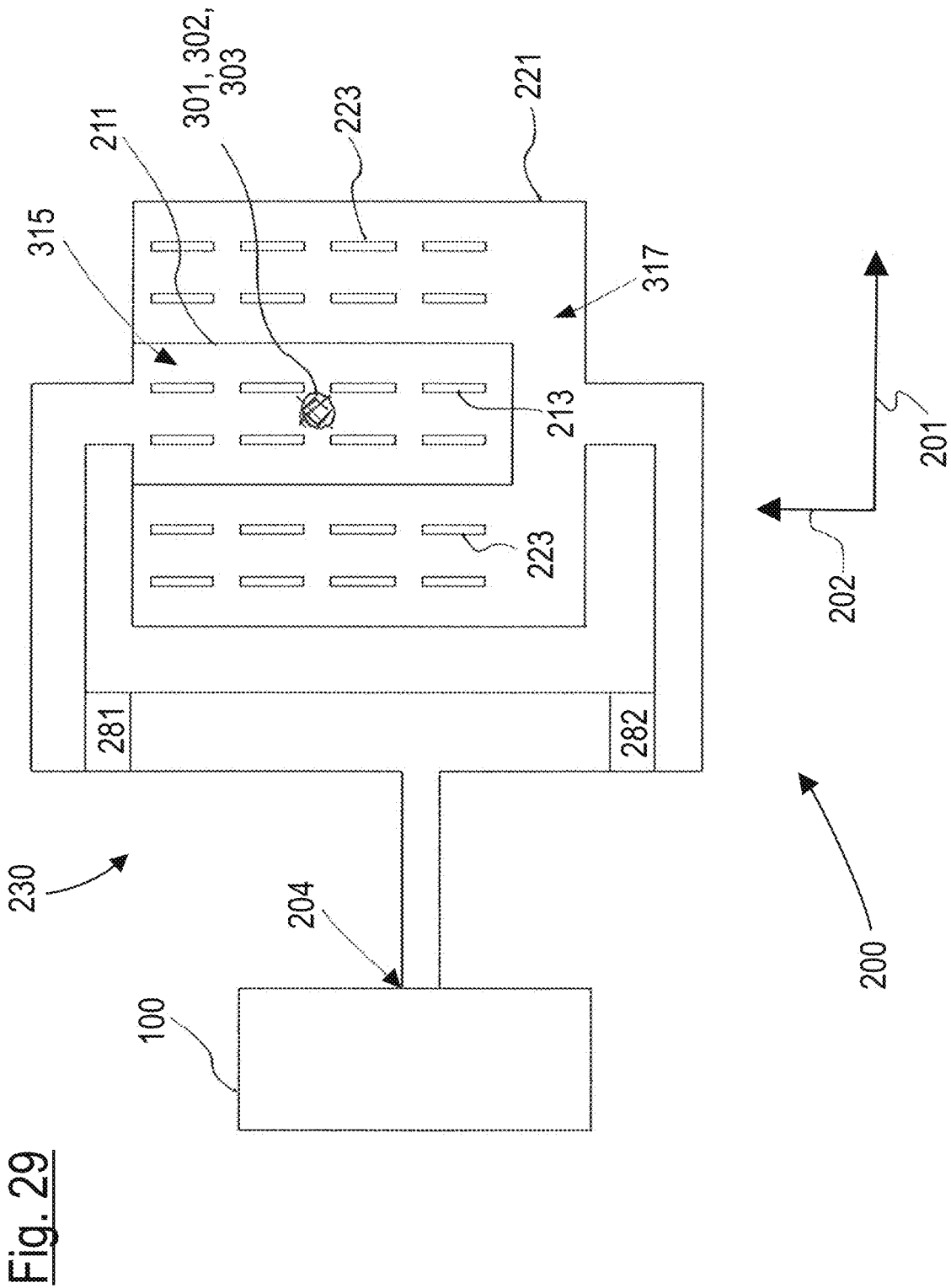
FIG. 29 an alternative embodiment of the first and second antenna coupled to the common signal port shown in FIG. 28.

FIG. 29 shows an alternative embodiment of the antenna device 200 shown in FIG. 28. With the antenna device 200 shown in FIG. 29, the first, second and third phase center 301, 302, 303 coincide at the center of the first set 315 of first antenna elements 213. This is achieved by the second antenna elements 223 of the second antenna 221 being placed symmetrically on both sides of the first antenna elements 213 of first antenna elements 213 along the first direction 201. Consequently, the first, second and third signal portion 11, 12, 13 of the radar signal routed via the common signal port 204 are all transduced via the same phase center. However, a first propagation channel established by the first signal portion 11, a second propagation channel established by the second signal portion 12 and a third propagation channel established by the third signal portion 13 all have different polarizations, as well as different gains and fields of view along the first direction 201.

Figure 30:
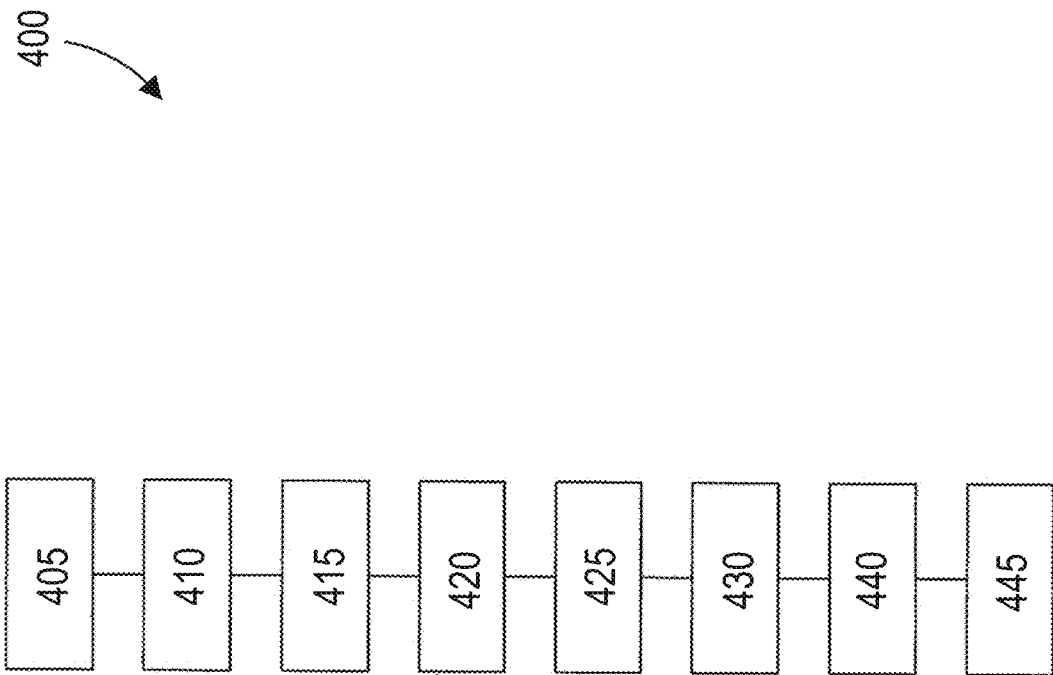
FIG. 30 a method according to the present disclosure.

FIG. 30 shows a method 400 performed by the radar devices 1 according to the present disclosure. The method comprises processing radar signals by generating 405 the radar signals 10, 15 having the first signal portion 11, 16 and the second signal portions 12, 17 by the transmit chains 125, 126 of the signal generator 105 of the radar circuits 100. The method then comprises routing 410 the radar signals 10, 15 via the common transmit signal ports 130, 131, 133 to the antenna device 200. The method 400 further comprises transducing the first signal portions 11, 16 and the second signal portions 12, 17 by the antenna device 200 by transmitting 415 the first signal portions 11, 16 via the first antennas 211 and the second signal portions 12, 17 via the second antennas 221.

The method 400 then comprises transducing the first signal portions 21, 26 of the received radar signals 20, 25 by receiving 420 the first signals portions 21, 26 via the first receive antennas 211 and the second signal portions 22, 27 via the second receive antennas 221 of the antenna device 200, respectively. The method further comprises routing 425 the radar signals 20, 25 from the antenna device 200 via the common receive signal ports 135, 136, 137 to the radar circuit 100. The method further comprises measuring the received radar signals 20, 25 by generating 430 the data signals 123, 124 representing the received radar signals 20, 25 with the receive chains 127, 128. The method further comprises evaluating the radar signals 20, 25 by jointly processing 445 the first and second antenna signals to determine the distance to the target object and by differentiating 440 individual propagation channels using the separability parameter of the radar signals 10, 15, 20, 25.

Figure 31:
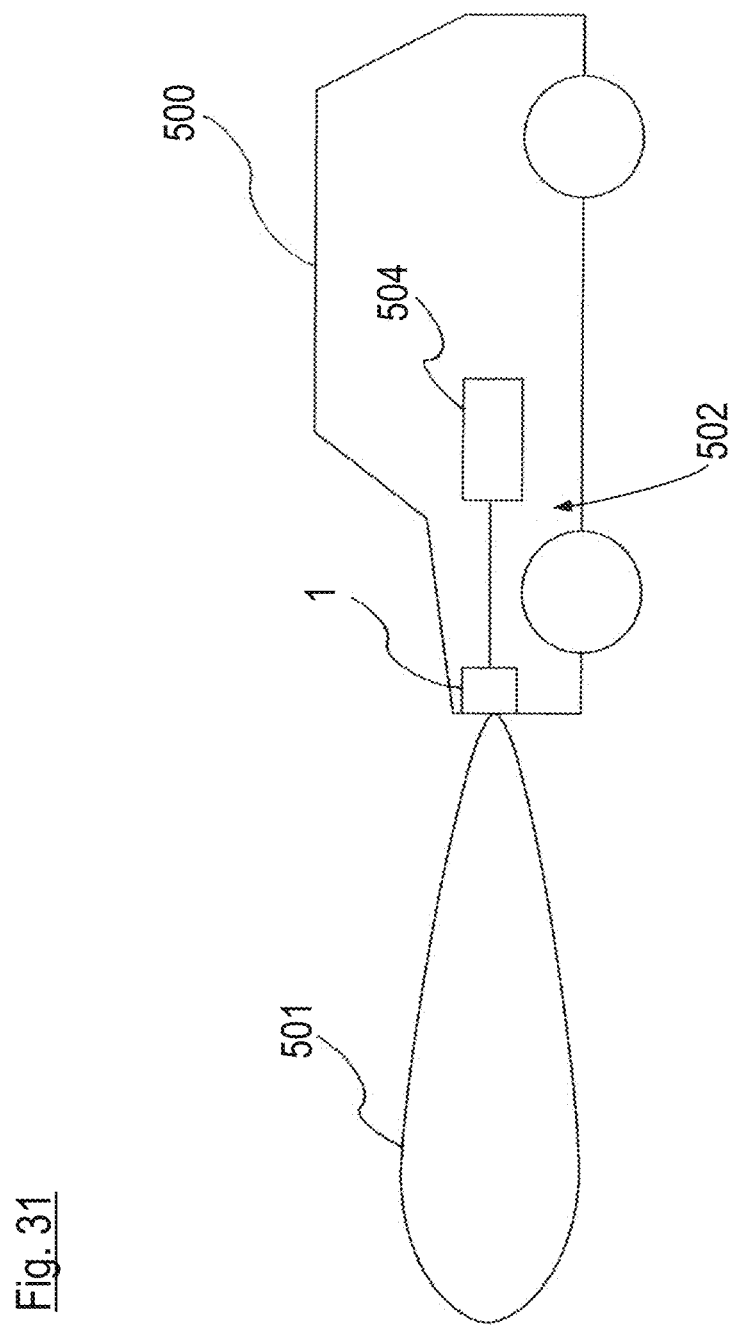
FIG. 31 a vehicle equipped with a radar device according to the present disclosure.

FIG. 31 depicts a vehicle 500 that is equipped with a radar device 1 according to the present disclosure. In the embodiment shown in FIG. 31, the radar device 1 is configured as a front radar of the vehicle 1 and a radiation field 501 of an antenna device of the radar device 1 is directed in the forward direction of the vehicle 500. The radar device 1 is part of a vehicle control system 502 of the vehicle 500 and is connected to a control device 504 of the vehicle control system 502. The control device 504 is configured to perform advanced driver's assist functions, such as adaptive cruise control, emergency brake assist, lane change assist or autonomous driving, based on data signals received from the radar device 1. These data signals represent the positions of target objects in front of the radar device 1 mounted to the vehicle 500. The control device 504 is configured to at least partly control the motion of the vehicle 500 based on the data signals received from the radar device 1. For controlling the motion of the vehicle, the control device 504 may be configured to brake and/or accelerate and/or steer the vehicle 500.

What is claimed is:

1. A radar device for automotive applications, the radar device comprising:
a radar circuit for transceiving radar signals having a first signal portion and a second signal portion, the first signal portion occupying a first frequency band and the second signal portion occupying a second frequency band that is separate from the first frequency band, the radar circuit configured to route both the first signal portion and the second signal portion to a common signal port of the radar circuit;
an antenna device including a first antenna element that is part of a first antenna and a second antenna element that is part of a second antenna, the first antenna element and second antenna element both being coupled to the common signal port of the radar circuit, antenna device configured as a frequency selective antenna device that transduces the first signal portion via the first antenna element and not via the second antenna element and that transduces the second signal portion at least via the second antenna element; and a signal processing device configured to,
    adaptively switch an antenna configuration between a first antenna configuration including the first antenna with the first antenna element and a second antenna configuration including the second antenna with the second antenna element by:
        changing a frequency band of the radar signal from the first frequency band to the second frequency band to emit the second signal portion of the radar signals while maintaining a same conductive or inductive coupling configuration between the radar circuit and the antenna device via the common signal port, and
        changing the frequency band of the radar signal from the second frequency band to the first frequency band to emit the first signal portion of the radar signals while maintaining the same conductive or inductive coupling configuration between the radar circuit and the antenna device via the common signal port, and
    detect, from the first signal portion, target reflections via a first propagation channel and to detect, from the second signal portion, target reflections via a second propagation channel.

2. The radar device according to claim 1,
wherein the antenna device is configured to transduce the second signal portion via both the first antenna element and the second antenna element.

3. The radar device according to claim 1,
wherein the antenna device is configured to block transduction of the second signal portion via the first antenna element.

4. The radar device according to claim 1,
wherein the antenna device is configured to transduce the first signal portion with a first polarization and to transduce the second signal portion with a second polarization,
wherein the second polarization is different from, and orthogonal to, the first polarization.

5. The radar device according to claim 1,
wherein the first antenna element and the second antenna element are serially coupled to the common signal port of the radar circuit via a common signal line, and
wherein the second antenna element is resonant in the second frequency band and not in the first frequency band,
and the first antenna element is resonant at least in the first frequency band.

6. The radar device according to claim 1,
wherein the first antenna element and the second antenna element are coupled to the common signal port of the radar circuit in parallel via a signal routing device of the antenna device,
wherein the signal routing device is configured to split the radar signals into the first signal portion and the second signal portion and to selectively route the first signal portion between the common signal port and the first antenna element and not between the common signal port and the second antenna element and to route the second signal portion at least between the common signal port and the second antenna element.

7. The radar device according to claim 6,
wherein the signal routing device is configured as a frequency selective device comprising a frequency selective multiplexer, having a first port that is coupled to the first antenna element, a second port that is coupled to the second antenna element and a frequency selective section that couples the first and the second port to the common signal port of the radar circuit.

8. The radar device according to claim 1,
wherein the radar circuit comprises an integrated circuit and the common signal port is configured as an external connection point of the integrated circuit.

9. The radar device according to claim 1,
wherein a phase center of the first antenna and a phase center of the second antenna are positioned at a same location on the antenna device.

10. The radar device according to claim 1,
wherein a phase center of the first antenna and a phase center of the second antenna are positioned at different locations on the antenna device.

11. The radar device according to claim 1,
wherein the first antenna including the first antenna element is part of a first set of antennas that transduce in the first frequency band and are displaced with respect to each other along a first direction,
wherein the second antenna including the second antenna element is part of a second set of antennas that transduce in the second frequency band and are displaced with respect to each other along a second direction,
wherein the signal processing device is configured to process individual first radar signals transduced via the first set of antennas to form a first virtual array of antennas that resolves targets along the first direction,
wherein the signal processing device is configured to process individual second radar signals transduced via the second set of antennas to form a second virtual array of antennas that resolves targets along the second direction.

12. The radar device according to claim 1,
wherein the first antenna comprising the first antenna element has a first field of view, the first field of view having a first extent along a lateral direction,
wherein the second antenna comprising the second antenna element has a second field of view, the second field of view having a second extent along the lateral direction,
wherein the first extent is larger than the second extent.

13. The radar device according to claim 12,
wherein the first antenna does not comprise the second antenna element, and
wherein the second antenna comprises the second antenna element and the first antenna element.

14. A method for operating a radar device for automotive applications, the radar device including a signal processing device, a radar circuit, and an antenna device having a first antenna element that is part of a first antenna and a second antenna element that is part of a second antenna, the first and second antenna element being both coupled to a common signal port of the radar circuit, the method comprising:
    generating, by the signal processing device, a radar signal having a first signal portion and a second signal portion, the first signal portion occupying a first frequency band and the second signal portion occupying a second frequency band that is separate from the first frequency band;

routing both the first signal portion and the second signal portion via the common signal port between the radar circuit and the antenna device;

transducing the first signal portion via the first antenna element and not via the second antenna element and the second signal portion at least via the second antenna element;

adaptively switching, by the signal processing device, between a first antenna configuration including the first antenna with the first antenna element and a second antenna configuration including the second antenna with the second antenna element by:

changing a frequency band of the radar signal from the first frequency band to the second frequency band to emit the second signal portion of the radar signals while maintaining a same conductive or inductive coupling configuration between the radar circuit and the antenna device via the common signal port, and changing the frequency band of the radar signal from the second frequency band to the first frequency band to emit the first signal portion of the radar signals while maintaining the same conductive or inductive coupling configuration between the radar circuit and the antenna device via the common signal port;

detecting, by the signal processing device and from the first signal portion, target reflections via a first propagation channel; and detecting, by the signal processing device and from the second signal portion, target reflections via a second propagation channel.

15. The method according to claim 14, wherein the antenna device is configured to transduce the second signal portion via both the first antenna element and the second antenna element.

16. The method according to claim 14, wherein the antenna device is configured to block transduction of the second signal portion via the first antenna element.

17. The method according to claim 14, wherein the antenna device is configured to transduce the first signal portion with a first polarization and to transduce the second signal portion with a second polarization, wherein the second polarization is different from, and orthogonal to, the first polarization.

18. The method according to claim 14, wherein the first antenna element and the second antenna element are serially coupled to the common signal port of the radar circuit via a common signal line and wherein the second antenna element is resonant in the second frequency band and not in the first frequency band, and the first antenna element is resonant at least in the first frequency band.

19. The method according to claim 14, wherein the first antenna element and the second antenna element are coupled to the common signal port of the radar circuit in parallel via a signal routing device of the antenna device, wherein the signal routing device is configured to split the radar signal into the first signal portion and the second signal portion and to selectively route the first signal portion between the common signal port and the first antenna element and not between the common signal port and the second antenna element and to route the second signal portion at least between the common signal port and the second antenna element.

* * * * *